US010592099B2

(12) United States Patent
Gdala

(10) Patent No.: US 10,592,099 B2
(45) Date of Patent: Mar. 17, 2020

(54) DEVICE AND METHOD OF CONTROLLING THE DEVICE

(71) Applicant: SAMSUNG ELECTRONICS CO., LTD., Suwon-si (KR)

(72) Inventor: Tomasz Gdala, Plewiska (PL)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 190 days.

(21) Appl. No.: 15/510,289

(22) PCT Filed: Jun. 25, 2015

(86) PCT No.: PCT/KR2015/006463
§ 371 (c)(1),
(2) Date: Mar. 10, 2017

(87) PCT Pub. No.: WO2016/047898
PCT Pub. Date: Mar. 31, 2016

(65) Prior Publication Data
US 2017/0242580 A1 Aug. 24, 2017

(30) Foreign Application Priority Data

Sep. 22, 2014 (KR) .................. 10-2014-0126208

(51) Int. Cl.
G06F 3/0488 (2013.01)
G06F 3/041 (2006.01)
(Continued)

(52) U.S. Cl.
CPC .......... G06F 3/04883 (2013.01); G06F 3/038 (2013.01); G06F 3/041 (2013.01);
(Continued)

(58) Field of Classification Search
CPC .. G06F 3/04883; G06F 3/0488; G06F 3/0416; G06F 3/04842; G06F 3/167;
(Continued)

(56) References Cited

U.S. PATENT DOCUMENTS 6,211,856 B1 4/2001 Choi et al.
7,479,949 B2 1/2009 Jobs et al.
(Continued)

FOREIGN PATENT DOCUMENTS

CN 103076973 A 5/2013
CN 103092494 A 5/2013
(Continued)

OTHER PUBLICATIONS

Search Report dated Sep. 4, 2015, issued by the International Searching Authority in counterpart International Patent Application No. PCT/KR2015/006463 (PCT/ISA/210).
(Continued)

Primary Examiner — Ajay M Bhatia
Assistant Examiner — Mong-Shune Chung
(74) Attorney, Agent, or Firm — Sughrue Mion, PLLC

(57) ABSTRACT

A method of controlling a device includes receiving an independent touch gesture with respect to locations of elements of a graphical user interface (GUI) on the device; providing an indication with respect to one of a plurality of applications and functions in a previously established order in response to the received touch gesture; receiving a user input with respect to the indication; and executing an application or function corresponding to the indication in response to the received user input.

20 Claims, 46 Drawing Sheets

(51) Int. Cl.
*G06F 3/0484* (2013.01)
*G06F 3/16* (2006.01)
*G06F 3/0481* (2013.01)
*G06F 3/038* (2013.01)
*H04M 1/725* (2006.01)

(52) U.S. Cl.
CPC .......... *G06F 3/0416* (2013.01); *G06F 3/0488* (2013.01); *G06F 3/04817* (2013.01); *G06F 3/04842* (2013.01); *G06F 3/167* (2013.01); *G06F 2203/04808* (2013.01); *H04M 1/72522* (2013.01)

(58) Field of Classification Search
CPC ...... G06F 3/038; G06F 3/04817; G06F 3/041; G06F 2203/04808; H04M 1/72522
See application file for complete search history.

(56) References Cited

U.S. PATENT DOCUMENTS

| | | | |
|---|---|---|---|
| 8,042,044 B2 | 10/2011 | Van Leeuwen | |
| 9,298,292 B2 | 3/2016 | Lee et al. | |
| 2007/0177803 A1 | 8/2007 | Elias et al. | |
| 2008/0036743 A1 | 2/2008 | Westerman et al. | |
| 2010/0257447 A1 | 10/2010 | Kim et al. | |
| 2010/0299638 A1* | 11/2010 | Choi | G06F 3/04883 715/835 |
| 2012/0050210 A1 | 3/2012 | King et al. | |
| 2012/0110517 A1 | 5/2012 | Sparks et al. | |
| 2013/0047093 A1 | 2/2013 | Reuschel et al. | |
| 2013/0120293 A1 | 5/2013 | Jeon | |
| 2013/0222270 A1 | 8/2013 | Winkler et al. | |
| 2013/0311921 A1* | 11/2013 | Fleizach | G06F 3/04883 715/767 |
| 2014/0068518 A1 | 3/2014 | Liu et al. | |
| 2014/0115455 A1* | 4/2014 | Kim | G06F 3/0482 715/702 |
| 2014/0173529 A1 | 6/2014 | Hicks | |
| 2015/0350403 A1* | 12/2015 | Eim | G06F 1/163 455/420 |

FOREIGN PATENT DOCUMENTS

| | | |
|---|---|---|
| CN | 103135934 A | 6/2013 |
| CN | 103218044 A | 7/2013 |
| CN | 103455275 A | 12/2013 |
| EP | 2395421 A1 | 12/2011 |
| WO | 2009/084809 A1 | 7/2009 |

OTHER PUBLICATIONS

Written Opinion dated Sep. 4, 2015, issued by the International Searching Authority in counterpart International Patent Application No. PCT/KR2015/006463 (PCT/ISA/237).

Communication dated Mar. 7, 2018 by the European Patent Office in counterpart European Patent Application No. 15845075.9.

Communication dated Nov. 1, 2017, issued by the State Intellectual Property Office of P.R. China in counterpart Chinese Application No. 201510590662.3.

Communication dated Jan. 21, 2019, issued by the European Patent Office in counterpart European Application No. 15845075.9.

\* cited by examiner

[Fig. 1]
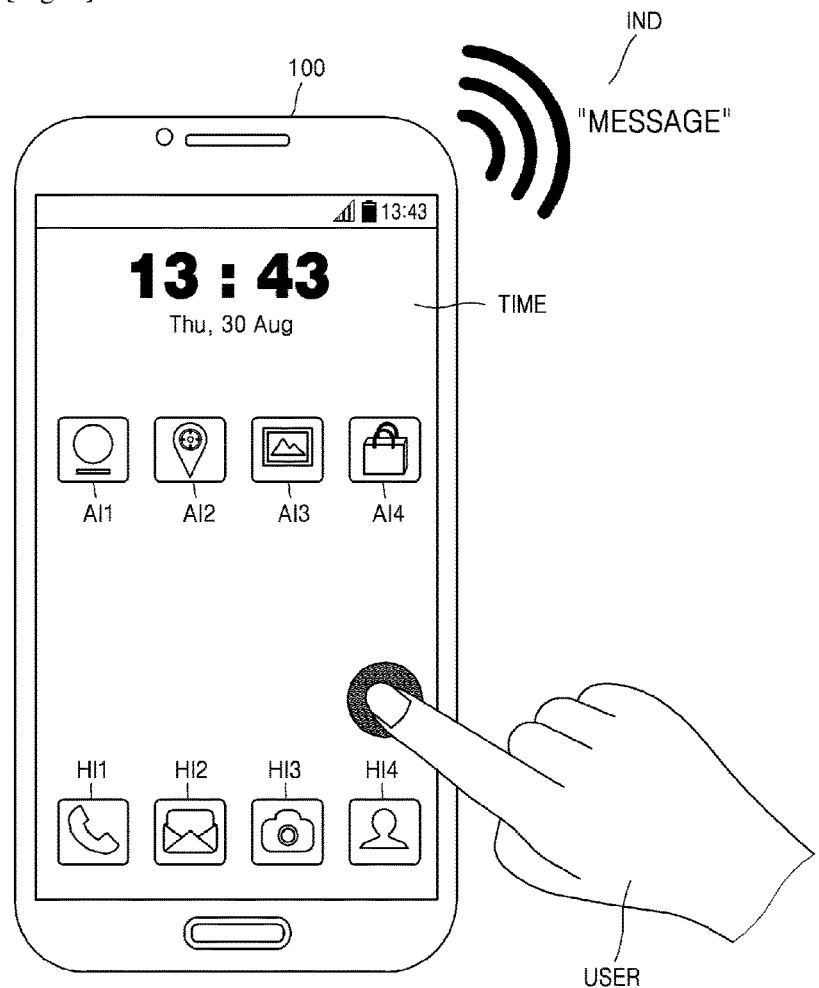
[Fig. 2]
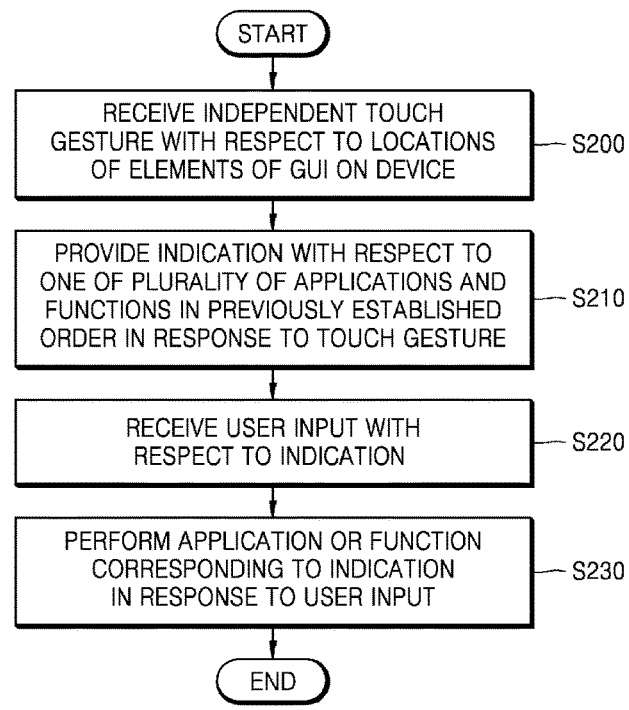

[Fig. 3a]
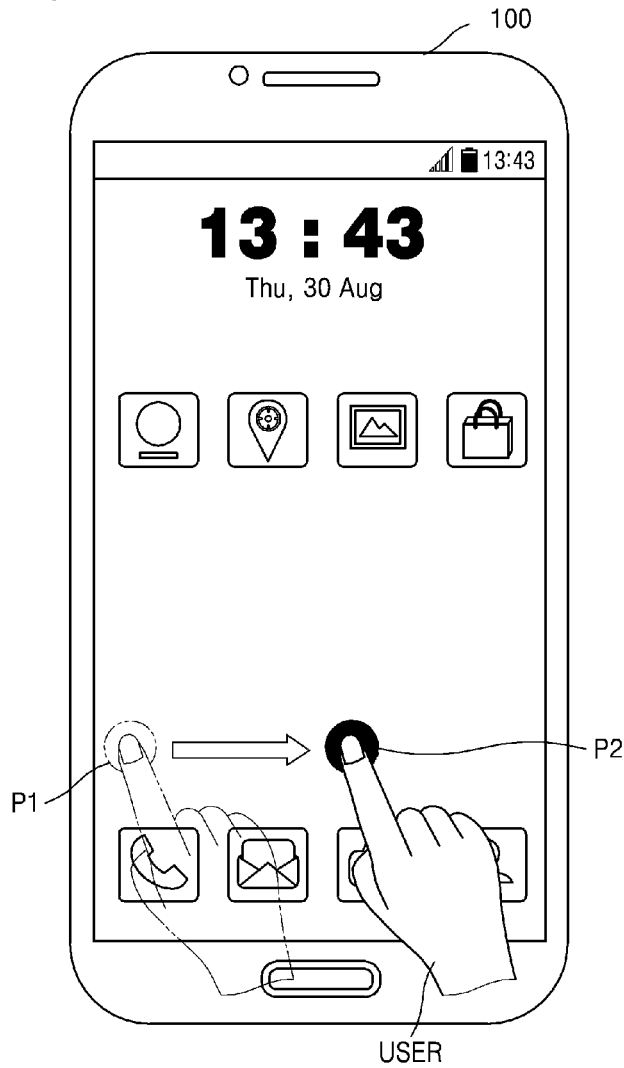
[Fig. 3b]
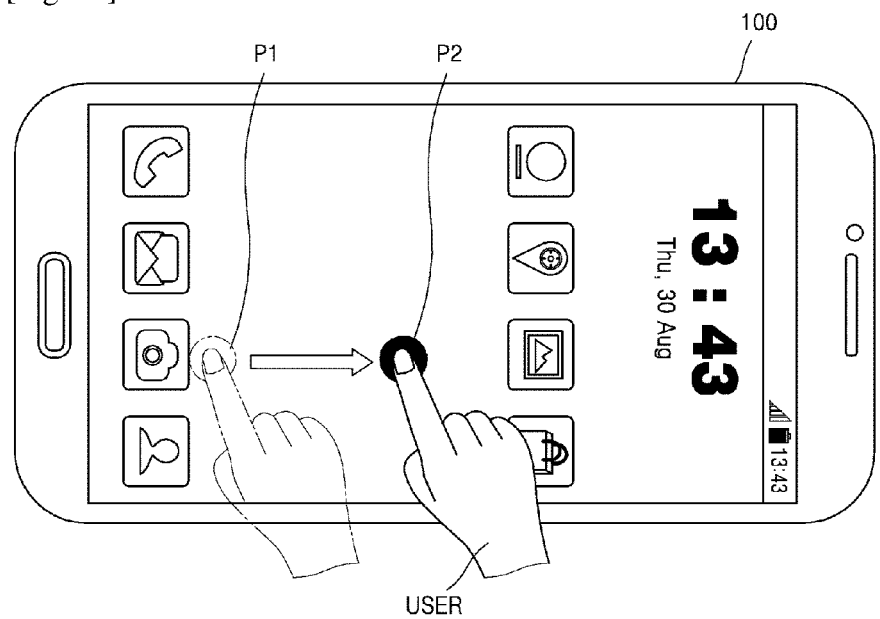

[Fig. 4]
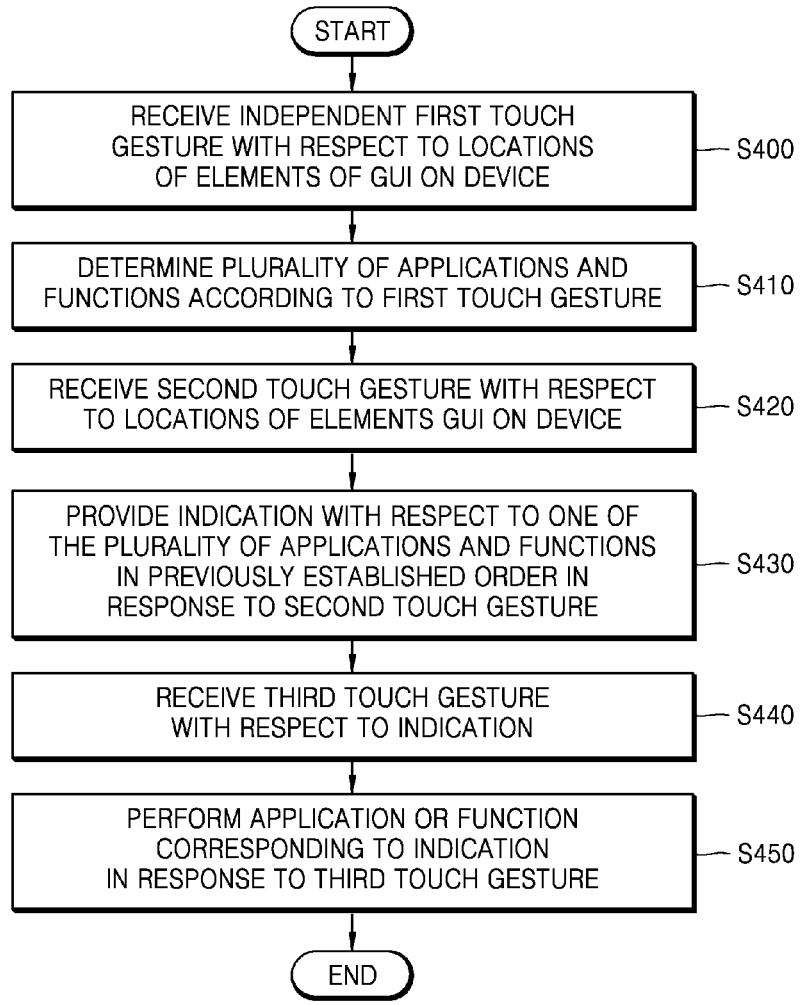
[Fig. 5a]
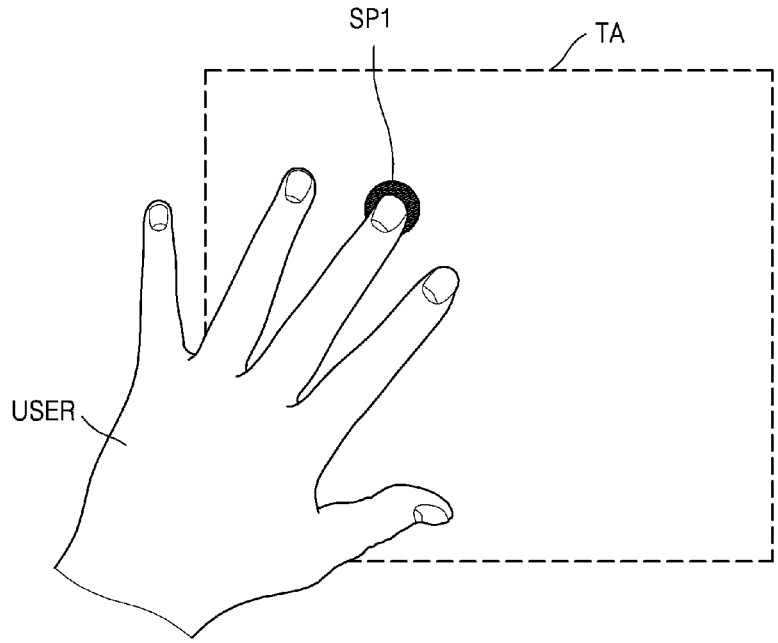

[Fig. 5b]
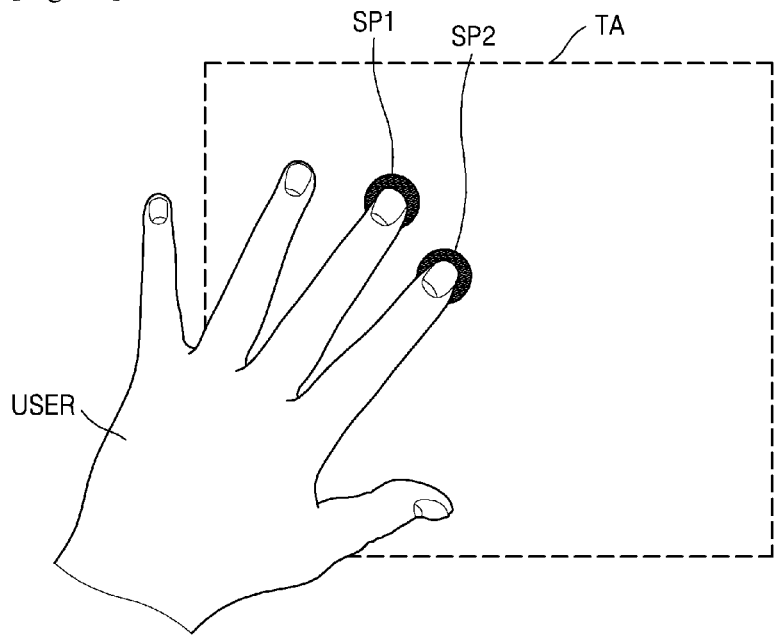
[Fig. 5c]
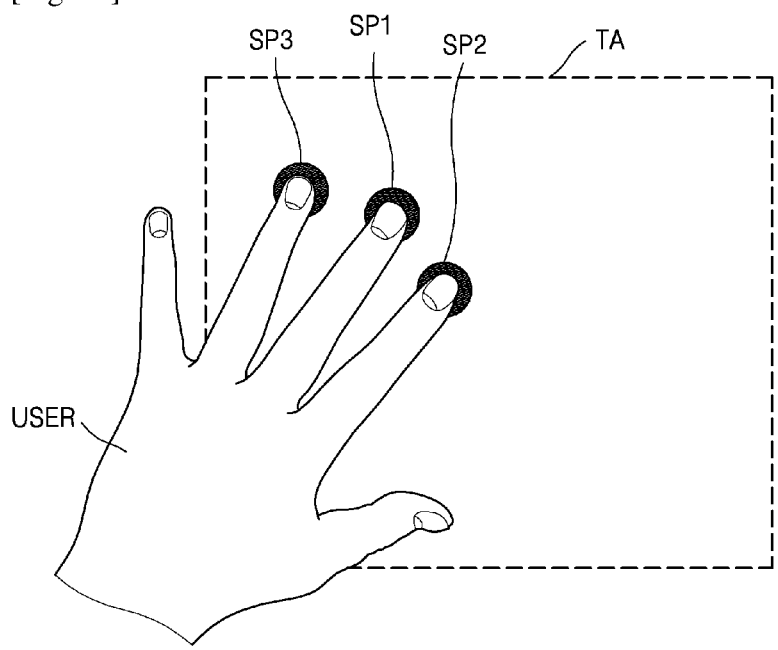

[Fig. 5d]
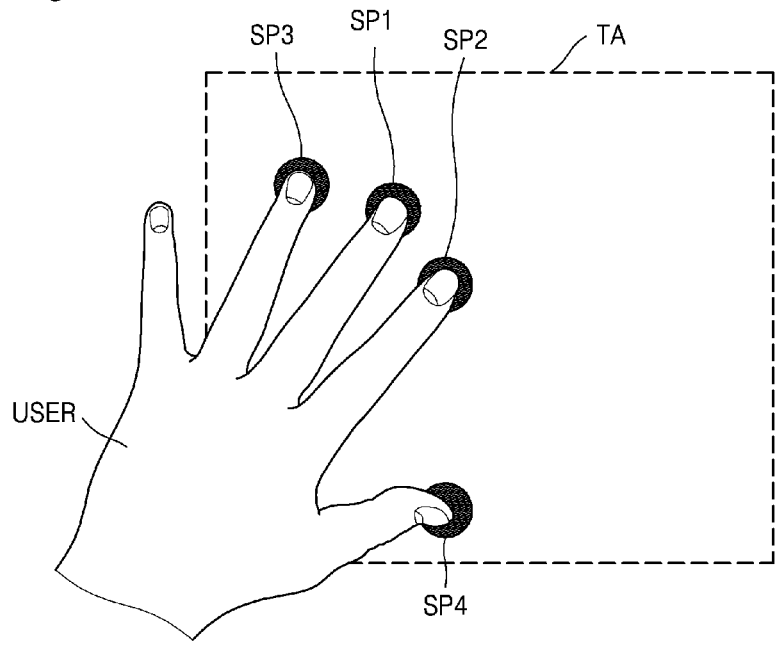
[Fig. 6a]
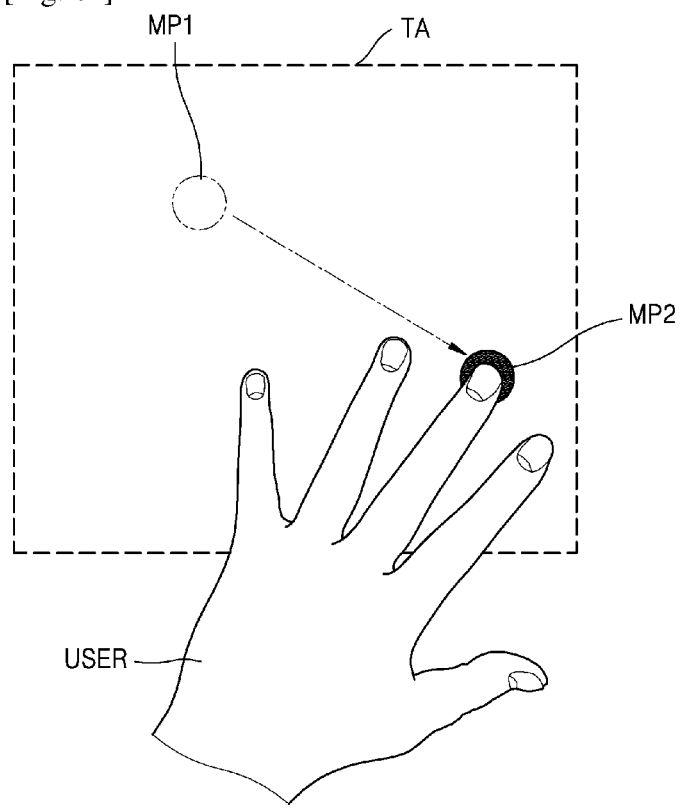

[Fig. 6b]
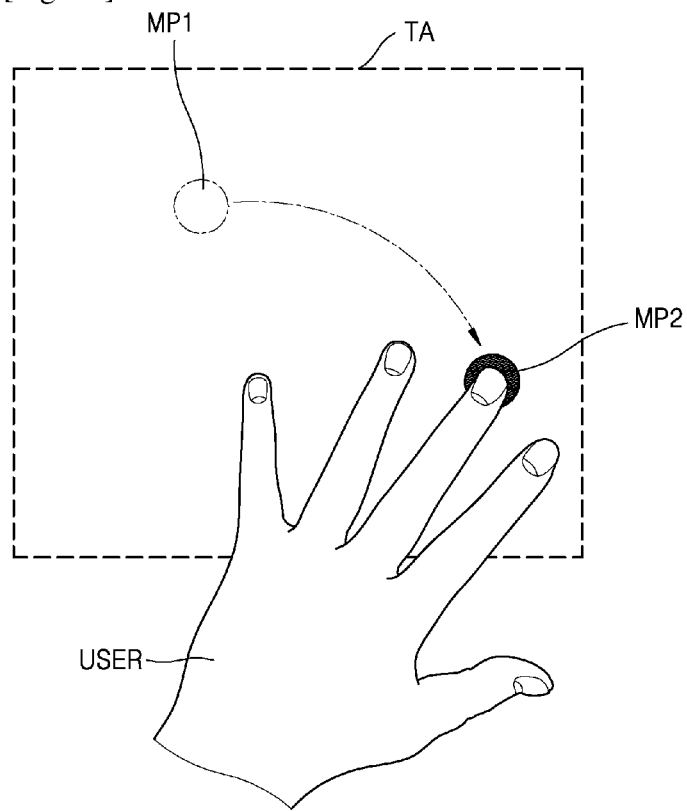
[Fig. 6c]
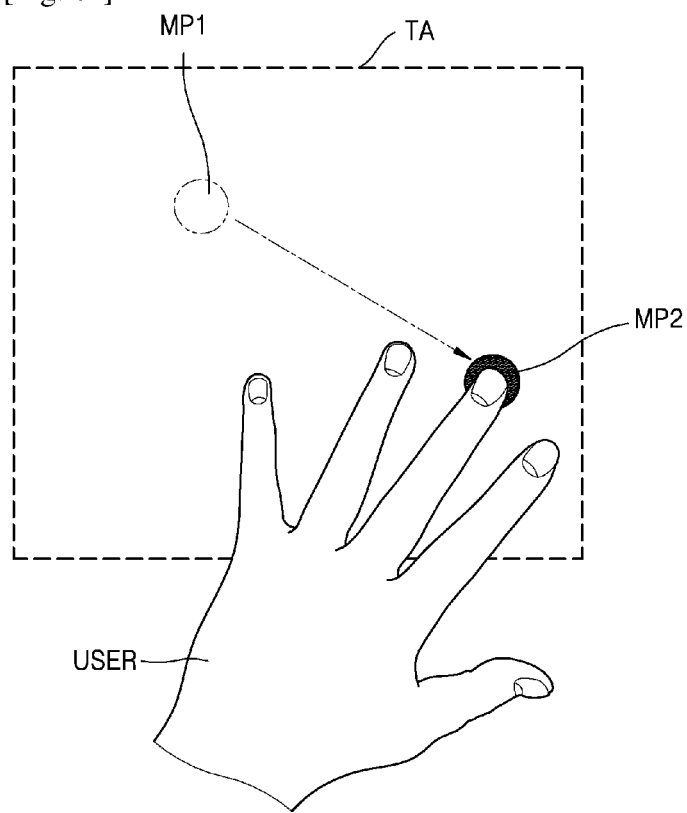

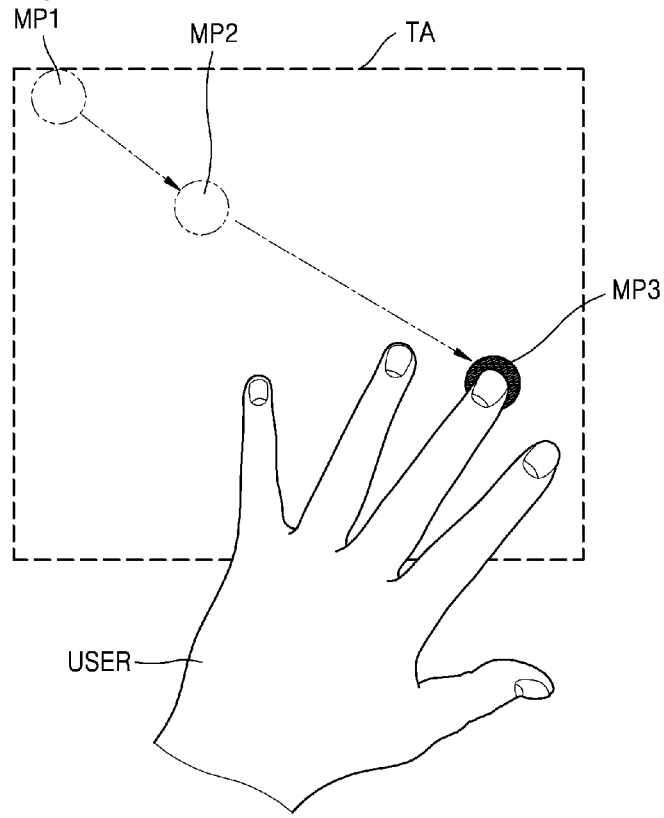
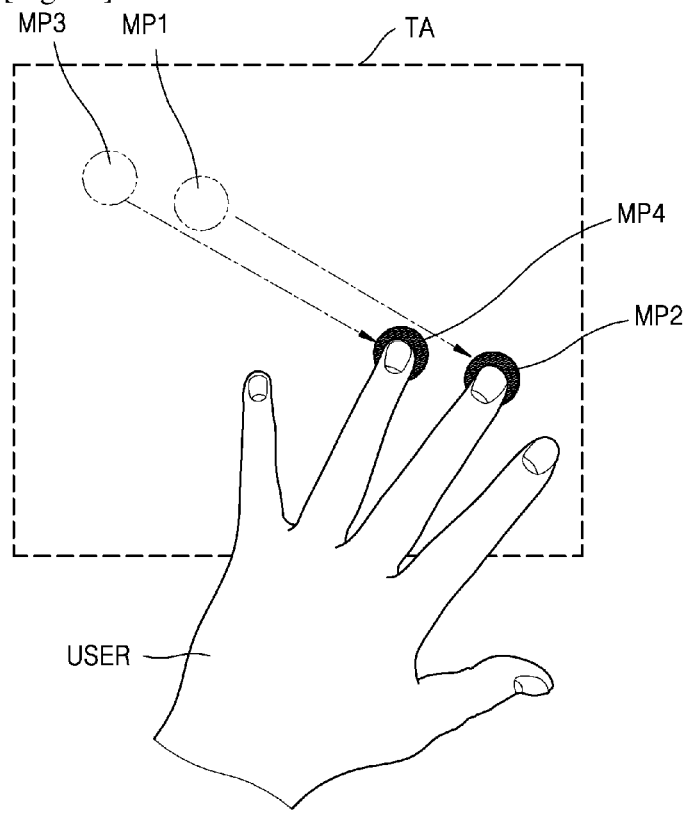

[Fig. 7a]
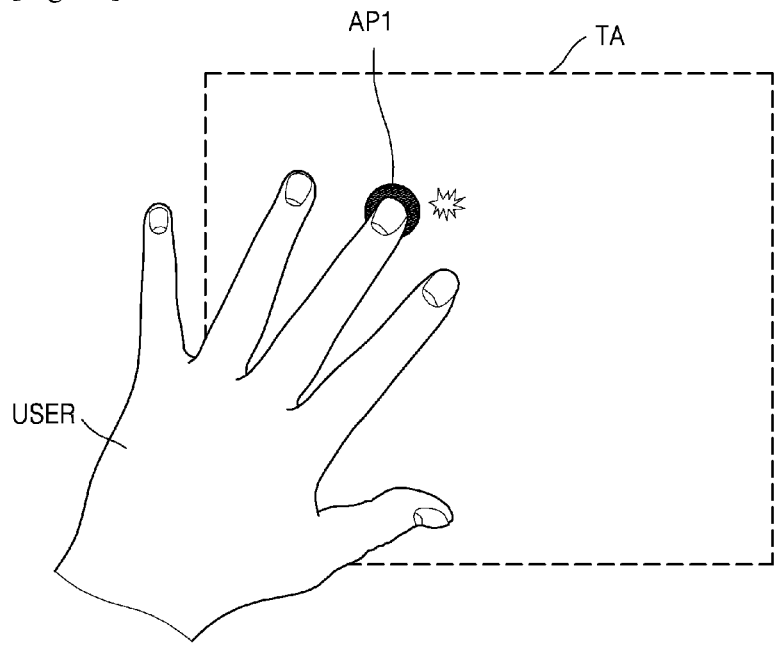
[Fig. 7b]
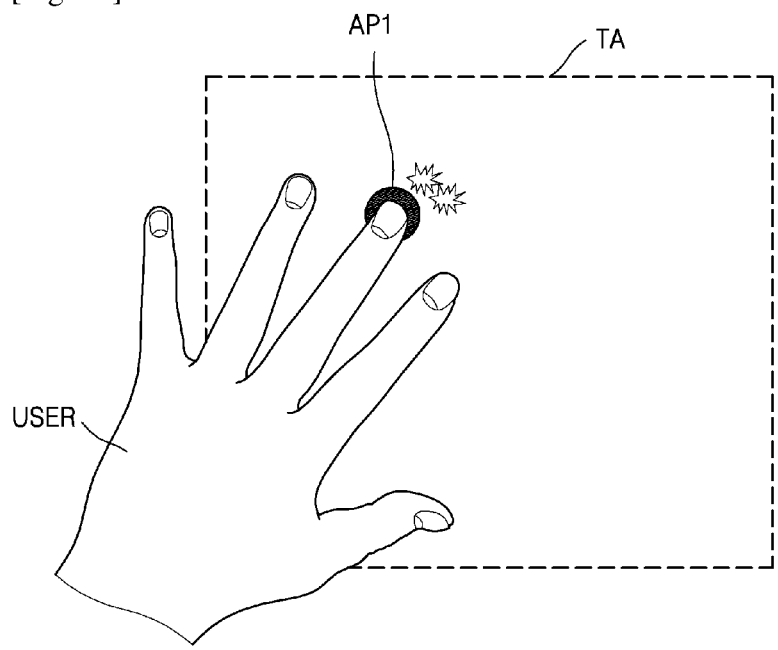

[Fig. 8]
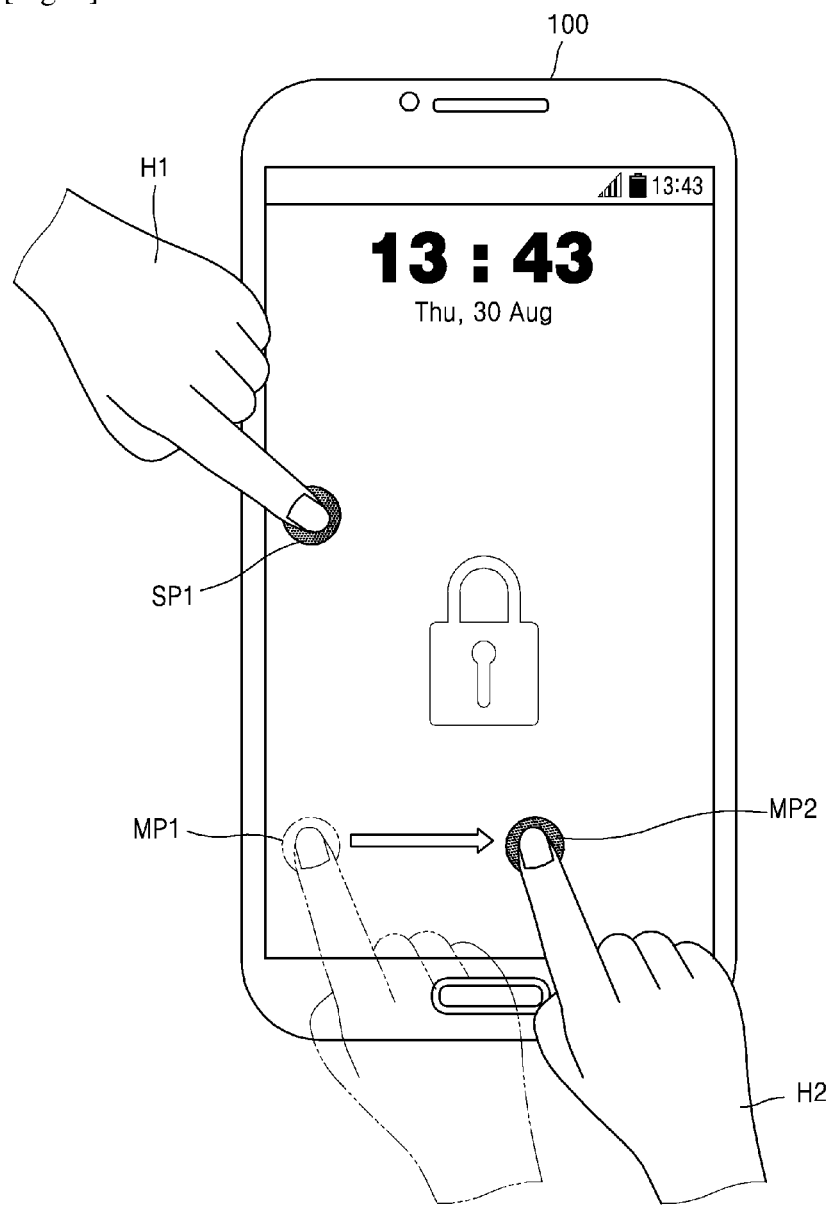

[Fig. 9]
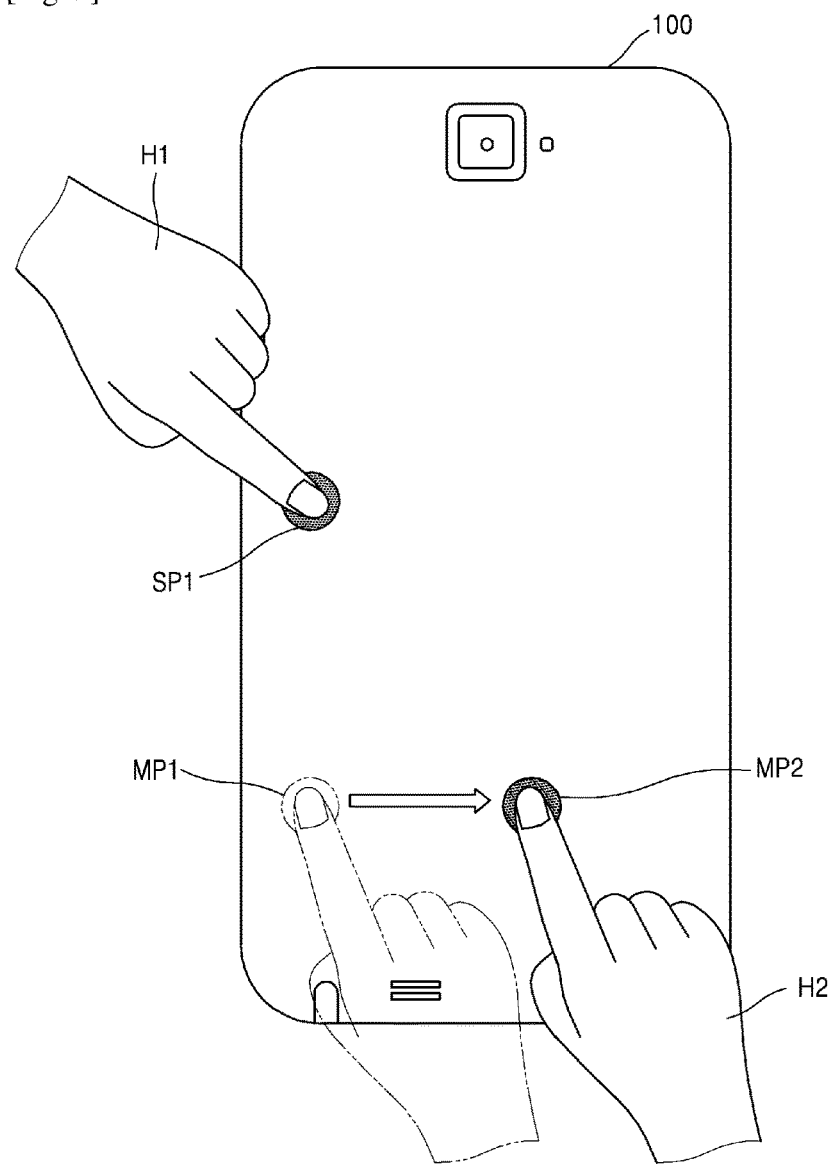
[Fig. 10]
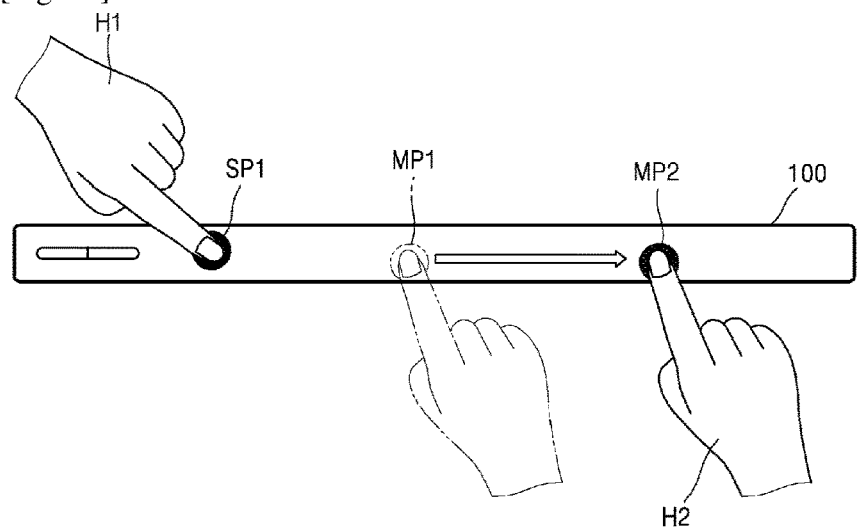

[Fig. 11]
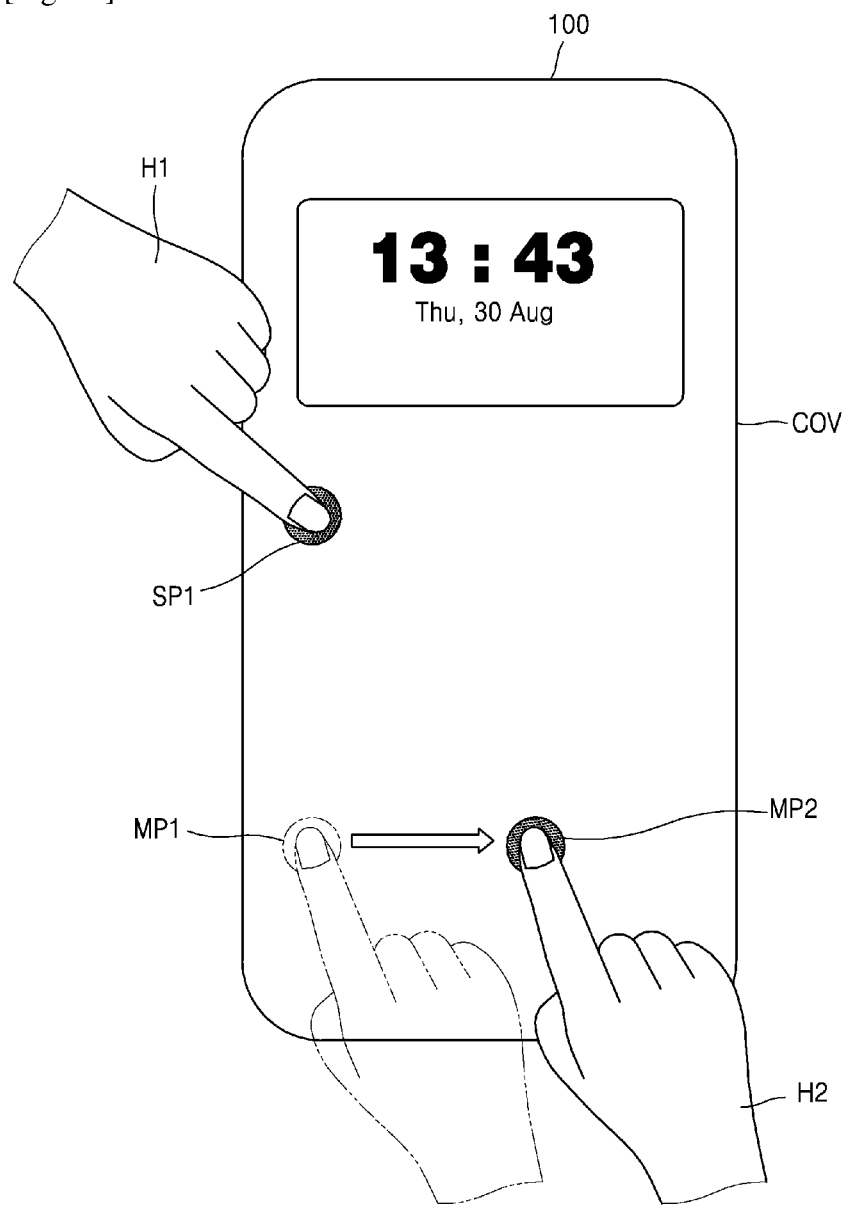

[Fig. 12]
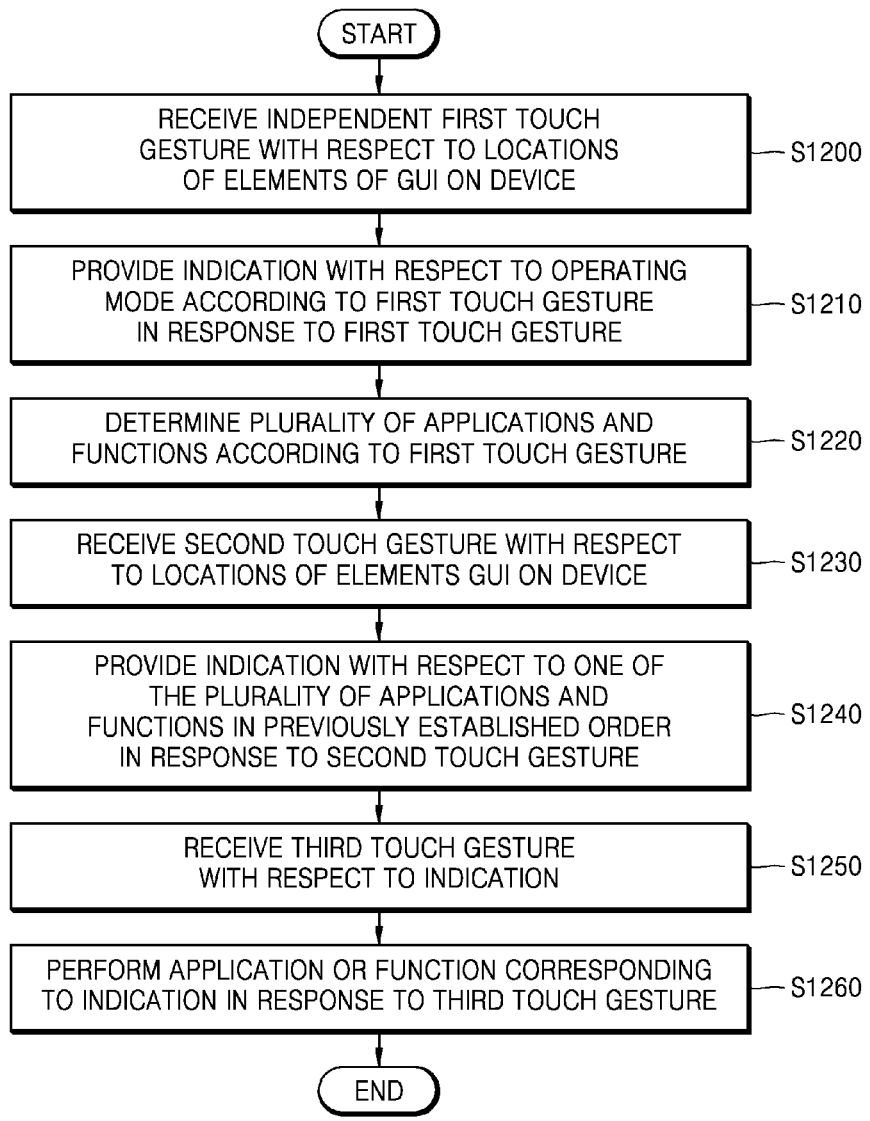
[Fig. 13]
| NUMBER OF STABLE POINTS | OPERATING MODE |
|---|---|
| 1 | NAVIGATION MODE |
| 2 | SHORTCUT KEY MODE |
| 3 | HOME FUNCTIONALITY MODE |
| 4 | APPLICATION LAUNCH MODE |

[Fig. 14a]
[Fig. 14b]
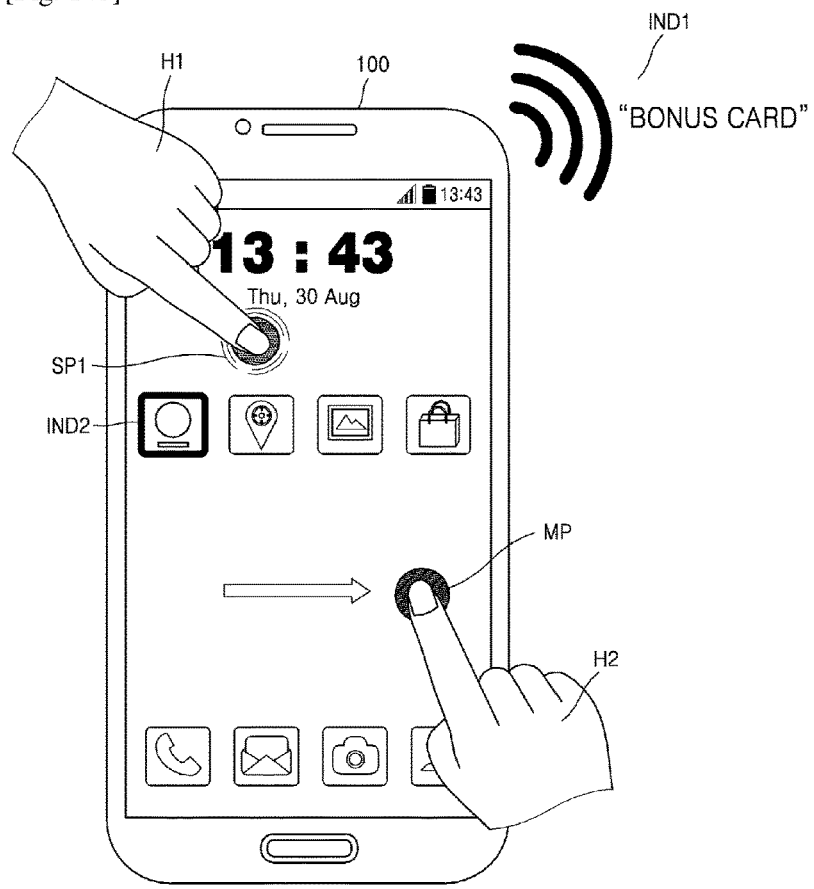

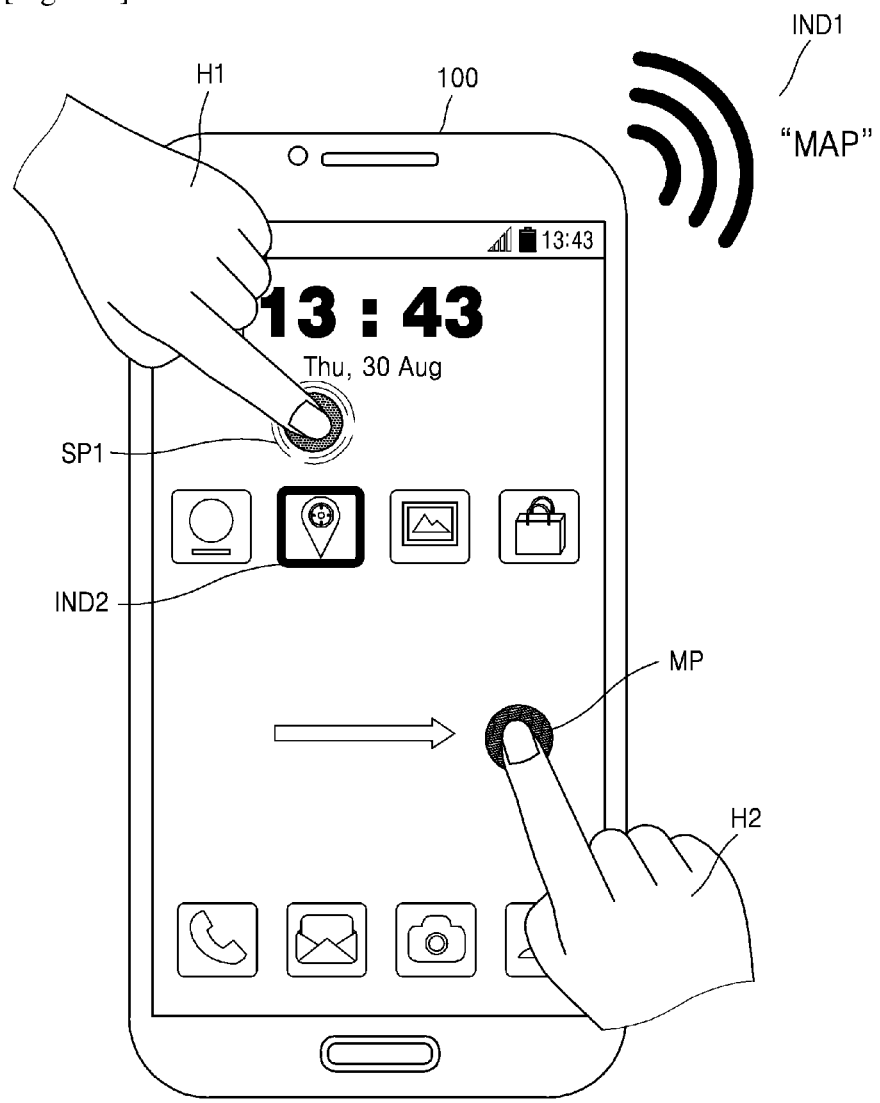
[Fig. 14c]

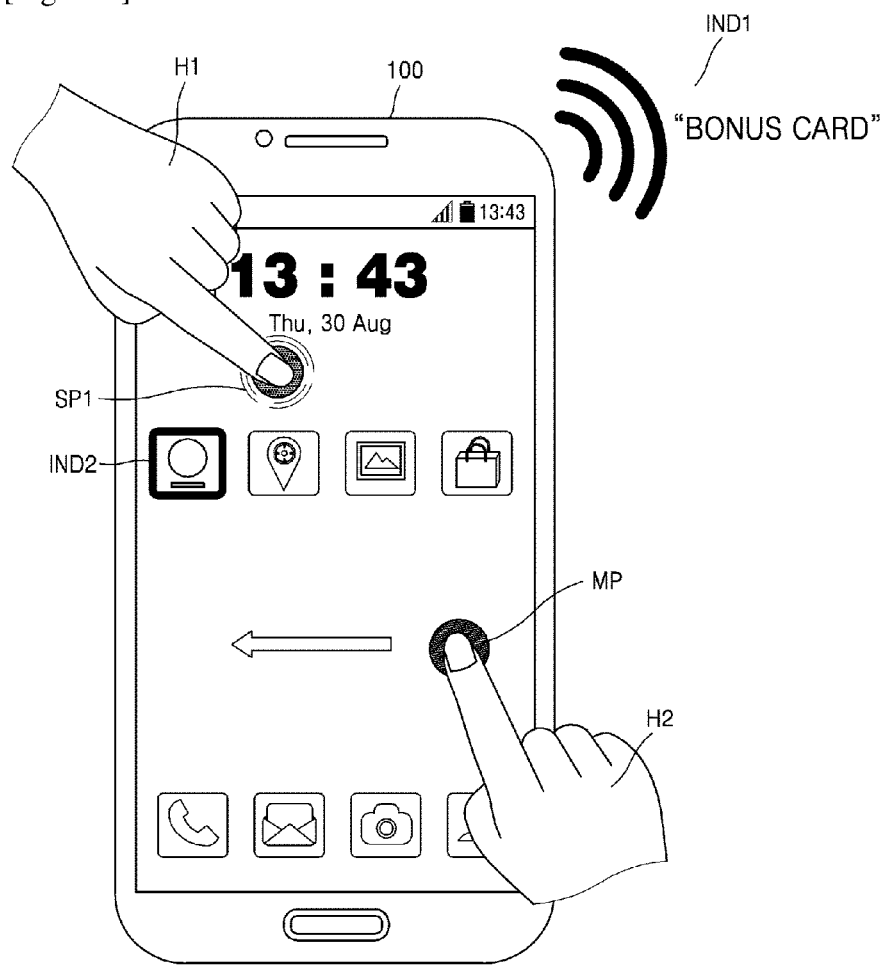
[Fig. 14d]

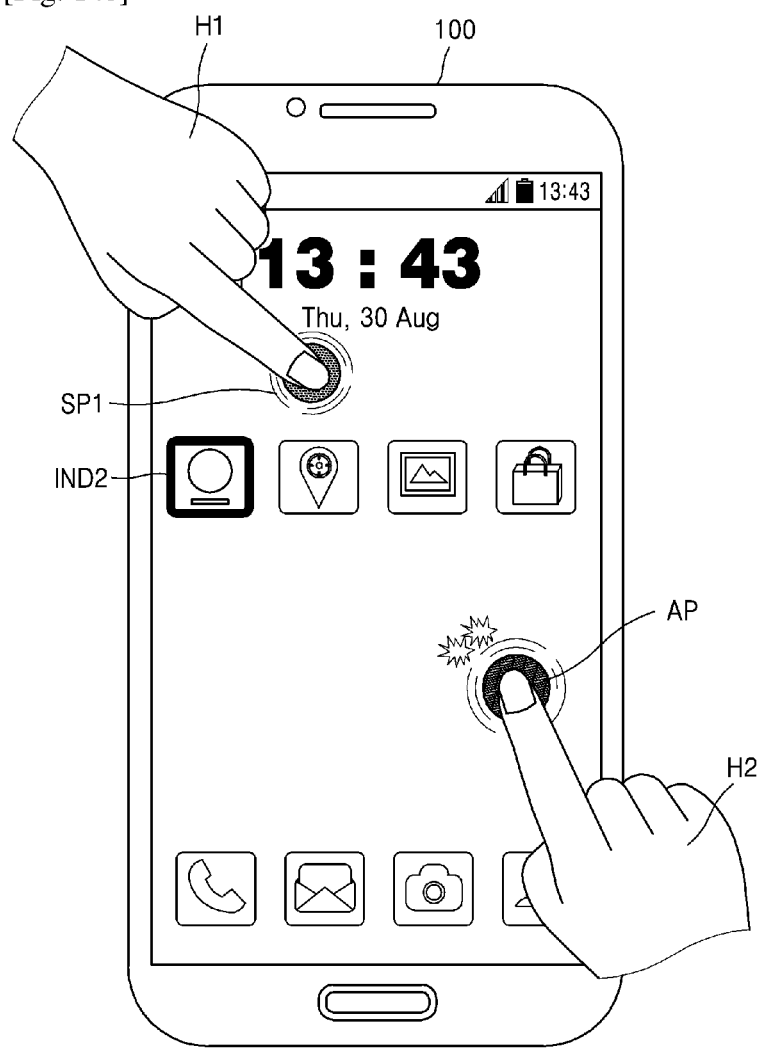

[Fig. 14f]
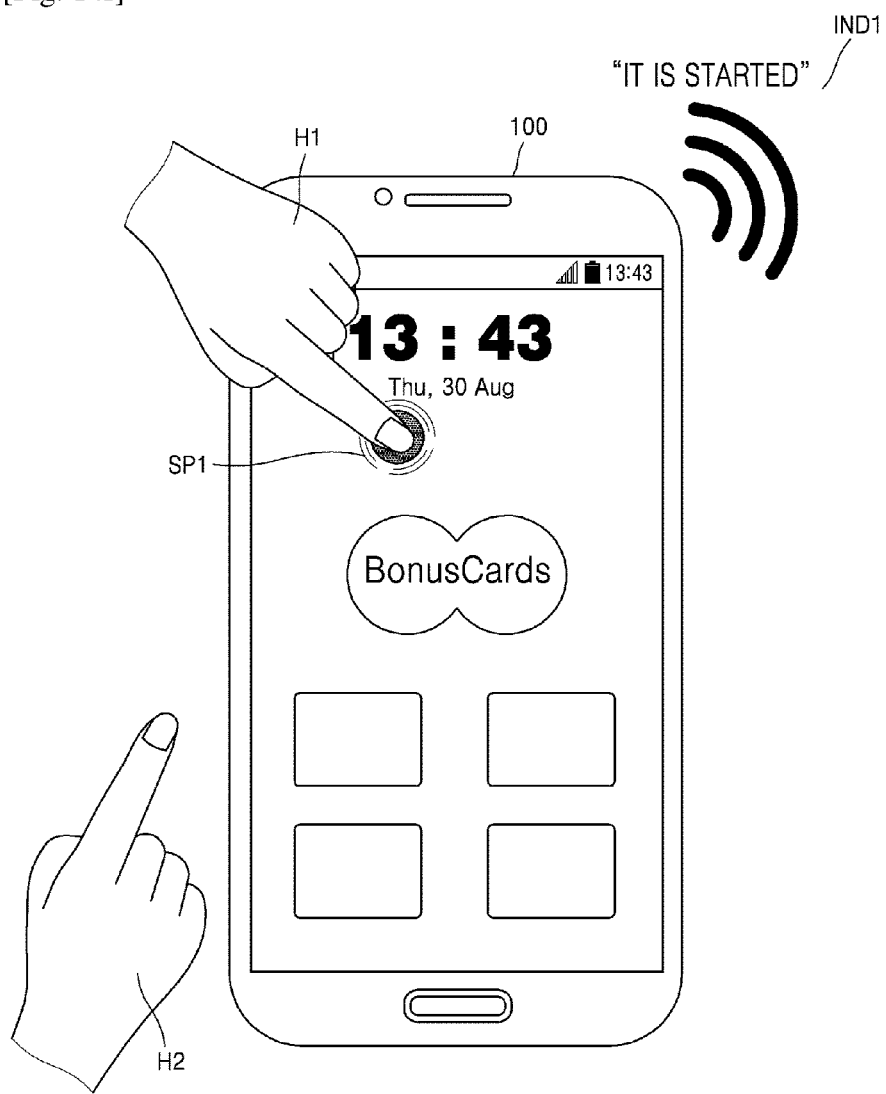

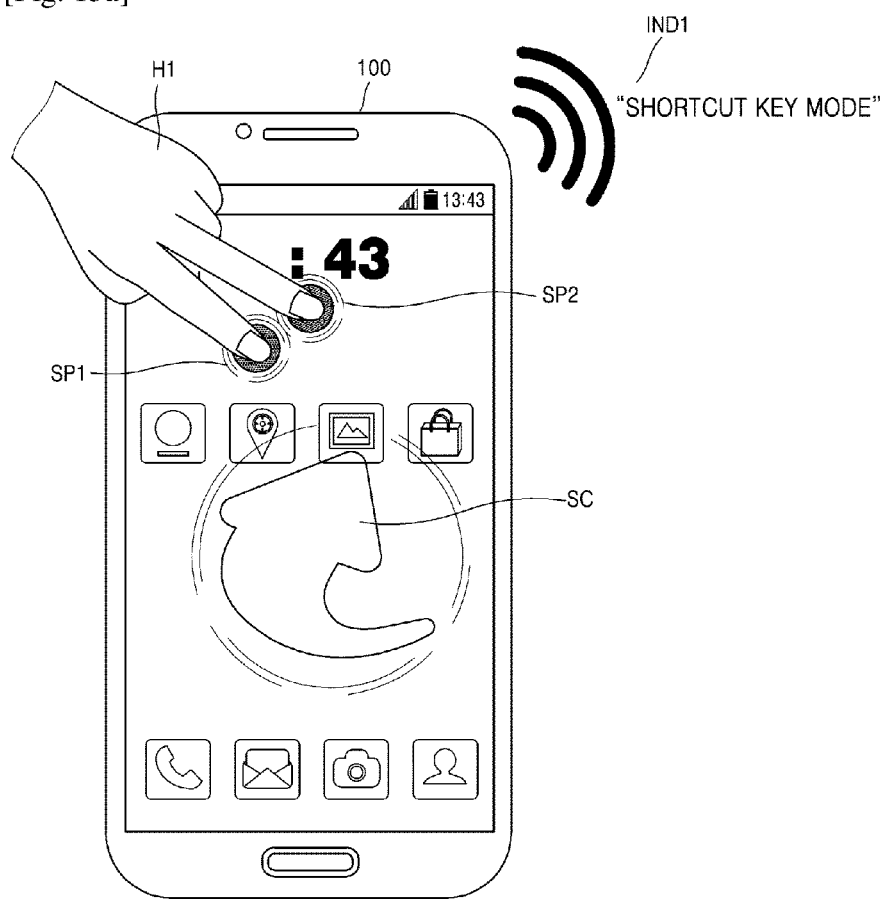
[Fig. 15a]

[Fig. 15b]
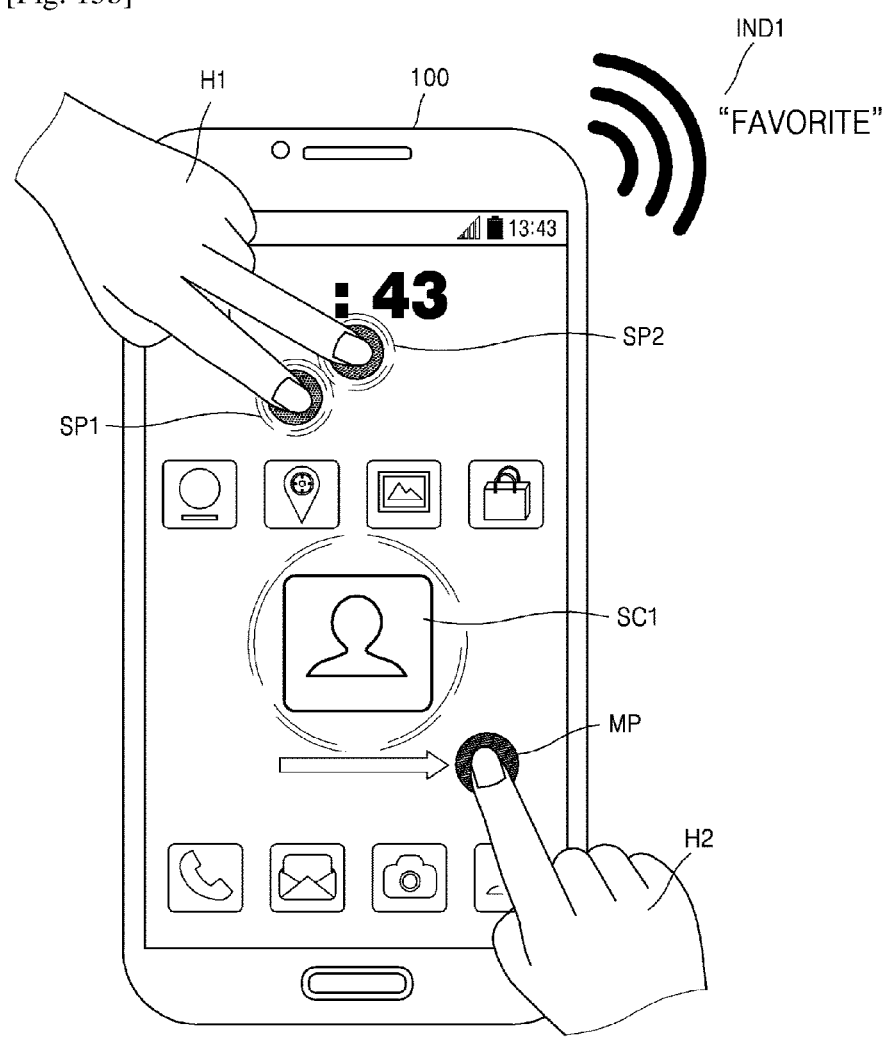

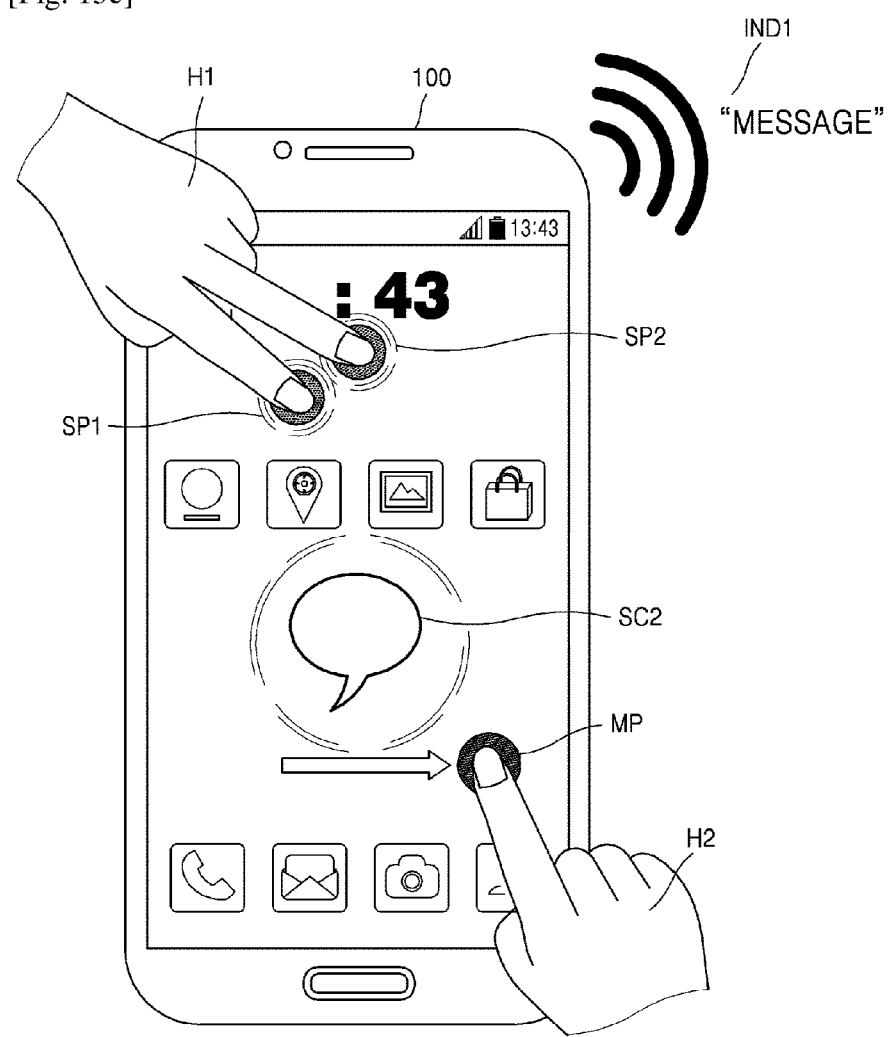
[Fig. 15c]

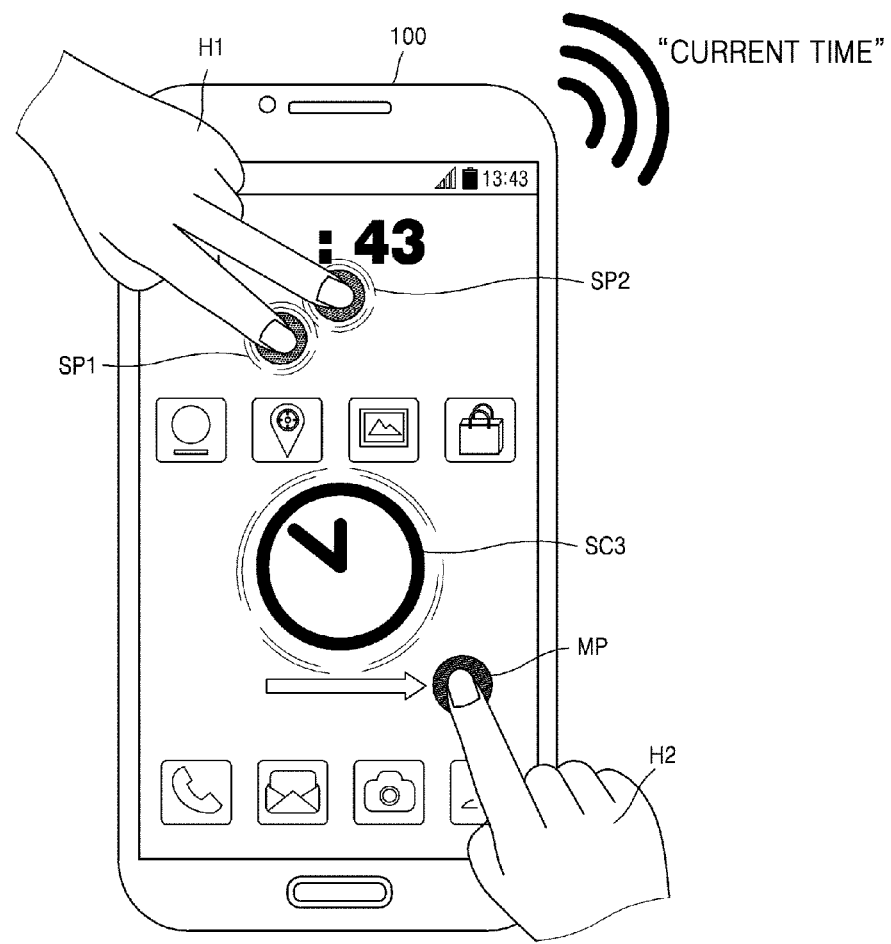
[Fig. 15d]

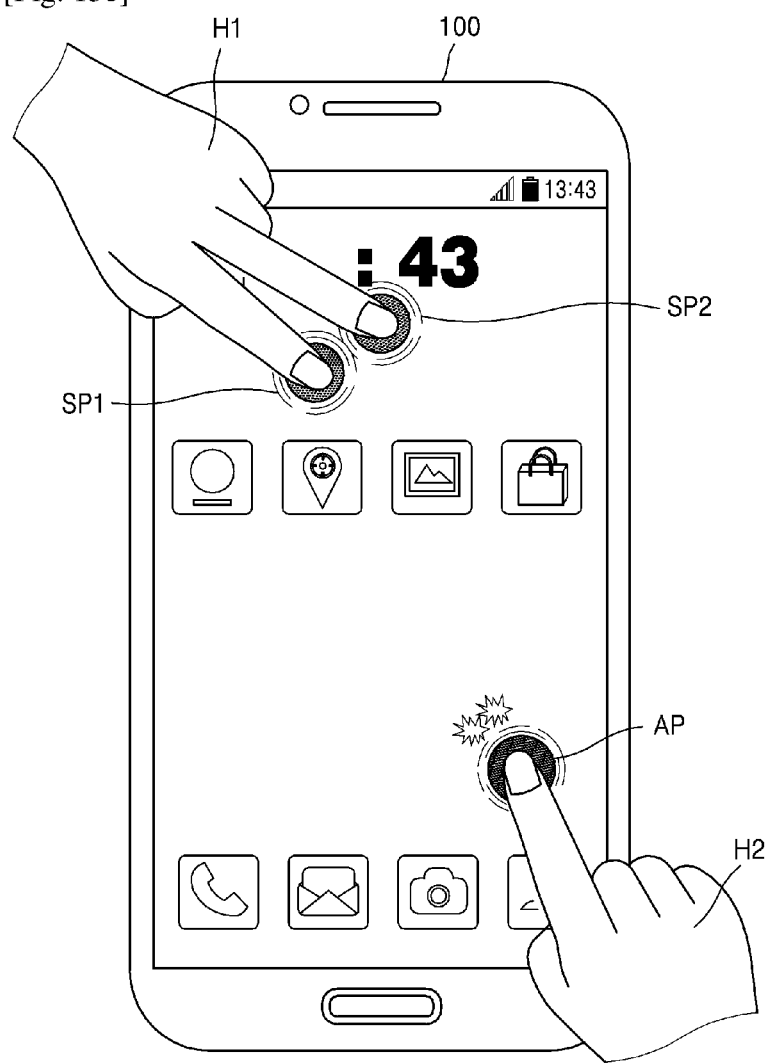
[Fig. 15e]

[Fig. 15f]
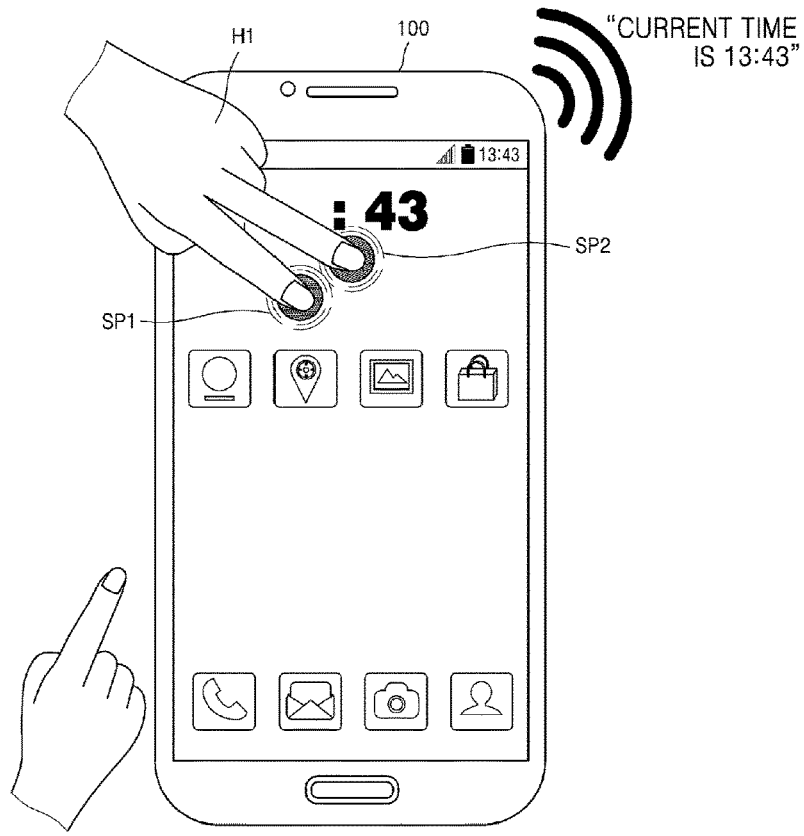
[Fig. 16a]
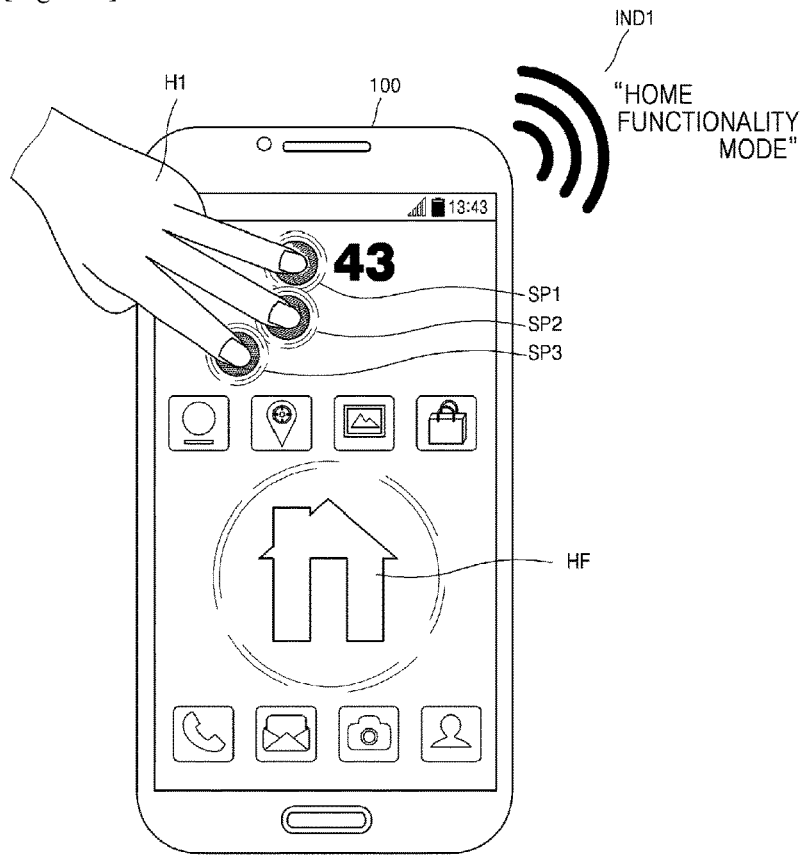

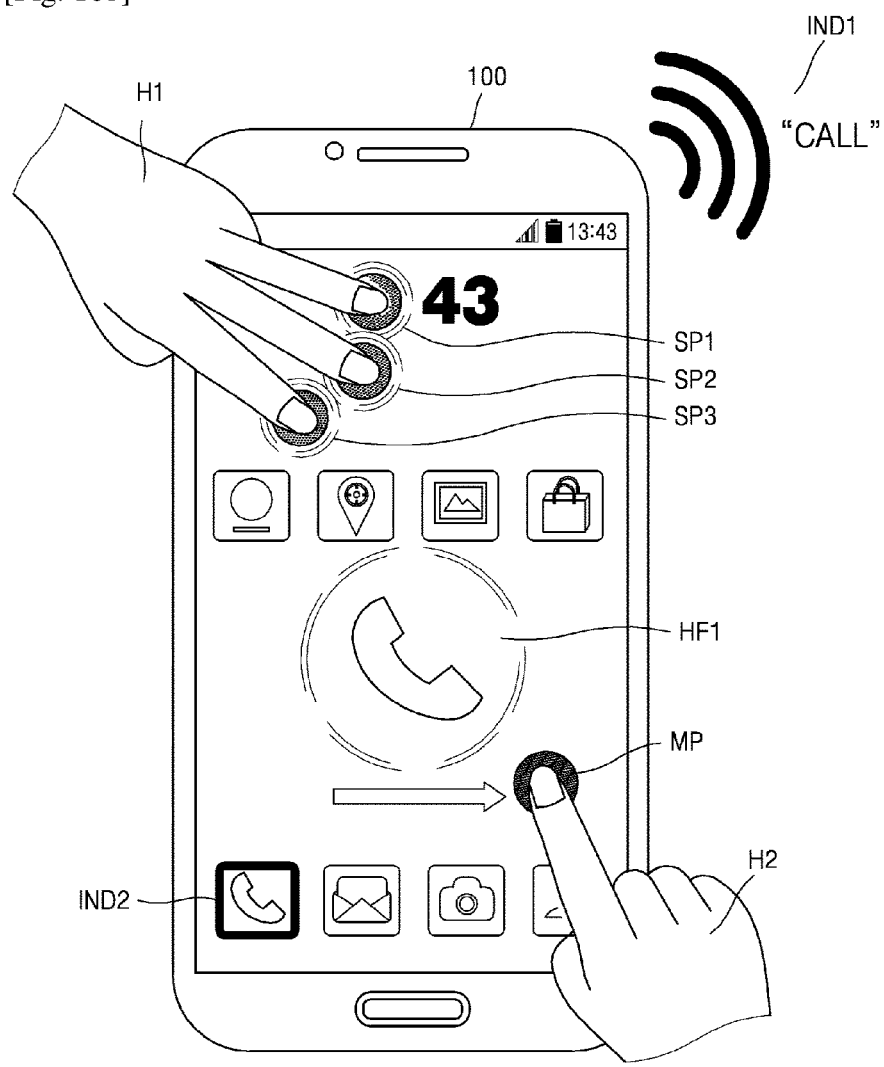
[Fig. 16b]

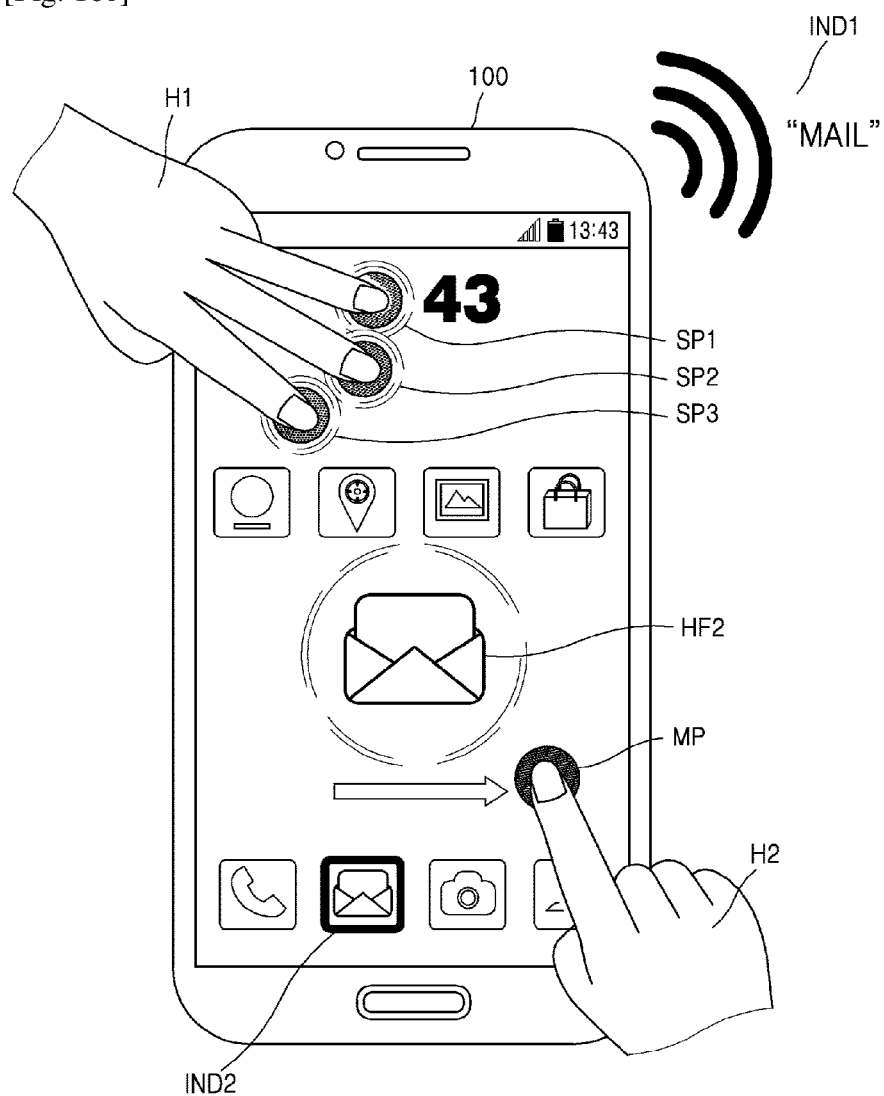
[Fig. 16c]

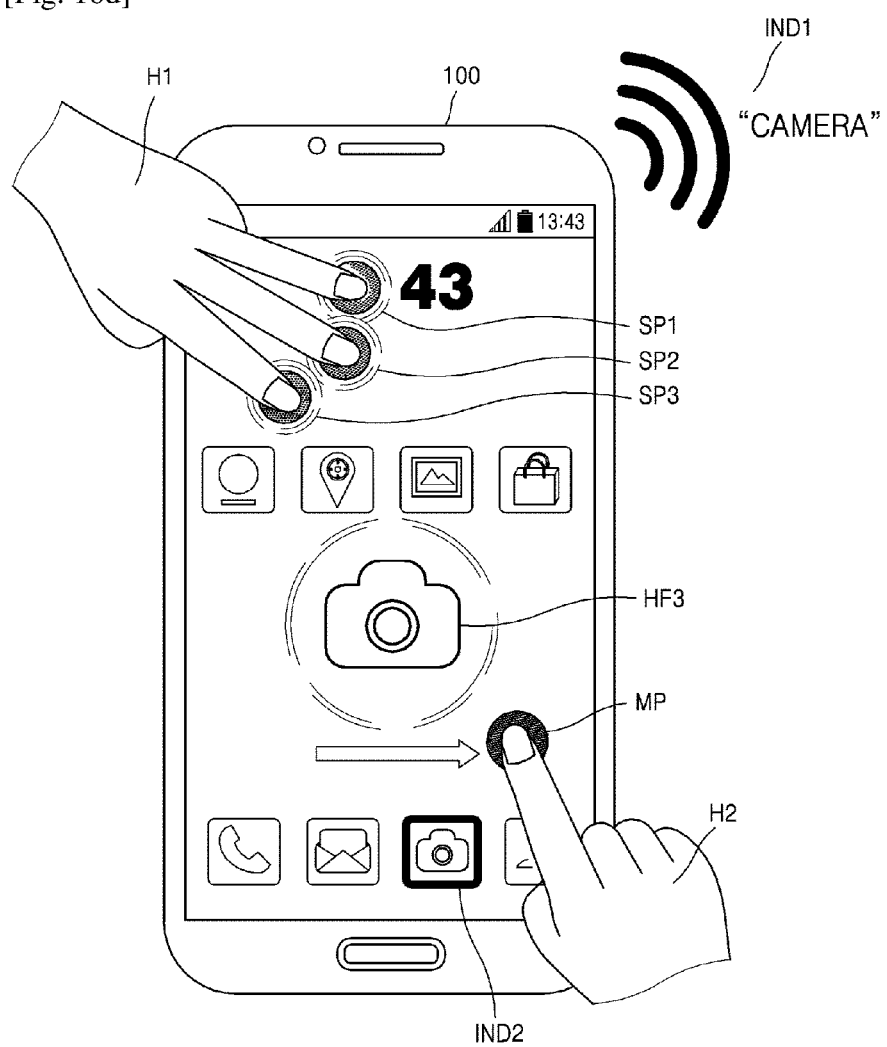
[Fig. 16d]

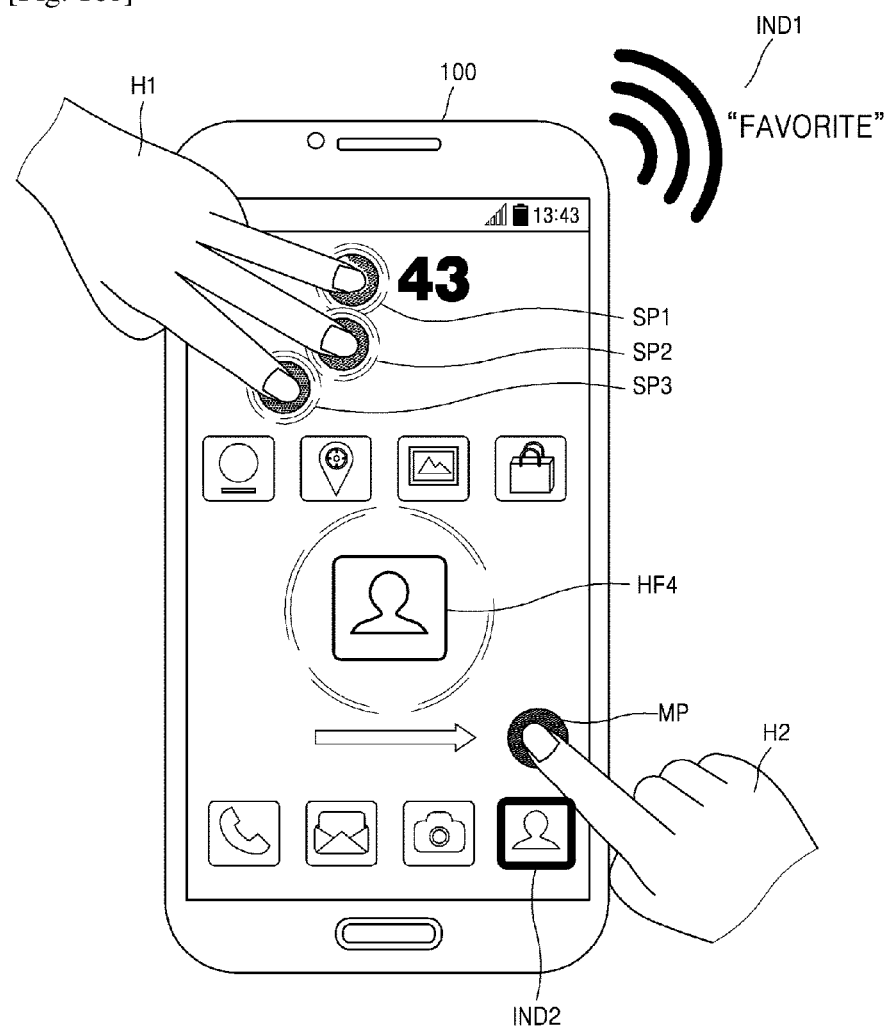
[Fig. 16e]

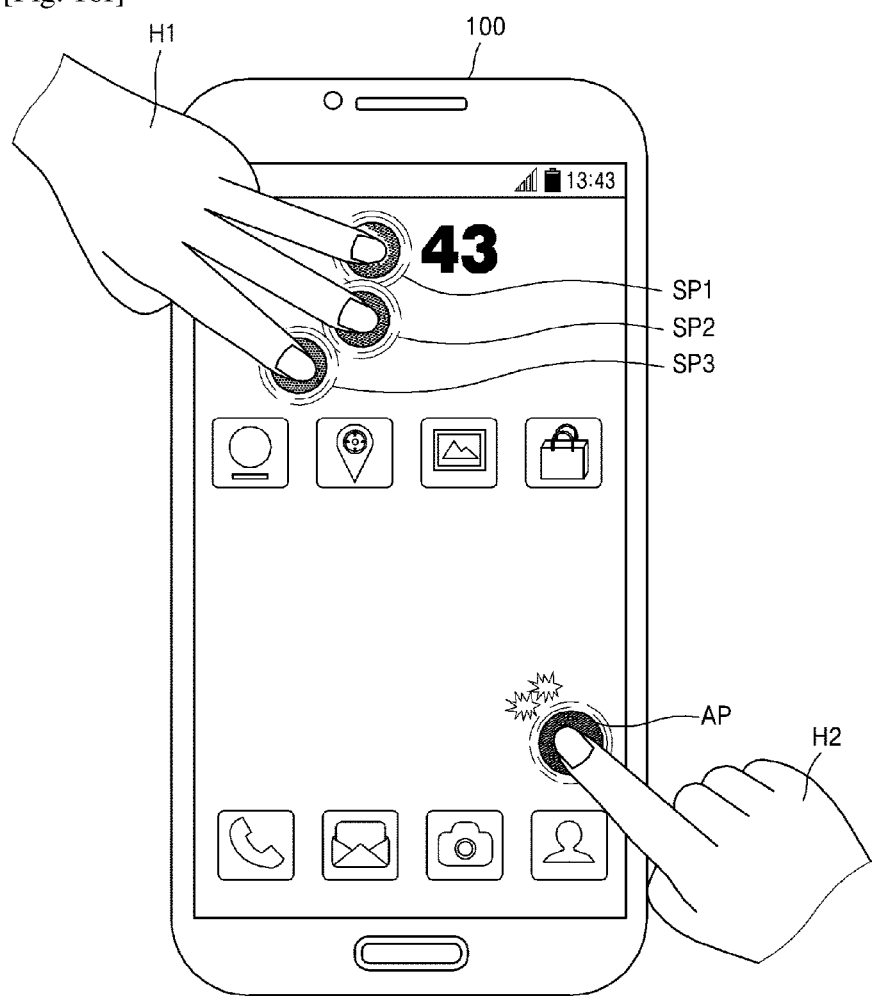
[Fig. 16f]

[Fig. 16g]
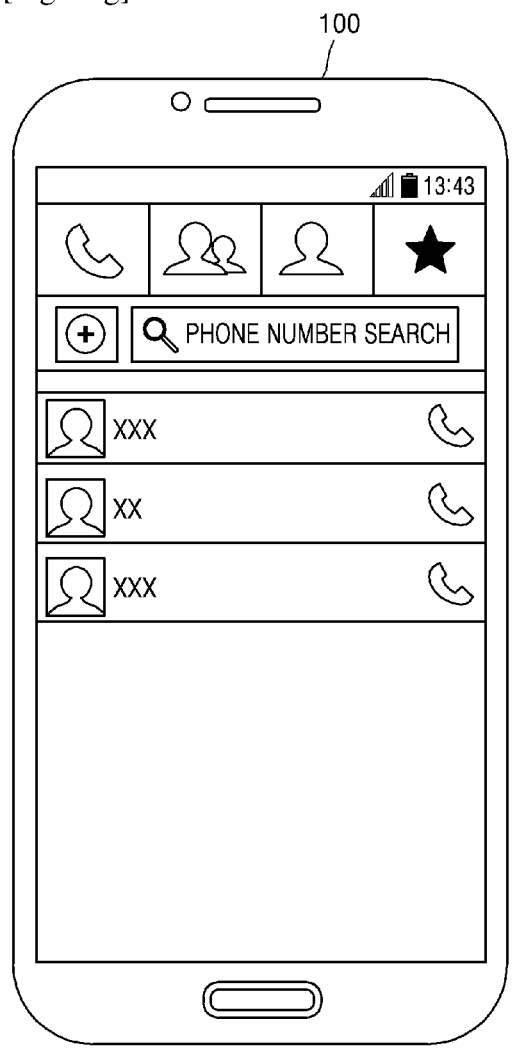

[Fig. 17]
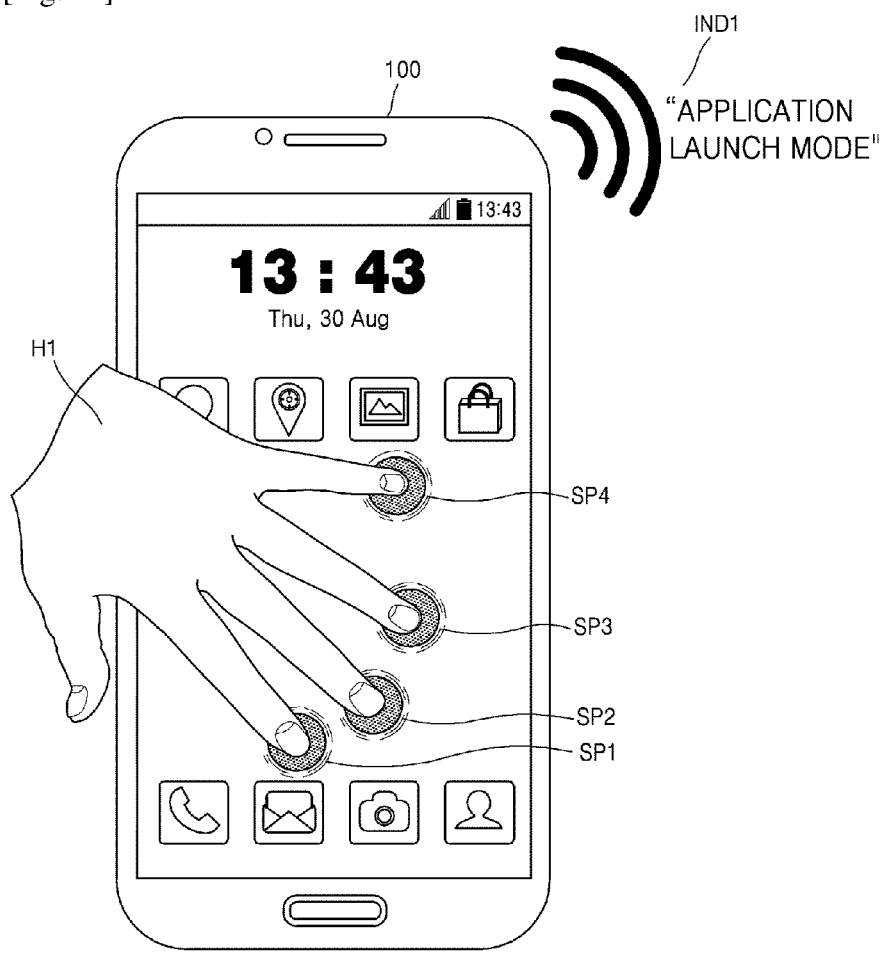

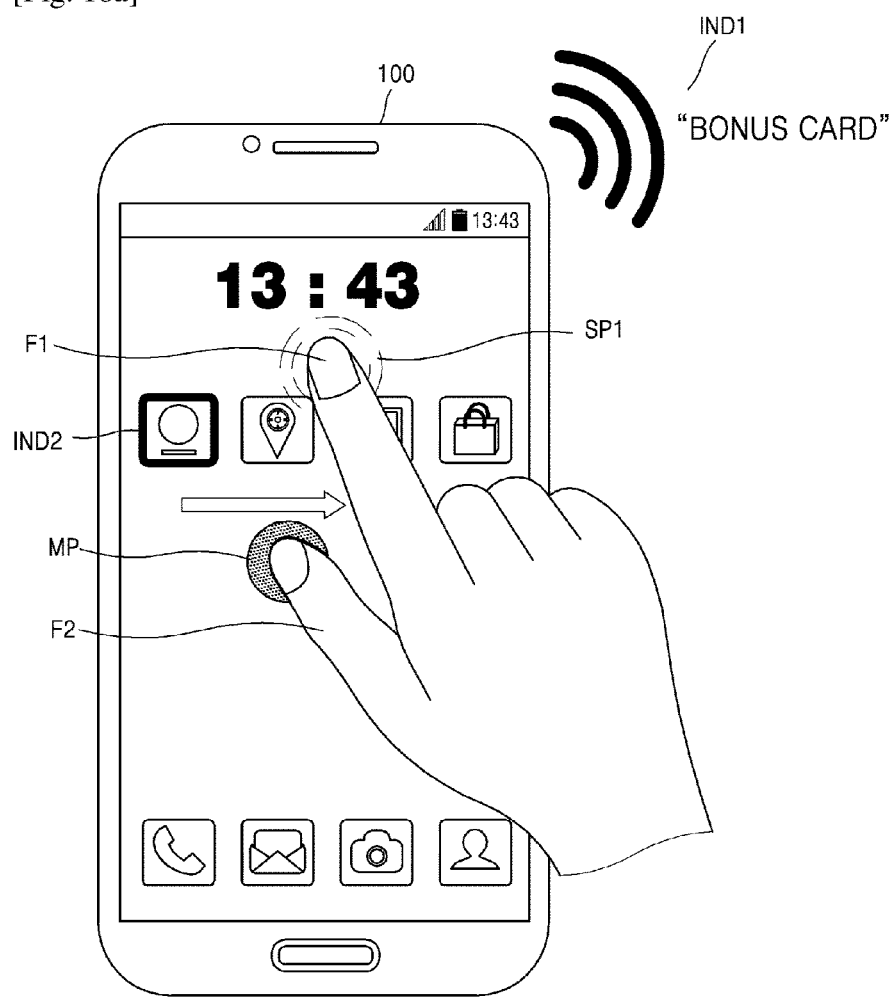
[Fig. 18a]

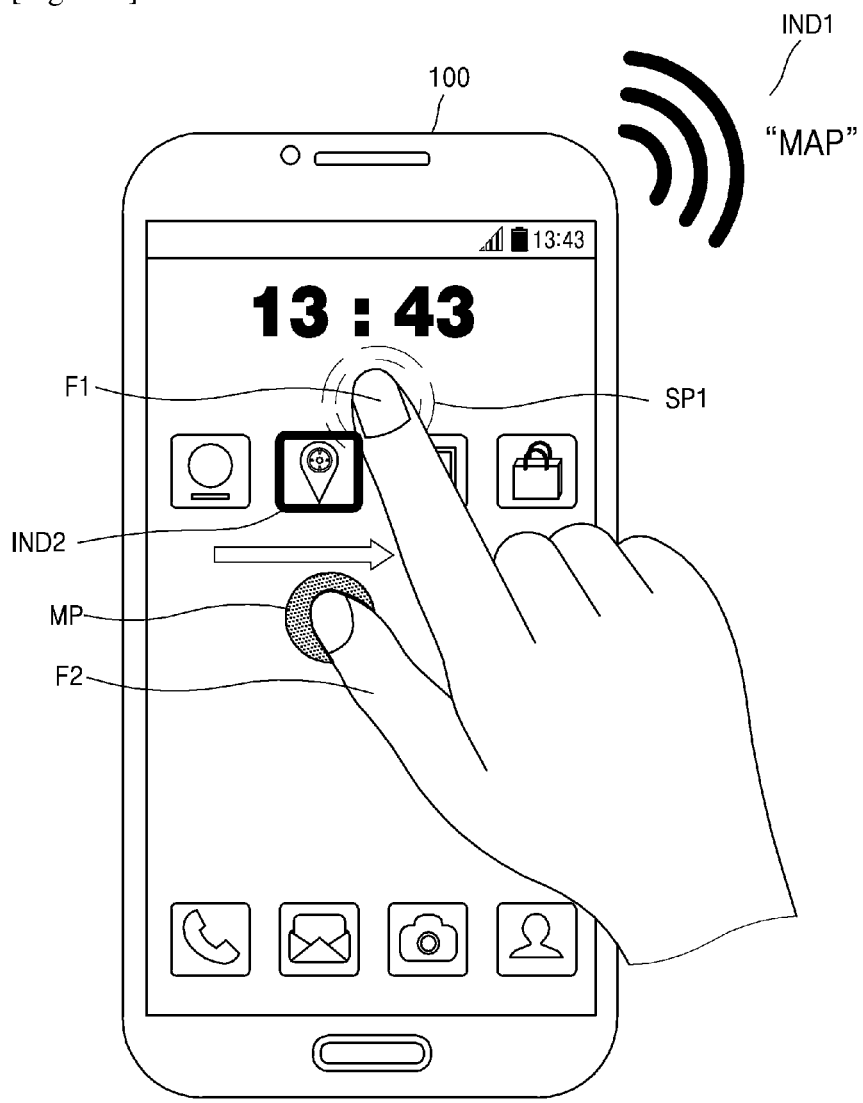
[Fig. 18b]

[Fig. 18c]
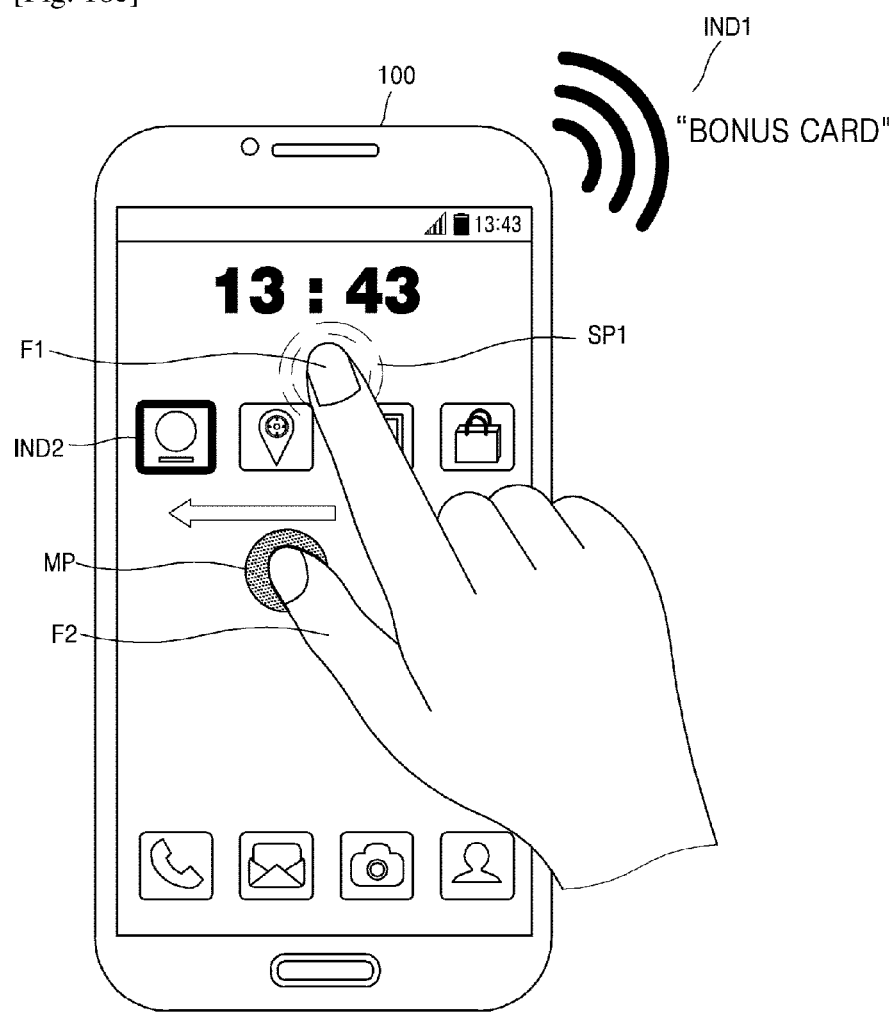

[Fig. 19a]
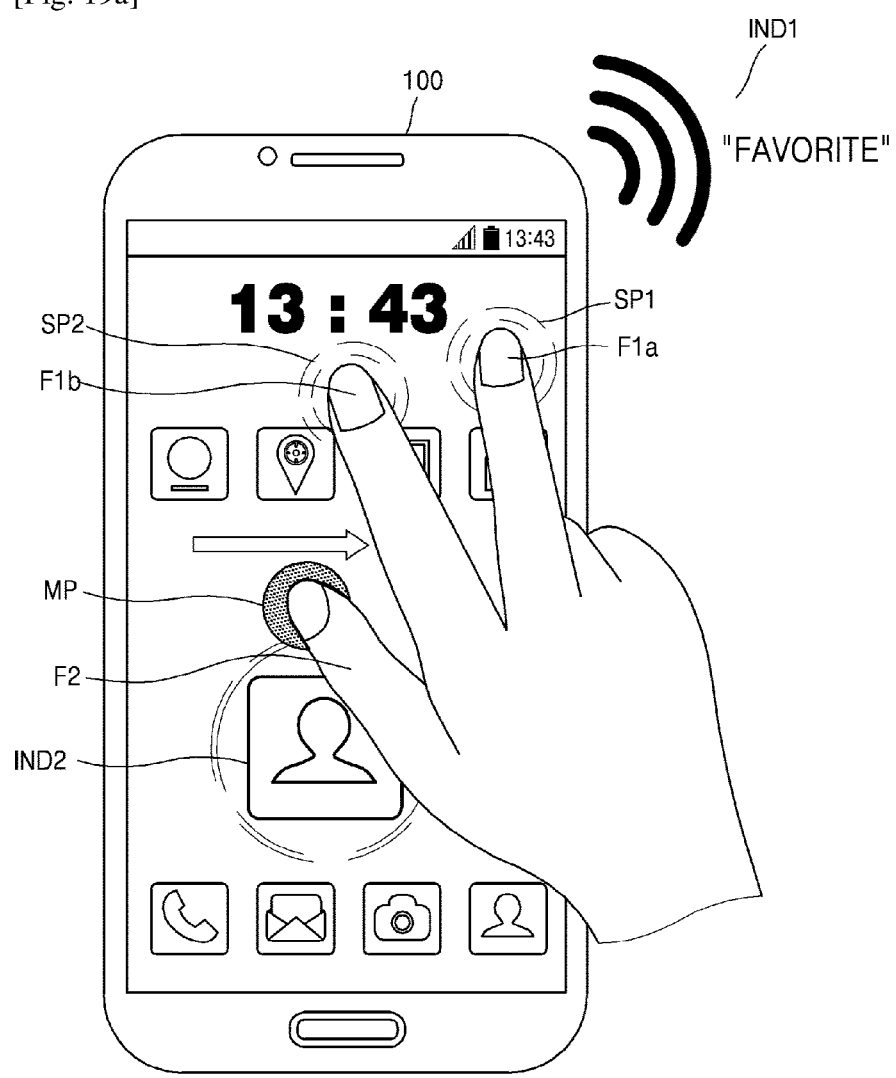

[Fig. 19b]
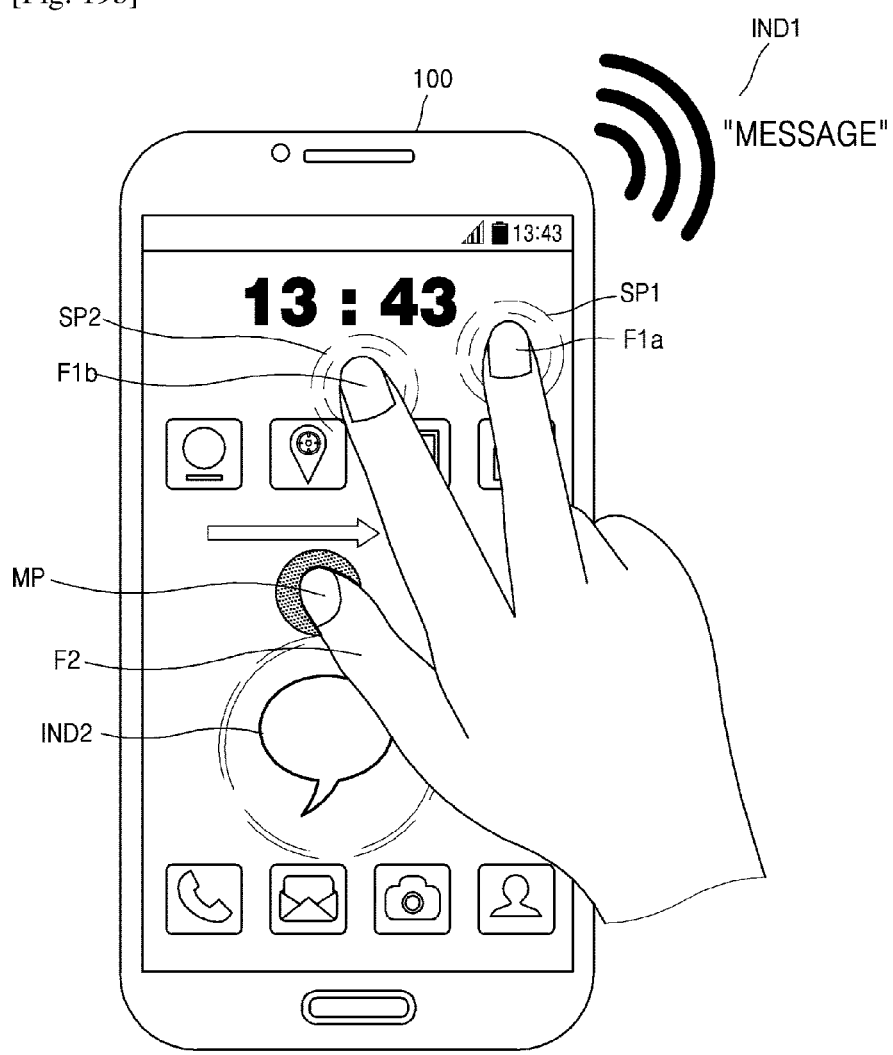

[Fig. 19c]
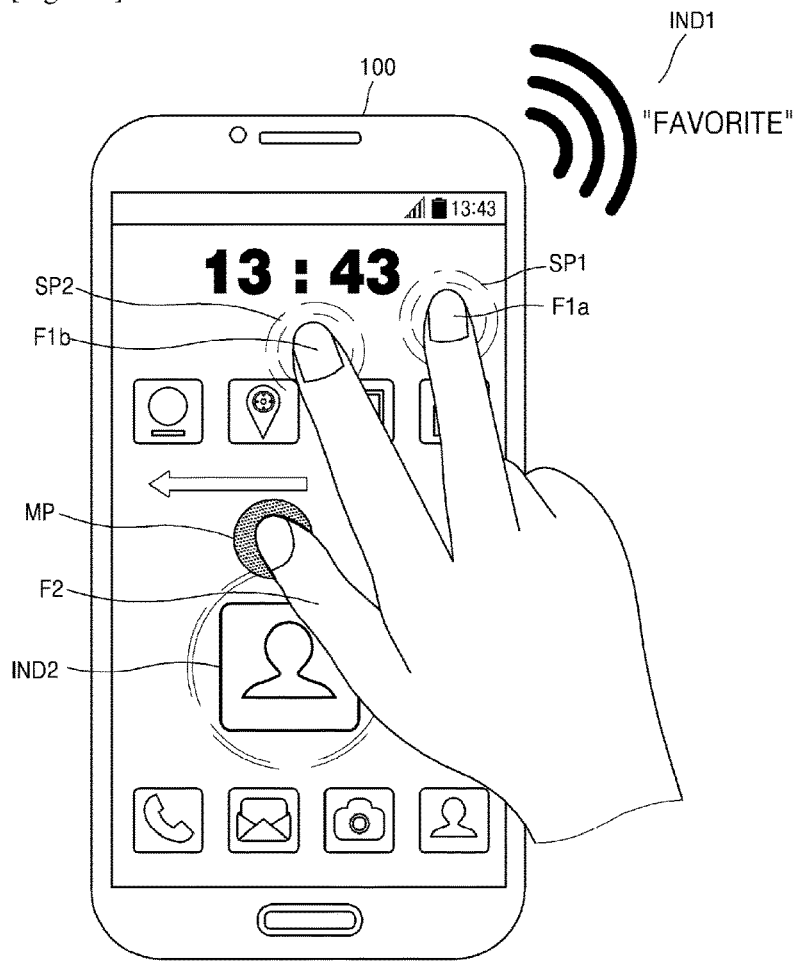
[Fig. 20a]
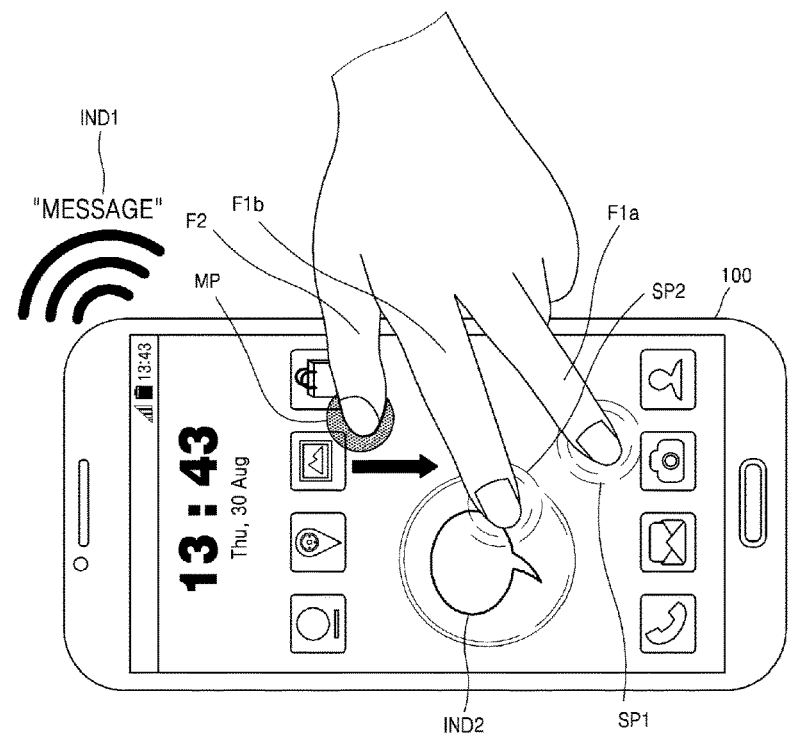

[Fig. 20b]
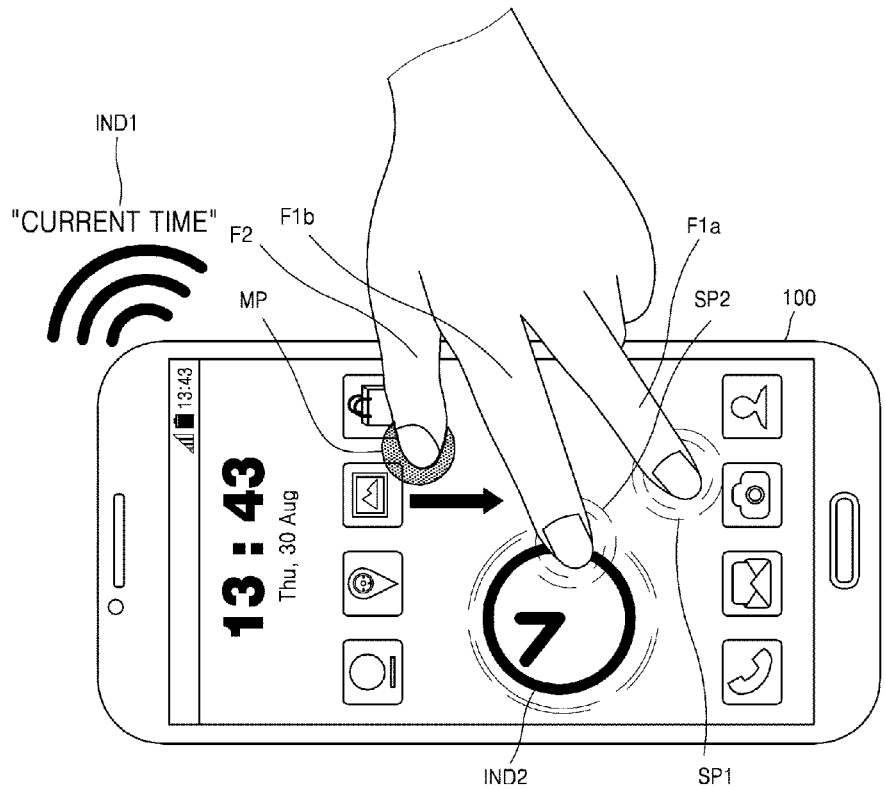
[Fig. 20c]
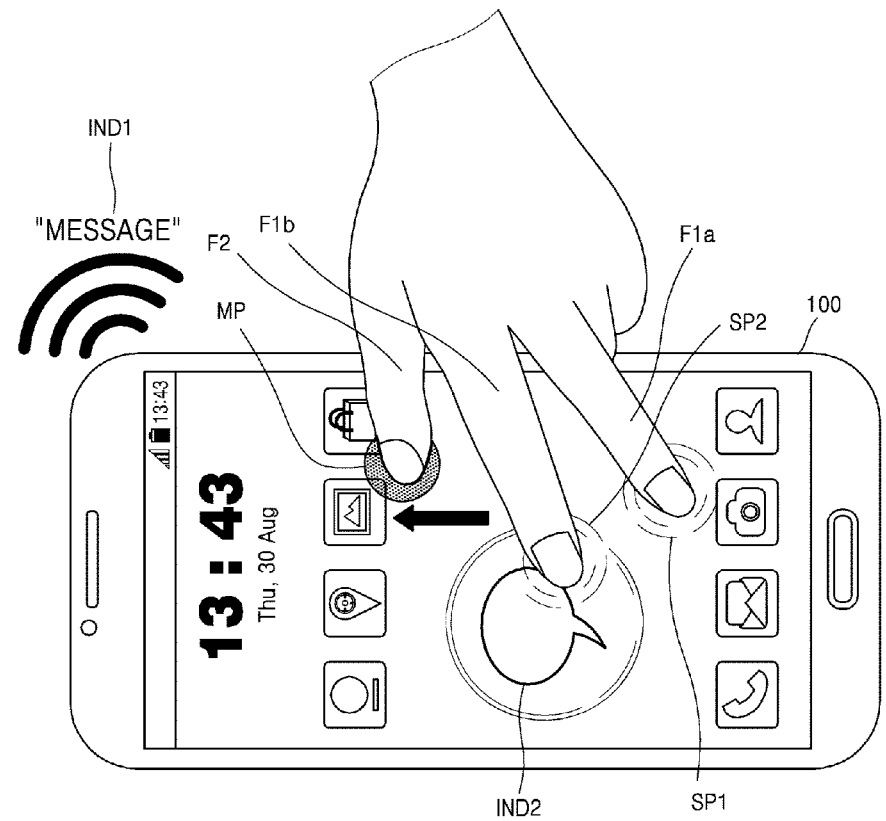

[Fig. 21]
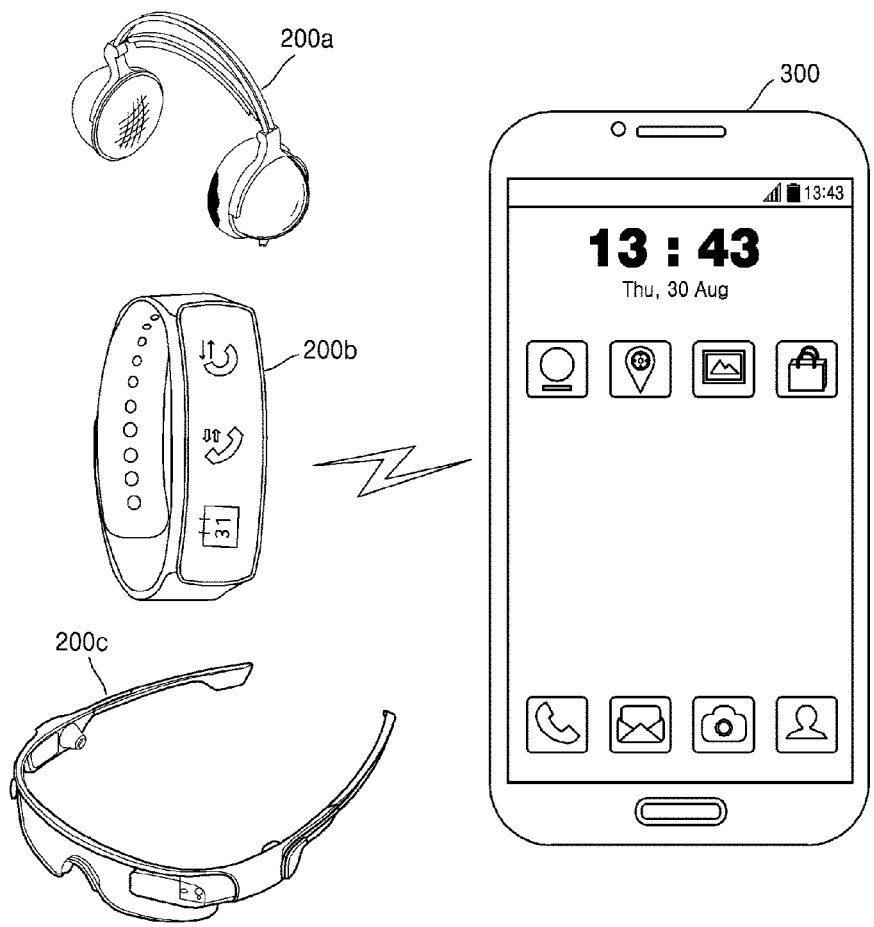

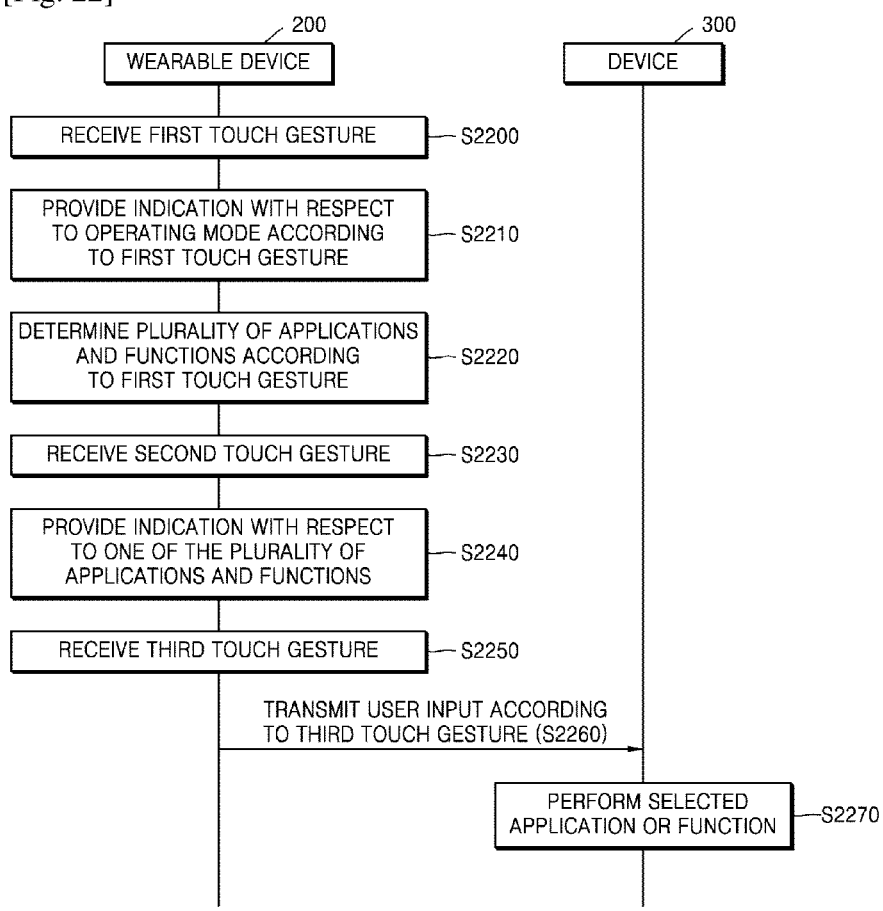
[Fig. 22]

[Fig. 23]
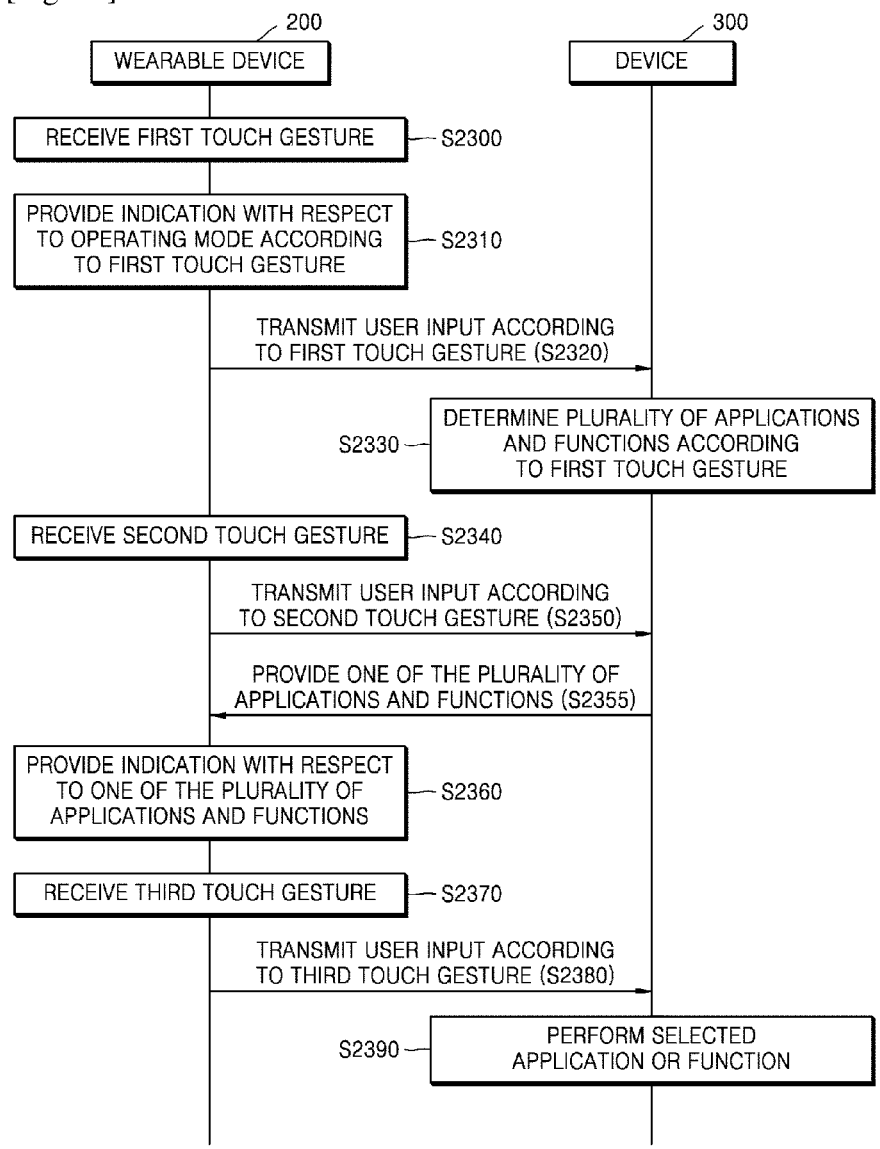

[Fig. 24a]
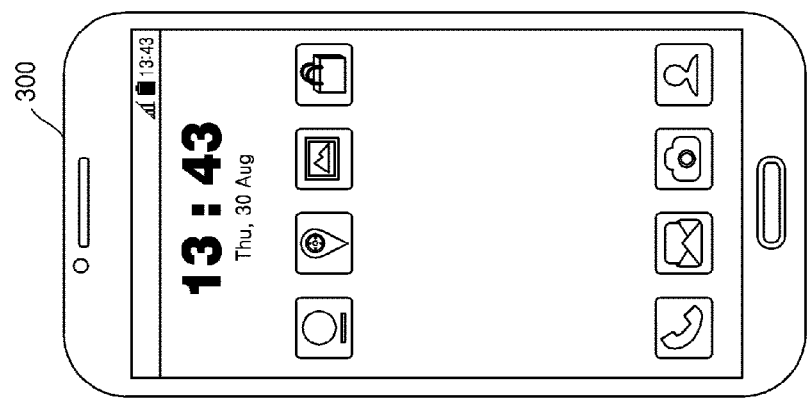
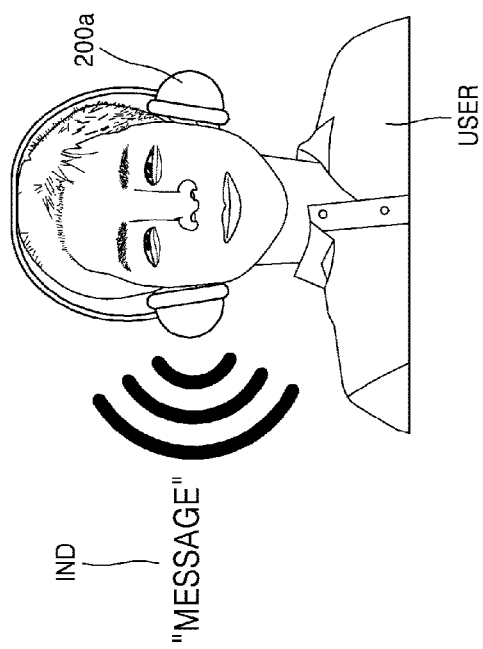

[Fig. 24b]
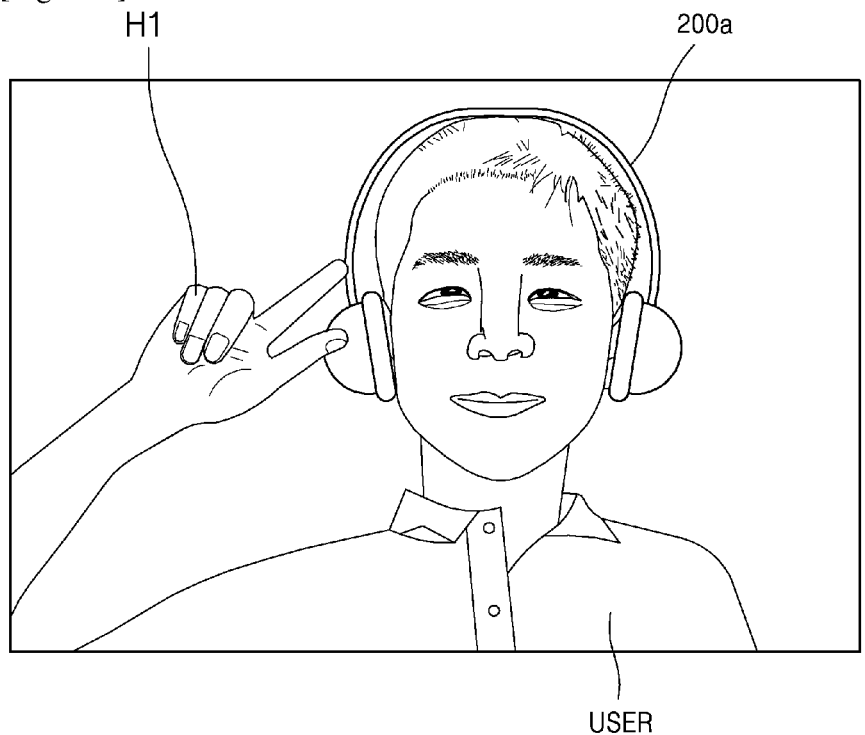
[Fig. 24c]
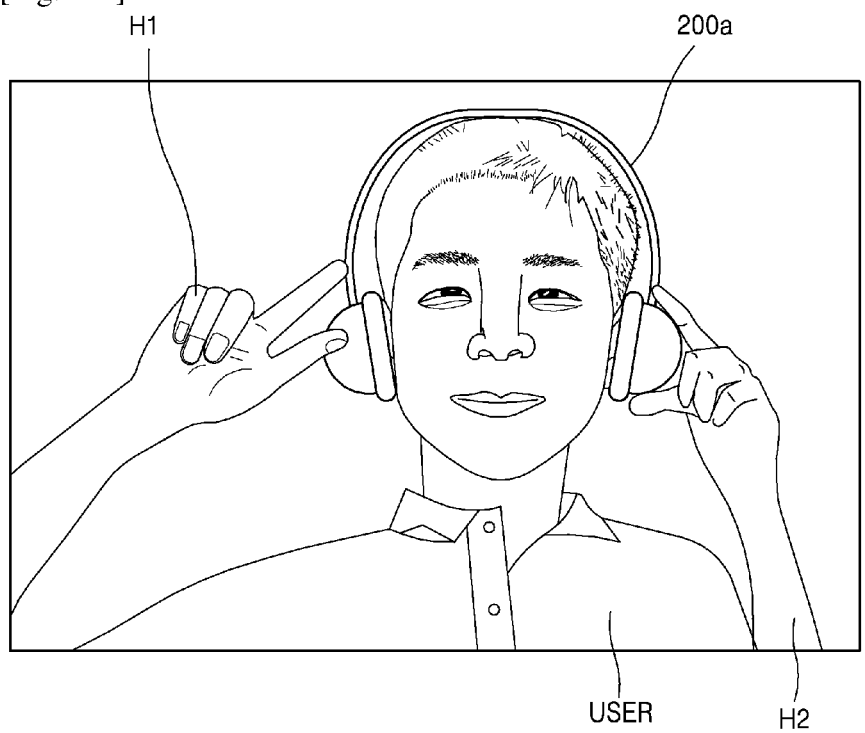

[Fig. 25a]
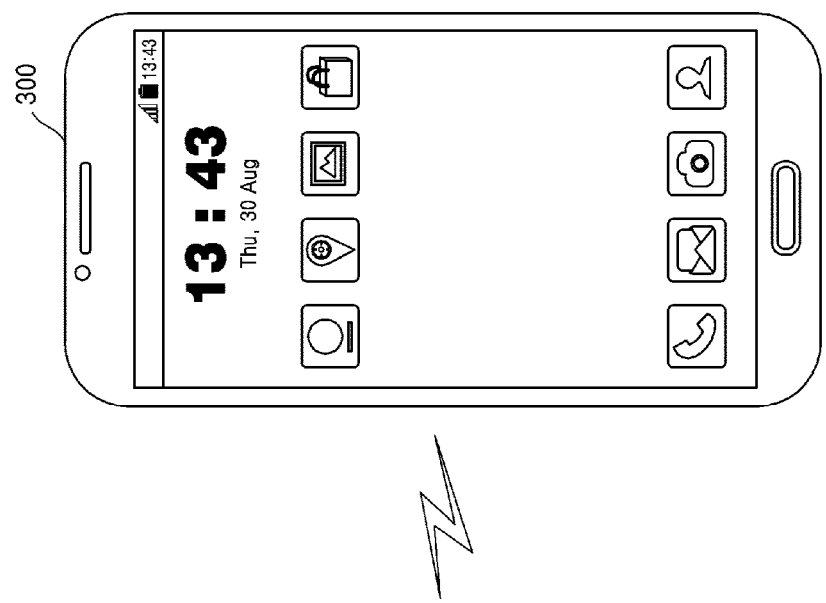
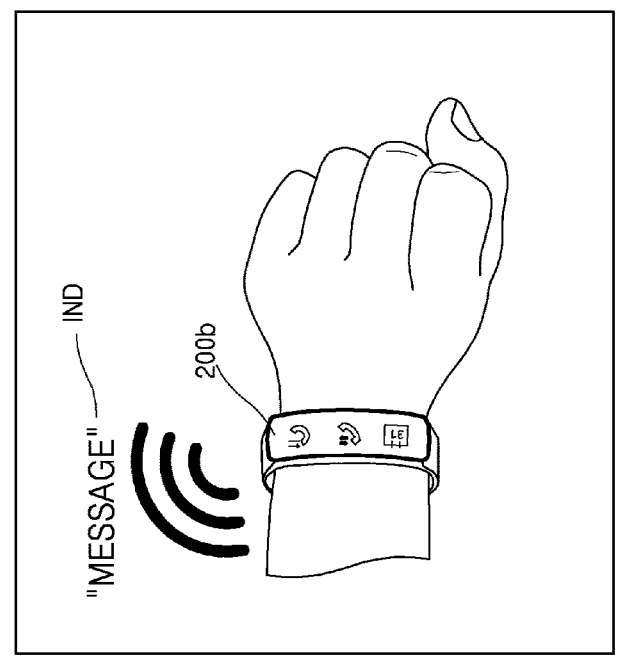
[Fig. 25b]
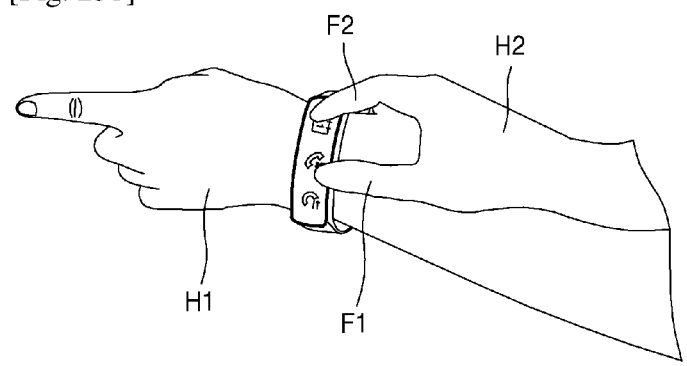

[Fig. 26]
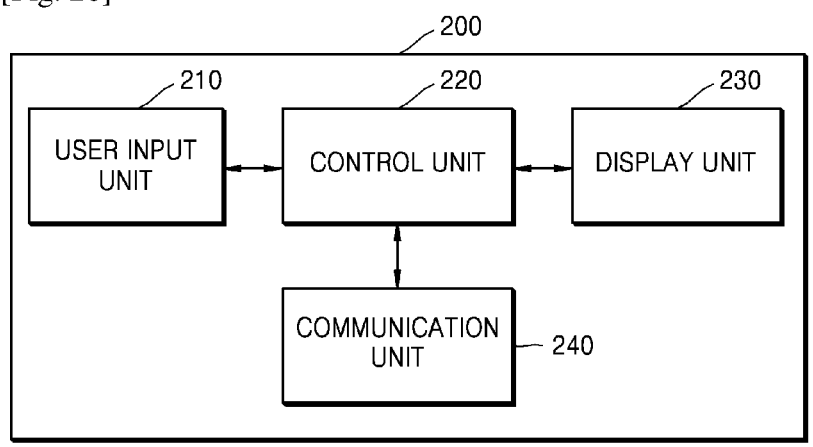
[Fig. 27]
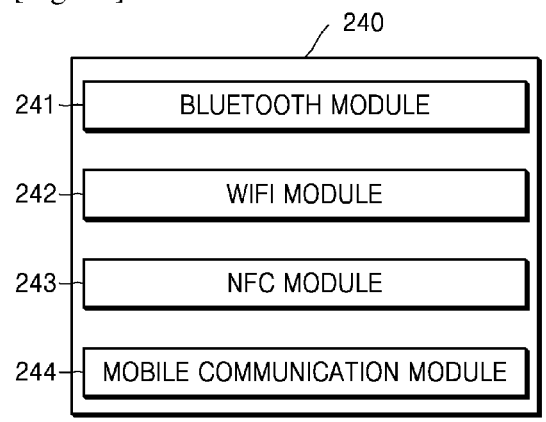

[Fig. 28]
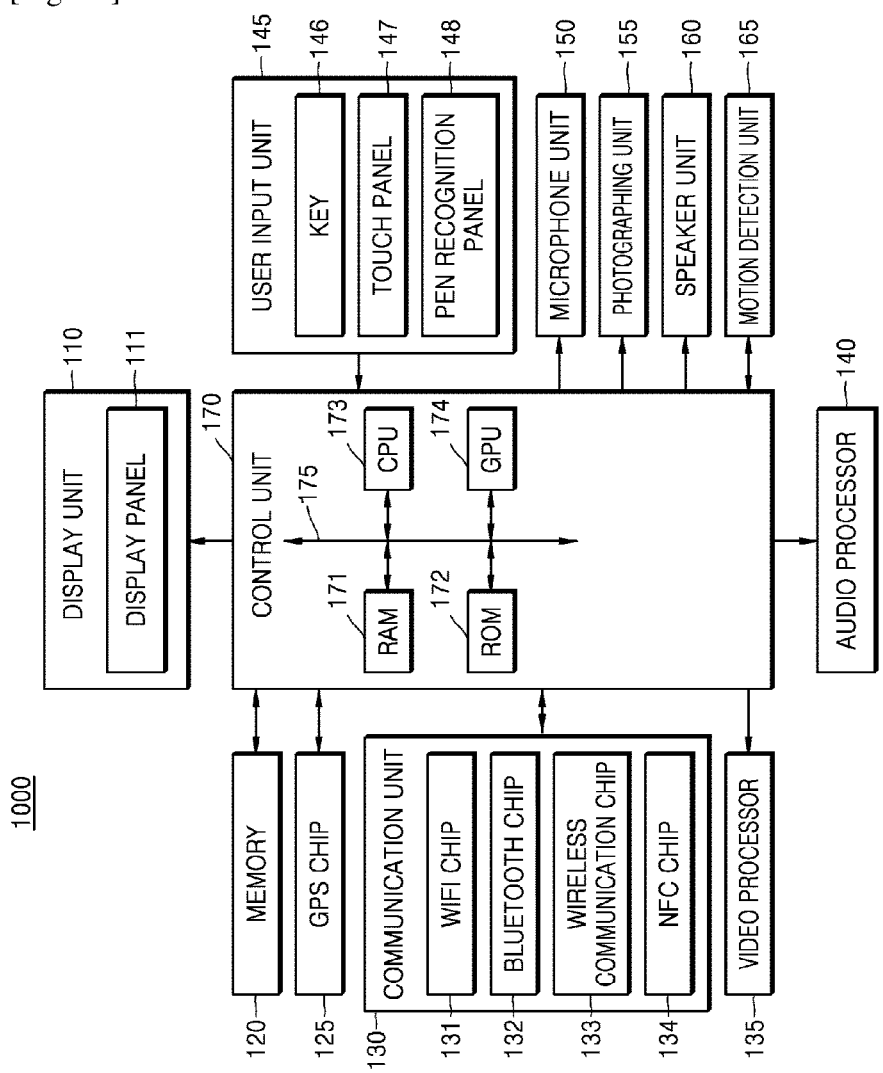

[Fig. 29]
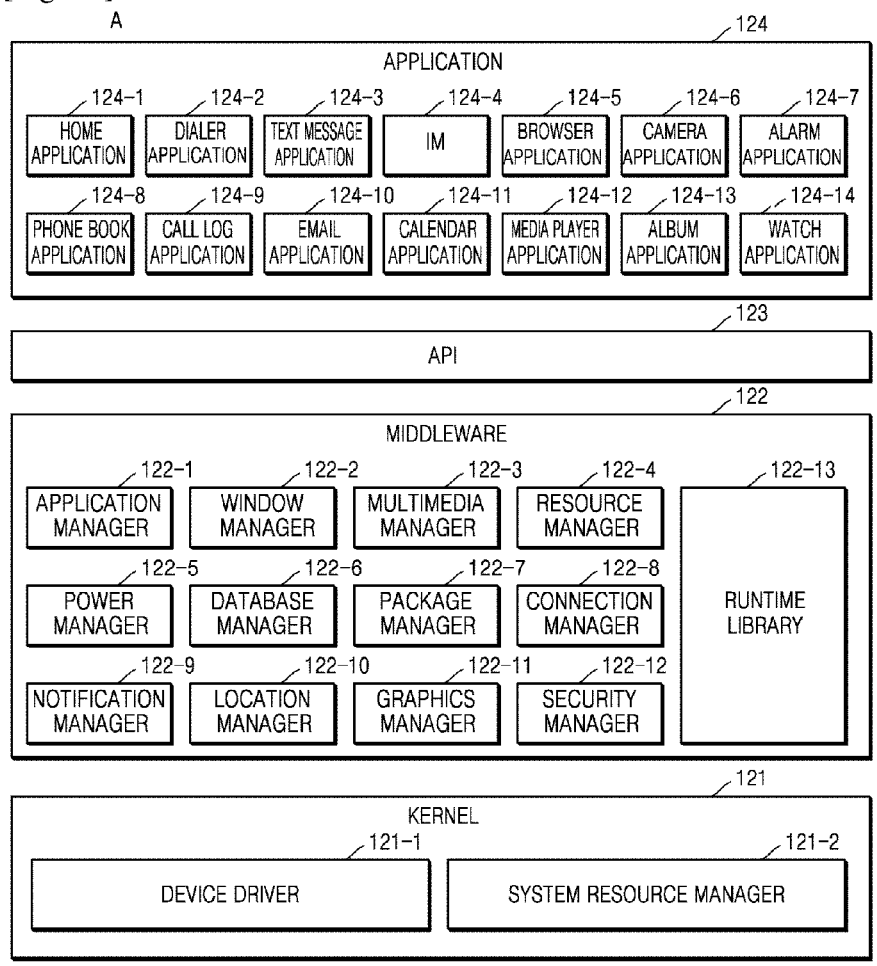
[Fig. 30]
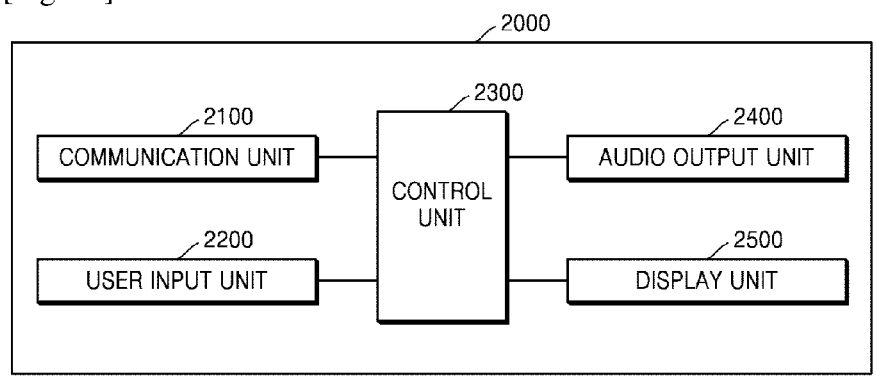

DEVICE AND METHOD OF CONTROLLING THE DEVICE

TECHNICAL FIELD

One or more embodiments relate to a device and a method of controlling the device.

BACKGROUND ART

A graphical user interface (GUI) is a working environment that allows a user to exchange data with a device through graphic elements. Elements of the GUI include a window, an icon, a menu, a button, a scroll bar, etc. The user may select the elements of the GUI by using a mouse, etc., to control the device.

DISCLOSURE OF INVENTION

Technical Problem

Recently, a method of selecting elements of a GUI in a touch manner and controlling a device via such elements' selection has been widely used. However, if the user has difficulties in recognizing locations of the elements of the GUI on the device, information exchange between the user and the device may not be smooth.

Solution to Problem

One or more embodiments include a device capable of an easy information exchange between a user and the device by using an independent touch gesture on locations of elements of a graphical user interface (GUI) on the device sand a method of controlling the device.

BRIEF DESCRIPTION OF DRAWINGS

These and/or other aspects will become apparent and more readily appreciated from the following description of the embodiments, taken in conjunction with the accompanying drawings in which:

FIG. 1 illustrates a device, according to an exemplary embodiment;

FIG. 2 is a flowchart of a method of controlling a device, according to an exemplary embodiment;

FIGS. 3a and 3b are diagrams for explaining operations of inputting touch gestures on a device, according to an exemplary embodiment;

FIG. 4 is a flowchart of a method of controlling a device, according to another exemplary embodiment;

FIGS. 5a through 5d illustrate first touch gestures, according to an exemplary embodiment;

FIGS. 6a through 6e illustrate second touch gestures, according to an exemplary embodiment;

FIGS. 7a and 7b illustrate third touch gestures, according to an exemplary embodiment;

FIGS. 8 through 11 illustrate inputs of first and second touch gestures, according to an exemplary embodiment;

FIG. 12 is a flowchart illustrating a device control method, according to an exemplary embodiment;

FIG. 13 is a table illustrating operating modes with respect to a number of stable points, according to an exemplary embodiment;

FIGS. 14a through 14f illustrate sequential operations of a device in a first touch gesture by a finger, according to an exemplary embodiment;

FIGS. 15a through 15f illustrate sequential operations of a device in a first touch gesture by two fingers, according to another exemplary embodiment;

FIGS. 16a through 16g illustrate sequential operations of a device in a first touch gesture by three fingers, according to another exemplary embodiment;

FIG. 17 illustrates an operation of a device in a first touch gesture by four fingers, according to another exemplary embodiment;

FIGS. 18a through 18c illustrate sequential operations of a device in first and second touch gestures by one hand, according to an exemplary embodiment;

FIGS. 19a through 19c illustrate sequential operations of a device in first and second touch gestures by one hand, according to another exemplary embodiment;

FIGS. 20a through 20c illustrate sequential operations of a device in first and second touch gestures by one hand, according to another exemplary embodiment;

FIG. 21 illustrates a wearable device and a device, according to an exemplary embodiment;

FIG. 22 is a flowchart illustrating operations of a wearable device and a device performed by using a device control method, according to an exemplary embodiment;

FIG. 23 is a flowchart illustrating operations of a wearable device and a device performed by using a device control method, according to another exemplary embodiment;

FIGS. 24a through 24c illustrate control operations of a device when a wearable device is a headphone, according to an exemplary embodiment;

FIGS. 25a and 25b illustrate control operations of a device when a wearable device is a smart watch, according to an exemplary embodiment;

FIG. 26 is a block diagram illustrating a wearable device, according to an exemplary embodiment;

FIG. 27 is a block diagram illustrating a communication unit included in a wearable device, according to an exemplary embodiment;

FIG. 28 is a block diagram illustrating a device, according to an exemplary embodiment;

FIG. 29 is a block diagram illustrating software of a device, according to an exemplary embodiment; and FIG. 30 is a block diagram illustrating a device, according to another exemplary embodiment.

BEST MODE FOR CARRYING OUT THE INVENTION

Additional aspects will be set forth in part in the description which follows and, in part, will be apparent from the description, or may be learned by practice of the presented embodiments.

According to one or more embodiments, a method of controlling a device includes receiving an independent touch gesture with respect to locations of elements of a graphical user interface (GUI) on the device; providing an indication with respect to one of a plurality of applications and functions in a previously established order in response to the received touch gesture; receiving a user input with respect to the indication; and executing an application or function corresponding to the indication in response to the received user input.

The touch gesture may move from a first point to a second point on the device.

The providing of the indication may include: providing an indication with respect to one of the plurality of applications and functions in an order based on a direction of the touch gesture irrespective of an orientation of the device.

The touch gesture may be a second touch gesture. The method may further include: before receiving the second touch gesture, receiving an independent first touch gesture with respect to the locations of the elements of the GUI; and determining the plurality of applications and functions according to the first touch gesture.

The first touch gesture may be a touch on at least a point on the device for more than a threshold period of time.

The receiving of the independent first touch gesture may include: continuously receiving the first touch gesture while the second touch gesture is being input.

The receiving of the independent first touch gesture and the receiving of the independent second touch gesture may include: receiving the first and second touch gestures by respectively using both hands of a user.

The receiving of the independent first touch gesture and the receiving of the independent second touch gesture may include: receiving the first and second touch gestures by respectively using different fingers of one hand of a user.

The receiving of the independent first touch gesture may include: receiving the first touch gesture as a touch on a point on the device for more than a threshold period of time, wherein the determining of the plurality of applications and functions includes: determining the plurality of applications and functions to guide applications and functions currently displayed on the device by using the second touch gesture.

The receiving of the independent first touch gesture may include: receiving the first touch gesture as a touch on two points on the device for more than a threshold period of time, wherein the determining of the plurality of applications and functions includes: determining the plurality of applications and functions to guide a shortcut key with respect to at least one previously determined application and function among executable applications and functions on the device by using the second touch gesture.

The receiving of the independent first touch gesture may include: receiving the first touch gesture as a touch on three points on the device for more than a threshold period of time, wherein the determining of the plurality of applications and functions includes: determining the plurality of applications and functions to guide a home functionality on the device by using the second touch gesture.

The method may further include: providing an indication with respect to an operating mode according to the first touch gesture in response to the first touch gesture.

When the first touch gesture is a touch on a point on the device, the operating mode may be a navigation mode, when the first touch gesture is a touch on two points on the device, the operating mode may be a shortcut key mode, when the first touch gesture is a touch on three points on the device, the operating mode may be a home functionality mode, and when the first touch gesture is a touch on four points on the device, the operating mode may be an application launch mode.

The receiving of the touch gesture may include: simultaneously receiving gestures by using at least two fingers.

The touch gesture may be a touch from a first point to a second point on the device in a rectilinear or curve motion.

The touch gesture may be a swipe mode gesture from a first point to a second point on the device, wherein the providing of the indication includes: sequentially providing indications with respect to the plurality of applications and functions according to the swipe mode gesture sequentially input to the device.

The touch gesture may be a continuous mode gesture that continuously moves from a first point to a second point and to a third point on the device, wherein the providing of the indication includes: sequentially providing indications with respect to the plurality of applications and functions according to the continuous mode gesture continuously input to the device.

The method may further include: when a touch point moves from a first point to a second point on the device according to the touch gesture that is initially input, determining a moving direction of the touch point as a forward direction and determining a direction opposite to the forward direction as a reverse direction.

The method may further include: receiving the touch gesture in the reverse direction, wherein the providing of the indication includes: providing an indication with respect to one of the plurality of applications and functions in an order opposite to the previously established order.

The providing of the indication may include: outputting a title of one of the plurality of applications and functions as a sound through an audio output unit of the device.

The providing of the indication may include displaying an icon or a highlight of one of the plurality of applications and functions on the device.

The receiving of the user input may include: selecting the indication and receiving an independent third touch gesture with respect to the locations of the elements of the GUI on the device.

The third touch gesture may be at least one tap operation with respect to a point on the device.

The device may be a wearable device, wherein the plurality of applications and functions are stored in the wearable device.

The device may be a wearable device, wherein the plurality of applications and functions are stored in an external device synchronized with the wearable device.

According to one or more embodiments, a device includes a user input unit for receiving an independent touch gesture with respect to locations of elements of a GUI on the device; and a control unit for providing an indication with respect to one of a plurality of applications and functions in a previously established order in response to the received touch gesture, and when an application or function corresponding to the indication is selected, executing the selected application or function.

The touch gesture may move from a first point to a second point on the device.

The control unit may provide an indication with respect to one of the plurality of applications and functions in an order based on a direction of the touch gesture irrespective of an orientation of the device.

The touch gesture may be a second touch gesture, the user input unit receives an independent first touch gesture with respect to the locations of elements of the GUI before receiving the second touch gesture, and the control unit determines the plurality of applications and functions according to the first touch gesture.

The first touch gesture may be a touch on at least a point on the device for more than a threshold period of time.

The user input unit may continuously receive the first touch gesture while the second touch gesture is being input.

When the user input unit receives the first touch gesture as a touch on a point on the device for more than a threshold period of time, the control unit may determine the plurality of applications and functions to guide applications and functions currently displayed on the device by using the second touch gesture, when the user input unit receives the first touch gesture as a touch on two points on the device for more than a threshold period of time, the control unit determines the plurality of applications and functions to guide a shortcut key with respect to at least one previously determined application and function among executable applications and functions on the device by using the second touch gesture, and when the user input unit receives the first touch gesture as a touch on three points on the device for more than a threshold period of time, the control unit determines the plurality of applications and functions to guide an home functionality on the device by using the second touch gesture.

The indication may be a sound with respect to a title of one of the plurality of applications and functions, and the device may further include: an audio output unit for outputting the title of one of the plurality of applications and functions as the sound.

The indication may be an icon or a highlight of one of the plurality of applications and functions on the device, and the device may further include: a display unit for displaying the icon or the highlight of one of the plurality of applications and functions on the device.

The user input unit may select the indication and receives an independent third touch gesture with respect to the locations of the elements of the GUI on the device.

The device may be a wearable device, wherein the plurality of applications and functions are stored in the wearable device, or in an external device synchronized with the wearable device.

According to one or more embodiments, there is a non-transitory computer readable recording medium storing one or more programs includes commands for executing a method of controlling a device, the method including receiving an independent touch gesture with respect to locations of elements of a GUI on the device; providing an indication with respect to one of a plurality of applications and functions in a previously established order in response to the received touch gesture; receiving a user input with respect to the indication; and executing an application or function corresponding to the indication in response to the received user input.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Terms used herein will be briefly described, and the present invention will be described in detail.

Terms used in the present invention have been selected as general terms which are widely used at present, in consideration of the functions of the present invention, but may be altered according to the intent of an operator skilled in the art, conventional practice, or introduction of new technology. Also, if there is a term which is arbitrarily selected by the applicant in a specific case, in which case a meaning of the term will be described in detail in a corresponding description portion of the present invention. Therefore, the terms should be defined on the basis of the entire content of this specification instead of a simple name of each of the terms.

In this disclosure below, when it is described that one comprises (or includes or has) some elements, it should be understood that it may comprise (or include or has) only those elements, or it may comprise (or include or have) other elements as well as those elements if there is no specific limitation. The term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside in an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Exemplary embodiments of the present invention capable of being easily embodied by those of ordinary skill in the art will now be described in detail with reference to the accompanying drawings. In the accompanying drawings, a portion irrelevant to a description of the present invention will be omitted for clarity. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a device 100, according to an exemplary embodiment.

Referring to FIG. 1, the device 100 may be an arbitrary electronic device capable of recognizing a touch gesture of a user USER. For example, the device 100 may be a smart phone, a tablet personal computer (PC), a PC, a smart TV, a cellular phone, a personal digital assistant (PDA), a laptop, a media player, a micro server, a GPS device, an e-book terminal, a navigation device, a kiosk, an MP3 player, a digital camera, another mobile or a non-mobile computing device, but is not limited thereto. The device 100 may include various devices capable of receiving a touch input such as a touch panel, an electronic board, a touch table, etc. The device 100 may be a wearable device having a communication function and a data processing function, such as a watch, glasses, a headphone, a hair bad, a ring, etc.

In the present embodiment, the device 100 may receive an independent touch gesture on location of elements of a graphical user interface (GUI). The GUI means a working environment in which the user USER exchanges data with the device 100 through graphics. The elements of the GUI include a window, an icon, a menu, a button, a scroll bar, etc. In the present embodiment, the elements of the GUI in the device 100 may include a plurality of home function icons HI1, HI2, HI3, and HI4, a plurality of application icons AI1, AI2, AI3, and AI4, and a date/time icon TIME.

In general, the user USER performs a work by selecting an icon on a screen of the device 100 by using a touch to control the device 100 or by selecting a menu on the screen by using a remote controller, etc. to exchange information with the device 100. However, when the user USER has difficulty in recognizing the locations of the elements of the GUI, an information exchange between the user USER and the device 100 may not be smooth. For example, when the user USER is visually handicapped, the user USER may not recognize the locations of the elements of the GUI. For another example, when the user USER has a meeting, since the user USER has difficulty in seeing the device 100, the user USER has difficulty in recognizing the locations of the elements of the GUI in the device 100.

According to the present embodiment, the device 100 may receive the independent touch gesture on the location of the elements of the GUI and execute an application or a function according to the received touch gesture. In more detail, according to the present embodiment, the device 100 may provide an indication IND with respect to one of a plurality of applications and functions in response to the received touch gesture and execute an application or a function selected according to a user input with respect to the indication IND. Thus, even when the user USER has difficulty in recognizing the locations of the elements of the GUI, the information exchange between the user USER and the device 100 may be smooth.

FIG. 2 is a flowchart of a method of controlling a device, according to an exemplary embodiment.

Referring to FIG. 2, the method of controlling the device according to the present embodiment, which is a method of executing an application or a function according to a received touch gesture, includes operations performed by the device below. For example, the method of controlling the device according to the present embodiment may include operations time-serially performed by the device 100 of FIG. 1.

In operation S200, an independent touch gesture with respect to locations of elements of a GUI on the device is received. In this regard, the touch gesture does not select an element corresponding to an application or a function that is to be executed among the elements of the GUI on the device but may be a touch operation with respect to an arbitrary point on a touch area on the device. Thus, a location of a point touched by the touch gesture on the device may not be considered. For example, the touch gesture may be a touch gesture moving from a first point to a second point on the device.

In operation S210, indications with respect to one of a plurality of applications and functions are provided in a previously established order in response to the touch gesture. In this regard, the previously established order may be established by a user or an operating system in the device. The plurality of applications and functions may be differently determined according to a type of the touch gesture.

In an embodiment, the indication may be sound. In operation S210, a title of one of the plurality of applications and functions may be provided as sound. In another embodiment, the indication may be graphics. In operation S210, an icon of one of the plurality of applications and functions or, for example, a highlight with respect to the icon may be provided.

In operation S220, a user input with respect to the indication is received. In an embodiment, the user input may be the touch gesture. In another embodiment, the user input may be a manipulation of a button. In an embodiment, when the user selects an application or a function corresponding to the indication of operation S210, the device may receive a user input corresponding to a selection operation and then operation S230 is performed. In another embodiment, when the user does not select the indication of operation S210, operation S200 may be performed and thus the device may receive the touch gesture again.

In operation S230, the application or the function corresponding to the indication is performed in response to the user input. In an embodiment, an application or a function stored in the device may be executed. In another embodiment, an application or a function stored in an external device in synchronization with the device may be executed.

FIGS. 3a and 3b are diagrams for explaining operations of inputting touch gestures in the device 100, according to an exemplary embodiment.

The touch gestures of FIGS. 3a and 3b may be touch gestures of operation S200 of FIG. 2. Referring to FIGS. 3a and 3b, the user USER may perform an independent touch gesture on locations of elements of a GUI on the device 100. In other words, the user USER may not perform a touch gesture indicating a specific application or function on the device 100 but may perform a touch gesture on an arbitrary point on the device 100. Thus, a location of a point touched by the touch gesture on the device 100 may not be considered. In this regard, the touch gesture may be a movement gesture moving from a first point P1 to a second point P2 on a touch area of the device 100.

According to the present embodiment, the device 100 may provide an indication with respect to one of a plurality of applications and functions based on a direction of the touch gesture irrespective of an orientation of the device 100. In more detail, the device 100 may determine an order of providing the plurality of applications and functions based on a direction of an initially input touch gesture and maintain an order although the orientation of the device 100 is changed.

In FIG. 3a, the orientation of the device 100 may be substantially perpendicular to the direction of the touch gesture. In FIG. 3b, the orientation of the device 100 may be substantially parallel to the direction of the touch gesture. As such, although the orientation of the device 100 is changed in use, the device 100 may provide the indication with respect to one of the plurality of applications and functions based on a direction of an input touch gesture.

In more detail, when a direction of a currently input touch gesture is the same as the direction of the initially input touch gesture, the device 100 may provide indications in a previously established order. Meanwhile, when the direction of a currently input touch gesture is the different from the direction of the initially input touch gesture, the device 100 may provide the indications in an order opposite to the previously established order.

FIG. 4 is a flowchart of a method of controlling a device, according to another exemplary embodiment.

Referring to FIG. 4, the method of controlling the device according to the present embodiment, which is a method of executing an application or a function according to a received touch gesture, includes the following operations performed by the device. For example, the method of controlling the device according to the present embodiment may include operations time-serially proposed by the device 100 of FIG. 1. The method of controlling the device according to the present embodiment may further include operations S400 and S410 compared to the method of FIG. 2. Operations S420 through S450 may be similar to operations S200 through S230 of FIG. 2.

In operation S400, an independent first touch gesture is received with respect to locations of elements of a GUI on the device. In this regard, the first touch gesture does not select an element corresponding to an application or function that is to be executed among the elements of the GUI on the device but may be a touch operation on an arbitrary point on a touch area on the device. Thus, the location of the point touched by the first touch gesture on the device may not be considered. For example, the first touch gesture may be a gesture on at least a point on the touch area of the device for more than a threshold period of time.

In operation S410, a plurality of application and functions are determined according to the first touch gesture. In more detail, the device may determine a plurality of applications and functions that are to provide indications in response to a second touch gesture according to a number of points touched on the device according to the first touch gesture.

In operation S420, a second touch gesture with respect to the locations of the elements of the GUI on the device is received. In this regard, the first touch gesture is continuously received while the second touch gesture is being received. The second touch gesture does not select the element corresponding to the application or the function that is to be executed among the elements of the GUI on the device but may be the touch operation with respect to the arbitrary point on the touch area on the device. Thus, a location of a point touched by the second touch gesture on the device may not be considered. For example, the second touch gesture may be a touch gesture moving from a first point to a second point on the device.

In operation S430, indications with respect to one of the plurality of applications and functions are provided in a previously established order in response to the second touch gesture. In this regard, the previously established order may be established by a user or an operating system in the device. The plurality of applications and functions may be differently determined according to a type of the touch gesture.

In an embodiment, the indication may be sound. In operation S430, a title of one of the plurality of applications and functions may be provided as sound. In another embodiment, the indication may be graphics. In operation S430, an icon of one of the plurality of applications and functions or, for example, a highlight with respect to the icon may be provided.

In operation S440, a third touch gesture with respect to the indication is received. In this regard, the first touch gesture is continuously received while the third touch gesture is being received. In an embodiment, the third touch gesture may be a user input to select an application or a function corresponding to the indication. The third touch gesture does not select the element corresponding to the application or the function that is to be executed among the elements of the GUI on the device but may be the touch operation with respect to the arbitrary point on the touch area on the device. Thus, a location of a point touched by the third touch gesture on the device may not be considered. For example, the third touch gesture may be a tap or a double tap with respect to a point on the device.

In operation S450, the application or the function corresponding to the indication is performed in response to the third touch gesture. In an embodiment, an application or a function stored in the device may be executed. In another embodiment, an application or a function stored in an external device in synchronization with the device may be executed.

FIGS. 5a through 5d illustrate first touch gestures, according to an exemplary embodiment.

Referring to FIGS. 5a through 5d, the user USER may perform the first touch gestures by touching a touch area TA on a device. In this regard, the touch area TA may be an arbitrary area with a touch sensor embedded therein. The touch area TA may correspond to a front surface, a rear surface, or a side surface of the device.

In FIG. 5a, the user USER may touch the touch area TA by using a finger for more than a threshold period of time so that the device may detect a first stable point SP1 on the touch area TA. In FIG. 5b, the user USER may simultaneously touch the touch area TA by using two fingers for more than the threshold period of time so that the device may detect the first stable point SP1 and a second stable point SP2 on the touch area TA.

In FIG. 5c, the user USER may simultaneously touch the touch area TA by using three fingers for more than the threshold period of time so that the device may detect the first stable point SP1, the second stable point SP2, and a third stable point SP3 on the touch area TA. In FIG. 5d, the user USER may simultaneously touch the touch area TA by using four fingers for more than the threshold period of time so that the device may detect the first stable point SP1, the second stable point SP2, the third stable point SP3, and the fourth stable point SP4 on the touch area TA.

Although the first touch gesture is performed by fingers of the user USER in FIGS. 5a through 5d, a body part touched by the user USER on the touch area TA is not restricted to the user USER. In another embodiment, the user USER may perform the first touch gesture on the touch area TA by using a coordinate display apparatus such as a stylus pen other than the body part.

FIGS. 6a through 6e illustrate second touch gestures, according to an exemplary embodiment.

Referring to FIGS. 6a through 6e, the user USER may perform the second touch gestures by touching the touch area TA on a device. In this regard, the touch area TA may be an arbitrary area with a touch sensor embedded therein. The touch area TA may correspond to a front surface, a rear surface, or a side surface of the device.

In FIG. 6a, the user USER may touch the touch area TA such that a finger may move from a first movable point MP1 to a second movable point MP2 on the touch area TA in a rectilinear motion, and thus the device may detect a touch gesture in a first direction from the first movable point MP1 to the second movable point MP2 on the touch area TA.

In FIG. 6b, the user USER may touch the touch area TA such that a finger may move from the first movable point MP1 to the second movable point MP2 on the touch area TA in a curve motion, and thus the device may detect a touch gesture in a first direction from the first movable point MP1 to the second movable point MP2 on the touch area TA.

Although not shown, in another embodiment, the user USER may touch the touch area TA such that a finger may move from the first movable point MP1 to the second movable point MP2 on the touch area TA in an arbitrary motion, for example, in a zigzag motion or in a wave motion. As described above, when a movable touch gesture is input irrespective of a type of the touch gesture, the device may determine the input touch gesture as the second touch gesture.

In FIG. 6c, the user USER may touch the touch area TA such that a finger may move from the first movable point MP1 to the second movable point MP2 on the touch area TA in a swipe mode, and thus the device may detect a touch gesture in a first direction from the first movable point MP1 to the second movable point MP2 on the touch area TA. As described above, when the second touch gesture is in the swipe mode, the user USER may repeatedly perform the second touch gesture intermittently until an indication with respect to a desired application or function is provided.

In FIG. 6d, the user USER may touch the touch area TA such that a finger may move from the first movable point MP1 to the second movable point MP2 and to a third movable point MP3 on the touch area TA in a continuous modes, and thus the device may detect a touch gesture in a first direction from the first movable point MP1 to the second movable point MP2 and to the third movable point MP3 on the touch area TA. As described above, when the second touch gesture is in the continuous mode, the user USER may continuously perform the second touch gesture until an indication with respect to a desired application or function is provided.

In FIG. 6e, the user USER may touch the touch area TA such that a finger may move from the first movable point MP1 to the second movable point MP2 on the touch area TA and from the third movable point MP3 to a fourth movable point MP4 on the touch area TA, and thus the user USER may simultaneously perform the second touch gestures by using two fingers but is not limited thereto. In another embodiment, the user USER may simultaneously perform the second touch gestures by using three, four, or five fingers. As described above, types of indicated applications and functions may be changed according to a number of fingers used to perform the second touch gestures.

FIGS. 7a and 7b illustrate third touch gestures, according to an exemplary embodiment.

Referring to FIGS. 7a and 7b, the user USER may perform the third touch gestures by touching the touch area TA on a device. In this regard, the touch area TA may be an arbitrary area with a touch sensor embedded therein. The touch area TA may correspond to a front surface, a rear surface, or a side surface of the device.

In FIG. 7a, the user USER may touch, for example, tapping, a first actionable point AP1 by using a finger on the touch area TA and thus, the device may detect the third touch gesture. In FIG. 7b, the user USER may touch, for example, double tapping, the first actionable point AP1 twice by using a finger on the touch area TA and thus, the device may detect the third touch gesture. However, the present invention is not limited thereto. In another embodiment, the user USER may touch the first actionable point AP1 by using more than two fingers. In another embodiment, the user USER may touch the first actionable point AP1 more than three times.

The first through third touch gestures are described above but the present invention is not limited thereto. The first through third touch gestures may be changed in various ways, and may include, for example, a tap, a double tap, a drag, a swipe, a flick, a drag and drop, etc.

In this regard, a "tap" is a gesture in which a user touches a screen by using a finger or a touch tool, for example, an electronic pen, and then, immediately lifts it off from the screen without dragging on the screen. A "double tap" is a gesture in which a user touches a screen twice by using a finger or a touch tool which may be a stylus.

A "drag" is a gesture in which a user touches a screen by using a finger or a touch tool and moves the finger or the touch tool to another location in the screen while holding the touch. When the drag is performed, an object moves, or a panning gesture, which is described below, is performed. A "flick" is a gesture in which a user performs a drag at a critical speed or at a higher speed, for example, 100 pixels/s, by using a finger or a touch tool. The flick may be distinguished from the drag or the panning based on whether a moving speed of a finger or a touch tool is equal to or higher than the critical speed, for example, 100 pixels/s.

A "drag and drop" is a gesture in which a user drags an object to a predetermined place in a screen by using a finger or a touch tool, and then, lifts the finger or touch tool off the screen.

A "swipe" is a gesture for touching an object in a screen by using a finger or a touch tool and moving the finger or the touch tool in a horizontal or vertical direction for a certain distance. Moving in a diagonal direction may not be recognized as a swipe event.

FIGS. 8 through 11 illustrate inputs of first and second touch gestures, according to an exemplary embodiment.

Referring to FIG. 8, when the device 100 is in a locked mode, i.e., when the device 100 is inactivated, a user performs the first and second touch gestures on a front surface of the device 100, i.e. a display panel, thereby performing the device control method according to the present embodiment described above. It is described that the user performs the first and second touch gestures by using both hands below but the present invention is not limited thereto. The user may perform the first and second touch gestures by one of both hands.

In more detail, the user performs the first touch gesture on at least a point of the device 100 for more than a threshold period of time by one hand H1, and thus the device 100 may detect the first stable point SP1. Accordingly, the locked mode of the device 100 may be released so that the device 100 may be activated and may determine a plurality of applications and functions.

Thereafter, the user performs the second touch gesture moving from the first actionable point MP1 of the device 100 to the second actionable point MP2 by using another hand H2, and thus the device 100 may detect the second touch gesture in a first direction from the first movable point MP1 to the second movable point MP2. Accordingly, the device 100 may provide indications with respect to one of a plurality of applications and functions in a previously established order.

Referring to FIG. 9, when a touch sensor is not embedded in a rear surface of the device 100 on which a display panel is not provided, the user performs the first and second touch gestures on the rear surface of the device 100, thereby performing the device control method according to the present embodiment described above. The device control method is similar to that described with reference to FIG. 8, and thus a detailed description thereof is omitted.

Referring to FIG. 10, when a touch sensor is embedded in a side surface of the device 100, the user performs the first and second touch gestures on the side surface of the device 100, thereby performing the device control method according to the present embodiment described above. The device control method is similar to that described with reference to FIG. 8, and thus a detailed description thereof is omitted. Although not shown, when the touch sensor is embedded in a bezel area of the device 100, the user performs the first and second touch gestures on the bezel area of the device 100, thereby performing the device control method according to the present embodiment described above.

Referring to FIG. 11, when a cover COV is covered on the device 100 and is embedded in a touch sensor, the user performs the first and second touch gestures on the cover COV, thereby performing the device control method according to the present embodiment described above. The device control method is similar to that described with reference to FIG. 8, and thus a detailed description thereof is omitted.

FIG. 12 is a flowchart illustrating a device control method, according to an exemplary embodiment.

Referring to FIG. 12, the device control method according to the present embodiment, which is a method of executing an application or a function according to a received touch gesture, includes the following operations performed by the device. For example, the method of controlling the device according to the present embodiment may include operations time-serially proposed by the device 100 of FIG. 1. The method of controlling the device according to the present embodiment may further include operation S1220 compared to the method of FIG. 4. Operations S1200, S1210, and S1230 through S1260 may be similar to operations S400 through S450 of FIG. 4.

In operation S1200, the device receives an independent first touch gesture with respect to locations of elements of a GUI on a device. In this regard, the first touch gesture does not select an element corresponding to an application or function that is to be executed among the elements of the GUI on the device but may be a touch operation on an arbitrary point on a touch area on the device. For example, the first touch gesture may be a gesture on at least a point on the touch area of the device for more than a threshold period of time.

In operation S1210, the device provides an indication with respect to an operating mode according to the first touch gesture in response to the first touch gesture. In an embodiment, the indication may be sound. In operation S1210, the device may output a title of the operating mode as sound. In another embodiment, the indication may be graphics. In operation S1210, the device may display an icon indicating the operating mode.

In operation S1220, the device determines a plurality of application and functions according to the first touch gesture. In more detail, the device may determine a plurality of applications and functions that are to provide indications in response to a second touch gesture according to a number of points touched on the device according to the first touch gesture. According to embodiments, an order of operations S1210 and S1220 may be changed.

In operation S1230, the device receives a second touch gesture with respect to the locations of the elements of the GUI on the device. In this regard, the device continuously receives the first touch gesture while the second touch gesture is being received. The second touch gesture does not select the element corresponding to the application or the function that is to be executed among the elements of the GUI on the device but may be the touch operation with respect to the arbitrary point on the touch area on the device. For example, the second touch gesture may be a touch gesture moving from a first point to a second point on the device.

In operation S1240, the device provides indications with respect to one of the plurality of applications and functions in a previously established order in response to the second touch gesture. In this regard, the previously established order may be established by a user or an operating system in the device. The plurality of applications and functions may be differently determined according to a type of the touch gesture. In an embodiment, the indication may be sound. In operation S1240, a title of one of the plurality of applications and functions may be provided as sound. In another embodiment, the indication may be graphics. In operation S1240, an icon of one of the plurality of applications and functions or, for example, a highlight with respect to the icon may be provided.

In operation S1250, the device receives a third touch gesture with respect to the indication. In this regard, the device continuously receives the first touch gesture while the third touch gesture is being received. In an embodiment, the third touch gesture may be a user input to select an application or a function corresponding to the indication. The third touch gesture does not select the element corresponding to the application or the function that is to be executed among the elements of the GUI on the device but may be the touch operation with respect to the arbitrary point on the touch area on the device. For example, the third touch gesture may be a tap or a double tap with respect to a point on the device.

In operation S1260, the device performs the application or the function corresponding to the indication in response to the third touch gesture. In an embodiment, an application or a function stored in the device may be executed. In another embodiment, an application or a function stored in an external device in synchronization with the device may be executed.

FIG. 13 is a table illustrating operating modes with respect to a number of stable points, according to an exemplary embodiment.

Referring to FIG. 13, when there is one stable point according to a first touch gesture, for example, FIG. 5a, an operating mode with respect to the first touch gesture may be a navigation mode. In this regard, the navigation mode may be a mode in which indications with respect to icons corresponding to currently displayed applications and functions on a device are provided to a user. In more detail, if a second touch gesture is input in the navigation mode, the device may provide an indication with respect to one of currently displayed icons on the device.

When there are two stable points according to the first touch gesture, for example, FIG. 5b, an operating mode with respect to the first touch gesture may be a shortcut mode. In this regard, the shortcut mode may be a mode in which indications with respect to shortcuts corresponding to one or more previously determined applications and functions among a plurality of applications or functions executable in the device are provided to the user. In this regard, the one or more previously determined applications and functions may be previously determined by the user or an operating system of the device. In more detail, if the second touch gesture is input in the shortcut mode, the device may provide an indication with respect to a shortcut corresponding to one of the one or more previously determined applications and functions irrespective of whether the one or more previously determined applications and functions are displayed on the device.

When there are three stable points according to the first touch gesture, for example, FIG. 5c, an operating mode with respect to the first touch gesture may be a home functionality mode. In this regard, the home functionality mode may be a mode in which indications with respect to home functionalities executable by the device on the device are provided to the user. In more detail, if the second touch gesture is input in the home functionality mode, the device may provide an indication with respect to one of the home functionalities executable by the device.

When there are fourth stable points according to the first touch gesture, for example, FIG. 5d, an operating mode with respect to the first touch gesture may be an application launch mode. In this regard, the application launch mode may be a selection operation with respect to an application or a function. In more detail, in the application launch mode, the device may directly perform a selected application or function.

FIGS. 14a through 14f illustrate sequential operations of the device 100 in a first touch gesture by a finger, according to an exemplary embodiment.

Referring to FIG. 14a, a user may perform the first touch gesture as a touch on a point of the device 100 by using a finger of the hand H1 for more than a threshold period of time. Thus, the device 100 may detect the first stable point SP1 and provide a first indication IND1 with respect to an operating mode according to the first touch gesture. For example, the device 100 may output a "navigation mode" according to the first touch gesture as sound.

Referring to FIG. 14*b*, the user may perform the second touch gesture in a first direction by using a finger of the hand H2. The device 100 may provide indications with respect to indications one of a plurality of applications and functions currently displayed on the device 100 in response to the second touch gesture. For example, the device 100 may output a "bonus card" as sound that is the first indication IND1 in response to the second touch gesture in the first direction and display a highlight that is a second indication IND2 with respect to an icon corresponding to the "bonus card".

In the present embodiment, the first direction of the initially input second touch gesture may be determined as a forward direction, and a second direction opposite to the first direction may be determined as a reverse direction. If the second touch gesture is input in the first direction that is the forward direction, the device 100 may provide indications with respect to a next application or function among a plurality of applications and functions in a previously established order. Meanwhile, if the second touch gesture is input in the second direction that is the reverse direction, the device 100 may provide indications with respect to a previous application or function among the plurality of application and functions in an order opposite to the previously established order.

Referring to FIG. 14*c*, the user may perform the second touch gesture in the first direction by using a finger of the hand H2. The device 100 may detect a movable point MP and provide the indications with respect to the next application or function in response to the second touch gesture. For example, the device 100 may output a "map" that is the next application as the sound that is the first indication IND1 and display the highlight as the second indication IND2 with respect to an icon corresponding to the "map" in response to the second touch gesture in the first direction.

Referring to FIG. 14*d*, the user may perform the second touch gesture in a second direction by using a finger of the hand H2. The device 100 may detect the movable point MP and provide the indications with respect to the previous application or function in response to the second touch gesture. For example, the device 100 may output the "bonus card" that is the previous application as the sound that is the first indication IND1 and display the highlight as the second indication IND2 with respect to the icon corresponding to the "bonus card" in response to the second touch gesture in the second direction.

Referring to FIG. 14*e*, the user may perform a third touch gesture by using a finger of the hand H2 and thus the device 100 may detect an actionable point (AP).

Referring to FIG. 14*f*, the device 100 may execute an application or a function corresponding to an indication in response to the third touch gesture. For example, the device 100 may execute the "bonus card" that is the application corresponding to the indication of FIG. 14*d* in response to the third touch gesture, and thus a displayed screen of the device 100 may be changed to a start screen of the application "bonus card". The device 100 may output "it is started" as sound that is the first indication IND1 along with an execution of the application.

FIGS. 15*a* through 15*f* illustrate sequential operations of the device 100 in a first touch gesture by two fingers, according to another exemplary embodiment.

Referring to FIG. 15*a*, a user may perform a first touch gesture as a simultaneous touch on two points of the device 100 by using two fingers of the hand H1 for more than a threshold period of time. Thus, the device 100 may detect the first and second stable points SP1 and SP2 and provide the first indication IND1 with respect to an operating mode according to the first touch gesture. For example, the device 100 may output a "shortcut key mode" according to the first touch gesture as sound.

Referring to FIG. 15*b*, the user may perform a second touch gesture in a first direction by using a finger of the hand H2. The device 100 may provide indications with respect to a shortcut key corresponding to one of previously determined applications and functions among a plurality of applications and functions executable by the device 100 in response to the second touch gesture. For example, the device 100 may output "favorite calls" as sound that is the first indication IND1 in response to the second touch gesture and display a shortcut key SC1 corresponding to "favorite calls".

In the present embodiment, the first direction of the initially input second touch gesture may be determined as a forward direction, and a second direction opposite to the first direction may be determined as a reverse direction. If the second touch gesture is input in the first direction that is the forward direction, the device 100 may provide indications with respect to a shortcut key corresponding to a next application or function among a plurality of application and functions in a previously established order. Meanwhile, if the second touch gesture is input in the second direction that is the reverse direction, the device 100 may provide indications with respect to a shortcut key corresponding to a previous application or function among the plurality of applications and functions in an order opposite to the previously established order.

Referring to FIG. 15*c*, the user may perform the second touch gesture in the first direction by using a finger of the hand H2. The device 100 may provide indications with respect to a shortcut key corresponding to a next application or function in response to the second touch gesture. For example, the device 100 may output a "message" that is the next function as sound that is the first indication IND1 in response to the second touch gesture and display a shortcut key SC2 corresponding to the "message".

Referring to FIG. 15*d*, the user may perform the second touch gesture in the first direction by using a finger of the hand H2. The device 100 may provide indications with respect to a shortcut key corresponding to a next application or function in response to the second touch gesture. For example, the device 100 may output a "current time" that is the next function as sound that is the first indication IND1 in response to the second touch gesture and display a shortcut key SC3 corresponding to the "current time".

Although not shown, when the user performs the second touch gesture in a second direction by using a finger of the hand H2, the device 100 may provide indications with respect to a shortcut key corresponding to a previous application or function in response to the second touch gesture. For example, the device 100 may output a "message" that is the previous function as sound that is the first indication IND1 in response to the second touch gesture and display the shortcut key SC2 corresponding to the "message".

Referring to FIG. 15*e*, the user may perform a third touch gesture by using a finger of the hand H2, and thus the device 100 may detect the actionable point AP.

Referring to FIG. 15*f*, the device 100 may execute an application or function corresponding to an indication in response to the third touch gesture. For example, the device 100 may output a "current time" that is a function corresponding to the indication of FIG. 15*d* in response to the third touch gesture, thereby outputting an execution result of the function as sound, for example, "the current time is 13:14".

FIGS. 16a through 16g illustrate sequential operations of the device 100 in a first touch gesture by three fingers, according to another exemplary embodiment.

Referring to FIG. 16a, a user may perform the first touch gesture as a touch on three points of the device 100 by using three fingers of the hand H1 for more than a threshold period of time. Thus, the device 100 mat detect the first through third stable points SP1, SP2, and SP3 and provide the first indication IND1 with respect to an operating mode according to the first touch gesture. For example, the device 100 may output a "home functionality mode" according to the first touch gesture as sound.

Referring to FIG. 16b, the user may perform the second touch gesture in a first direction by using a finger of the hand H2. The device 100 may provide indications with respect to one of a plurality of home functionalities executable by the device 100 in response to the second touch gesture. For example, the device 100 may output a "call" as sound that is the first indication IND1 in response to the second touch gesture and display an icon HF1 corresponding to the "call".

In the present embodiment, the first direction of the initially input second touch gesture may be determined as a forward direction, and a second direction opposite to the first direction may be determined as a reverse direction. If the second touch gesture is input in the first direction that is the forward direction, the device 100 may provide indications with respect to a next home functionality among a plurality of home functionalities in a previously established order. Meanwhile, if the second touch gesture is input in the second direction that is the reverse direction, the device 100 may provide indications with respect to a previous home functionality among the plurality of application and functions in an order opposite to the previously established order.

Referring to FIG. 16c, the user may perform the second touch gesture in the first direction by using a finger of the hand H2. The device 100 may provide indications with respect to a next home functionality in response to the second touch gesture. For example, the device 100 may output a "mail" that is the next home functionality as sound that is the first indication IND1 in response to the second touch gesture and display an icon HF2 corresponding to the "mail".

Referring to FIG. 16d, the user may perform the second touch gesture in the first direction by using a finger of the hand H2. The device 100 may provide indications with respect to a next home functionality in response to the second touch gesture. For example, the device 100 may output a "camera" that is the next home functionality as sound that is the first indication IND1 in response to the second touch gesture and display an icon HF3 corresponding to the "camera".

Referring to FIG. 16e, the user may perform the second touch gesture in the first direction by using a finger of the hand H2. The device 100 may provide indications with respect to one of a plurality of home functionalities executable by the device 100 in response to the second touch gesture. For example, the device 100 may output "favorite calls" as sound that is the first indication IND1 in response to the second touch gesture and display an icon HF4 corresponding to "favorite calls".

Although not shown, when the user performs the second touch gesture in the second direction by using a finger of the hand H2, the device 100 may provide indications with respect to a previous home functionality in response to the second touch gesture. For example, the device 100 may output a "camera" that is the previous home functionality as sound that is the first indication IND1 in response to the second touch gesture and display the icon HF4 corresponding to the "camera".

Referring to FIG. 16f, the user may perform a third touch gesture by using a finger of the hand H2, and thus the device 100 may detect the actionable point AP.

Referring to FIG. 16g, the device 100 may execute a home functionality corresponding to an indication in response to the third touch gesture. For example, the device 100 may output "favorite calls" that is a home functionality corresponding to the indication of FIG. 16e in response to the third touch gesture, and thus a screen of the device 100 may be changed as "favorite calls".

FIG. 17 illustrates an operation of the device 100 in a first touch gesture by four fingers, according to another exemplary embodiment.

Referring to FIG. 17, a user may perform the first touch gesture as a touch on four points of the device 100 by using four fingers of the hand H1 for more than a threshold period of time. Thus, the device 100 may detect the first through fourth stable points SP1, SP2, SP3, and SP4 and provide the first indication IND1 with respect to an operating mode according to the first touch gesture. For example, the device 100 may output an "application start mode" as sound according to the first touch gesture.

FIGS. 18a through 18c illustrate sequential operations of the device 100 in first and second touch gestures by one hand, according to an exemplary embodiment.

Referring to FIG. 18a, a user may perform the first touch gesture as a touch on a point of the device 100 by using a first finger F1 of one hand for more than a predetermined period of time. Thus, the device 100 may detect the first stable point SP1 and provide the first indication IND1 with respect to an operating mode according to the first touch gesture.

Thereafter, the user may perform the second touch gesture in a first direction by using a second finger F2 of the same hand. In the present embodiment, the first direction of the initially input second touch gesture may be determined as a forward direction, and a second direction opposite to the first direction may be determined as a reverse direction. The device 100 may provide indications with respect to one of a plurality of applications and functions displayed on the device 100 in a previously established order in response to the second touch gesture. For example, the device 100 may output a "bonus card" as sound that is the first indication IND1 in response to the second touch gesture and display a highlight that is the second indication IND2 with respect to an icon corresponding to the "bonus card".

Referring to FIG. 18b, the user may perform the second touch gesture in the first direction by using the second finger F2 of the same hand. In the present embodiment, since the first direction is determined as the forward direction, the device 100 may provide indications with respect to a next application or function among a plurality of applications or functions displayed on the device 100 in the previously established order. For example, the device 100 may output a "map" that is a next application as sound that is the first indication IND1 in response to the second touch gesture and display a highlight that is the second indication IND2 with respect to an icon corresponding to the "map".

Referring to FIG. 18c, the user may perform the second touch gesture in the second direction by using the second finger F2 of the same hand. In the present embodiment, since the second direction is determined as the reverse direction, the device 100 may provide indications with respect to a previous application or function among the plurality of applications or functions displayed on the device 100 in an order opposite to the previously established order. Thus, the device 100 may output a "bonus card" that is the previous application as sound that is the first indication IND1 in response to the second touch gesture and display a highlight that is the second indication IND2 with respect to an icon corresponding to the "bonus card".

FIGS. 19a through 19c illustrate sequential operations of the device 100 in first and second touch gestures by one hand, according to another exemplary embodiment.

Referring to FIG. 19a, a user may perform the first touch gesture as a simultaneous touch on two points of the device 100 by using first and second fingers F1a and F1b of one hand for more than a predetermined period of time. Thus, the device 100 may detect the first and second stable points SP1 and SP2 and provide the first indication IND1 with respect to an operating mode according to the first touch gesture.

Thereafter, the user may perform the second touch gesture in a first direction by using a third finger F2 of the same hand. In the present embodiment, the first direction of the initially input second touch gesture may be determined as a forward direction, and a second direction opposite to the first direction may be determined as a reverse direction. The device 100 may provide indications with respect to a shortcut key corresponding to one of a plurality of previously determined applications and functions in a previously established order in response to the second touch gesture. In the present embodiment, indications with respect to favorite calls, a message, and a current time may be provided in the previously established order. For example, the device 100 may output "favorite calls" as sound that is the first indication IND1 in response to the second touch gesture and display a shortcut key corresponding to "favorite calls" as the second indication IND2.

Referring to FIG. 19b, the user may perform the second touch gesture in the first direction by using the third finger F2 of the same hand. In the present embodiment, since the first direction is determined as the forward direction, the device 100 may provide indications with respect to a next shortcut key in the previously established order. For example, the device 100 may output the "message" that is the next shortcut key as sound that is the first indication IND1 in response to the second touch gesture and display a shortcut key corresponding to the "message" as the second indication IND2.

Referring to FIG. 19c, the user may perform the second touch gesture in the second direction by using the third finger F2 of the same hand. In the present embodiment, since the second direction is determined as the reverse direction, the device 100 may provide indications with respect to a previous shortcut key in an order opposite to the previously established order. Thus, the device 100 may output "favorite calls" that is the previous shortcut key as sound that is the first indication IND1 in response to the second touch gesture and display a shortcut key corresponding to "favorite calls" as the second indication IND2.

FIGS. 20a through 20c illustrate sequential operations of the device 100 in first and second touch gestures by one hand, according to another exemplary embodiment.

The operations of FIGS. 20a through 20c may be performed after the operations of FIGS. 19a through 19c are performed. An orientation of the device 100 of FIGS. 20a through 20c is changed compared to that of FIGS. 19a through 19c. As described above, although the orientation of the device 100 is changed in use, an order of providing orders may be determined based on a direction of an initially input second touch gesture.

Referring to FIG. 20a, a user may perform the second touch gesture in a first direction by using the third finger F2 of one hand. In the present embodiment, since the first direction is determined as a forward direction, the device 100 may provide indications with respect to a next shortcut key in a previously established order. For example, the device 100 may output a "message" that is the next shortcut key as sound that is the first indication IND1 in response to the second touch gesture and display a shortcut key corresponding to the "message" as the second indication IND2.

Referring to FIG. 20b, the user may perform the second touch gesture in the first direction by using the third finger F2 of the same hand. In the present embodiment, since the first direction is determined as the forward direction, the device 100 may provide indications with respect to a next shortcut key in the previously established order. For example, the device 100 may output a "current time" that is the next shortcut key as sound that is the first indication IND1 in response to the second touch gesture and display a shortcut key corresponding to the "current time" as the second indication IND2.

Referring to FIG. 20c, the user may perform the second touch gesture in the second direction by using the third finger F2 of the same hand. In the present embodiment, since the second direction is determined as the reverse direction, the device 100 may provide indications with respect to a previous shortcut key in an order opposite to the previously established order. Thus, the device 100 may output a "message" that is the previous shortcut key as sound that is the first indication IND1 in response to the second touch gesture and display a shortcut key corresponding to the "message" as the second indication IND2.

FIG. 21 illustrates a wearable device 200 and a device 300, according to an exemplary embodiment.

Referring to FIG. 21, the wearable device 200 means an electronic device capable of recognizing a touch gesture of a user in a wearable shape. The wearable device 200 may be, for example, a headphone 200a, a smart watch 200b, or glasses 200c but is not limited thereto. The wearable device 200 may be implemented as earrings, a necklace, earphones, an earring shaped accessory, shoes, a ring, clothes, a helmet, etc.

Wearing the wearable device 200 means that the user has the wearable device 200 in a body contact shape in a previously established manner. For example, the user may wear the wearable device 200 in a way of wearing a wrist watch on his/he wrist, glasses, earrings on his/her ears, the necklace on his/her neck, the earphones into his/her ears, the earring shaped accessory to his/her earflap, the shoes, the ring on his/her finger, the clothes, the helmet, etc.

The device 300 which is an electronic device capable of synchronizing with the wearable device 200 may be referred to as a master device. For example, the device 300 may be a smart phone, a tablet PC, a personal computer (PC), a cellular phone, a personal digital assistant (PDA), a laptop, a media player, a micro server, a GPS navigation device, smart TV, a desktop PC, a notebook, a smart board, a phablet, a navigation device, an e-book terminal, a digital broadcast terminal, a kiosk, an MP3 player, a digital camera, another mobile or non-mobile computing device, but is not limited thereto. The device 300 may include various devices capable of receiving a touch input such as a touch panel, an electronic board, a touch table, etc.

In the present embodiment, the wearable device 200 may receive an independent touch gesture with respect to locations of elements of a GUI. In an embodiment, the wearable device 200 may transmit a user input according to the received touch gesture to the device 300, and thus an application or a function stored in the device 300 may be performed. In another embodiment, the wearable device 200 may directly perform an application or a device stored in the wearable device 200 according to the received touch gesture.

In more detail, according to the present embodiment, the wearable device 200 may provide the indications IND with respect to one of a plurality of applications and functions in response to the received touch gesture, and perform an application or a function selected according to the user input. In this regard, the selected application or function may be stored in the wearable device 200 or the device 300. Thus, when the user has difficulty in recognizing locations of elements of the GUI on the device 200, an information exchange between the user and the wearable device 200 may be smooth.

FIG. 22 is a flowchart illustrating operations of the wearable device 200 and the device 300 performed by using a device control method, according to an exemplary embodiment.

Referring to FIG. 22, the device control method according to the present embodiment may include operations time-serially proposed by the wearable device 200 and the device 300 of FIG. 21. Although omitted below, descriptions of the wearable device 200 and the device 300 with reference to FIG. 21 apply to the device control method according to the present embodiment.

In operation S2200, the wearable device 200 receives an independent first touch gesture with respect to locations of elements of a GUI thereon. In this regard, the first touch gesture does not select an element corresponding to an application or function that is to be executed among the elements of the GUI on the wearable device 200 but may be a touch operation on an arbitrary point on a touch area on the wearable device 200. For example, the first touch gesture may be a gesture on at least a point on the touch area of the wearable device 200 for more than a threshold period of time.

In operation S2210, the wearable device 200 provides an indication with respect to an operating mode according to the first touch gesture. In an embodiment, the indication may be sound. In operation S2210, the wearable device 200 may output a title of the operating mode as sound. In another embodiment, the indication may be graphics. In operation S2210, the wearable device 200 may display an icon indicating the operating mode.

In operation S2220, the wearable device 200 determines a plurality of application and functions according to the first touch gesture. In more detail, the wearable device 200 may determine a plurality of applications and functions that are to provide indications in response to a second touch gesture according to a number of points touched on the wearable device 200 according to the first touch gesture. According to embodiments, an order of operations S2210 and S2220 may be changed.

In operation S2230, the wearable device 200 receives an independent second touch gesture with respect to the locations of the elements of the GUI thereon. In this regard, the wearable device 200 continuously receives the first touch gesture while the second touch gesture is being received. In this regard, the second touch gesture does not select the element corresponding to the application or the function that is to be executed among the elements of the GUI on the wearable device 200 but may be the touch operation with respect to the arbitrary point on the touch area on the wearable device 200. For example, the second touch gesture may be a touch gesture moving from a first point to a second point on the wearable device 200.

In operation S2240, the wearable device 200 provides indications with respect to one of the plurality of applications and functions in a previously established order in response to the second touch gesture. In this regard, the previously established order may be established by a user or an operating system in the wearable device 200. The plurality of applications and functions may be differently determined according to a type of the touch gesture. In an embodiment, the indication may be sound. In operation S2240, a title of one of the plurality of applications and functions may be provided as sound. In another embodiment, the indication may be graphics. In operation S2240, the wearable device 200 may display an icon of one of the plurality of applications and functions or a highlight with respect to the icon.

In operation S2250, the wearable device 200 receives a third touch gesture. In this regard, the wearable device 200 continuously receives the first touch gesture while the third touch gesture is being received. In an embodiment, the third touch gesture may be a user input to select an application or a function corresponding to the indication. In this regard, the third touch gesture does not select the element corresponding to the application or the function that is to be executed among the elements of the GUI on the device but may be the touch operation with respect to the arbitrary point on the touch area on the wearable device 200. For example, the third touch gesture may be a tap or a double tap with respect to a point on the wearable device 200.

In operation S2260, the wearable device 200 transmits a user input with respect to the third touch gesture to the device 300. In this regard, the user input with respect to the third touch gesture may be a user input to select an application or function corresponding to the indication provided in response to the second touch gesture.

In operation S2270, the device 300 executes a selected application or function. For example, a user may listen to music by executing an application "music play" stored in the device 300. For another example, the user may call a desired correspondent by executing a "call" function stored in the device 300.

FIG. 23 is a flowchart illustrating operations of the wearable device 200 and the device 300 performed by using a device control method, according to another exemplary embodiment.

Referring to FIG. 23, the device control method according to the present embodiment may include operations time-serially proposed by the wearable device 200 and the device 300 of FIG. 21. Although omitted below, descriptions of the wearable device 200 and the device 300 with reference to FIG. 21 apply to the device control method according to the present embodiment. The device control method according to the present embodiment is a modification of the device control method of FIG. 22. Redundant description between FIGS. 22 and 23 are omitted.

In operation S2300, the wearable device 200 receives an independent first touch gesture with respect to locations of elements of a GUI thereon. In operation S2310, the wearable device 200 provides an indication with respect to an operating mode according to the first touch gesture. In operation S2320, the wearable device 200 transmits a user input with respect to the first touch gesture to the device 300. According to embodiments, an order of operations S2310 and S2320 may be changed.

In operation S2330, the device 300 determines a plurality of application and functions according to the first touch gesture. In more detail, the device 300 may determine a plurality of applications and functions that are to provide indications in response to a second touch gesture according to a number of points touched on the device 300 according to the first touch gesture. In operation S2340, the wearable device 200 receives an independent second touch gesture with respect to the locations of the elements of the GUI thereon. In this regard, the wearable device 200 continuously receives the first touch gesture while the second touch gesture is being received.

In operation S2350, the wearable device 200 transmits a user input with respect to the second touch gesture to the device 300. In operation S2355, the device 300 provides one of the plurality of applications and functions in a previously established order in response to the second touch gesture. In this regard, the previously established order may be established by a user or an operating system in the device 300. The plurality of applications and functions may be differently determined according to a type of the touch gesture.

In operation S2360, the wearable device 200 provides indications with respect to one of the plurality of applications and functions. In operation S2370, the wearable device 200 receives a third touch gesture. In this regard, the wearable device 200 continuously receives the first touch gesture while the third touch gesture is being received. In operation S2380, the wearable device 200 transmits a user input with respect to the third touch gesture to the device 300. In operation S2390, the device 300 executes a selected application or function.

FIGS. 24a through 24c illustrate control operations of a device when a wearable device is a headphone 200a, according to an exemplary embodiment.

Referring to FIG. 24a, the user USER may wear the headphone 200a that may recognize a touch gesture of the user USER and communicate with the device 300. In the present embodiment, the headphone 200a may receive an independent touch gesture on locations of elements of a GUI and provide indications with respect to one of a plurality of applications and functions in response to the received touch gesture.

Referring to FIG. 24b, the user USER may perform a touch gesture with respect to the headphone 200a by using the hand H1. The present embodiment may be implemented similarly to the embodiment described with reference to FIGS. 18a through 20c. The description provided with reference to FIGS. 18a through 20c may apply to the present embodiment.

In more detail, the user USER may perform a first touch gesture as a touch on at least one touch point of the headphone 200a by using at least one finger of the hand H1 for more than a threshold period of time. The headphone 200a may provide an indication with respect to an operating mode according to the first touch gesture in response to the first touch gesture. For example, the indication may be sound. The wearable device 200 may output a title of the operating mode as sound.

In an embodiment, the headphone 200a may determine a plurality of application and functions that are to provide indications in response to a second touch gesture according to the first touch gesture. In another embodiment, the headphone 200a may transmit a user input according to the first touch gesture to the device 300, and the device 300 may determine a plurality of applications and functions that are to provide indications in response to the second touch gesture.

Thereafter, the user USER may perform the second touch gesture moving from a first point to a second point on the touch point on the headphone 200a by using at least one finger of the hand H1. In this regard, the user USER continuously performs the first touch gesture while performing the second touch gesture by using different fingers. The headphone 200a may provide an indication with respect to one of the plurality of applications and functions in a previously established order in response to the second touch gesture. In this regard, the indication may be sound. The headphone 200a may output a title of the operating mode as sound.

Thereafter, the user USER may perform a third touch gesture with respect to an indication by using at least one finger of the hand H1. In this regard, the user USER continuously performs the first touch gesture while performing the third touch gesture by using different fingers. The same finger may be used to perform the second and third touch gestures. In an embodiment, the headphone 200a may perform a selected application or function according to the third touch gesture. In another embodiment, the headphone 200a may provide a user input with respect to the third touch gesture to the device 300, and the device 300 may perform the selected application or function.

Referring to FIG. 24c, the user USER may perform a touch gesture on the headphone 200a by using the two hand H1 and H2. The present embodiment may be implemented similarly to the embodiment described with reference to FIGS. 14a through 17. The description provided with reference to FIGS. 14a through 17 may apply to the present embodiment.

In more detail, the user USER may perform a first touch gesture as a touch on at least one touch point of the headphone 200a by using at least one finger of the hand H1 for more than a threshold period of time. The headphone 200a may provide an indication with respect to an operating mode according to the first touch gesture in response to the first touch gesture. For example, the indication may be sound. The wearable device 200 may output a title of the operating mode as sound.

In an embodiment, the headphone 200a may determine a plurality of application and functions that are to provide indications in response to a second touch gesture according to the first touch gesture. In another embodiment, the headphone 200a may transmit a user input according to the first touch gesture to the device 300, and the device 300 may determine a plurality of applications and functions that are to provide indications in response to the second touch gesture.

Thereafter, the user USER may perform the second touch gesture moving from a first point to a second point on the touch point on the headphone 200a by using at least one finger of the hand H1. In this regard, the user USER continuously performs the first touch gesture while performing the second touch gesture by using different fingers. The headphone 200a may provide an indication with respect to one of the plurality of applications and functions in a previously established order in response to the second touch gesture. In this regard, the indication may be sound. The headphone 200a may output a title of the operating mode as sound.

Thereafter, the user USER may perform a third touch gesture with respect to an indication by using at least one finger of the hand H2. In this regard, the user USER continuously performs the first touch gesture while performing the third touch gesture. The same finger may be used to perform the second and third touch gestures. In an embodiment, the headphone 200a may perform a selected application or function according to the third touch gesture. In another embodiment, the headphone 200a may provide a user input with respect to the third touch gesture to the device 300, and the device 300 may perform the selected application or function.

FIGS. 25a and 25b illustrate control operations of the device 300 when a wearable device is a smart watch 200b, according to an exemplary embodiment.

Referring to FIG. 25a, the user USER may wear the smart watch 200b that may recognize a touch gesture of the user USER and communicate with the device 300. In the present embodiment, the smart watch 200b may receive an independent touch gesture on locations of elements of a GUI and provide indications with respect to one of a plurality of applications and functions in response to the received touch gesture.

Referring to FIG. 25b, the user USER may perform a touch gesture with respect to the smart watch 200b by using the hand H2 while wearing the smart watch 200b on the hand H1. The present embodiment may be implemented similarly to the embodiment described with reference to FIGS. 18a through 20c. The description provided with reference to FIGS. 18a through 20c may apply to the present embodiment.

In more detail, the user USER may perform a first touch gesture as a touch on at least one touch point of the smart watch 200b by using at least one finger (for example, F1) of the hand H2 for more than a threshold period of time. The smart watch 200b may provide an indication with respect to an operating mode according to the first touch gesture in response to the first touch gesture. For example, the indication may be sound. The smart watch 200b 200 may output a title of the operating mode as sound.

In an embodiment, the smart watch 200b may determine a plurality of application and functions that are to provide indications in response to a second touch gesture according to the first touch gesture. In another embodiment, the smart watch 200b may transmit a user input according to the first touch gesture to the device 300, and the device 300 may determine a plurality of applications and functions that are to provide indications in response to the second touch gesture.

Thereafter, the user USER may perform the second touch gesture moving from a first point to a second point on the touch point on the smart watch 200b by using at least one finger (for example F2) of the hand H2. In this regard, the user USER continuously performs the first touch gesture while performing the third touch gesture by using different fingers. The same finger may be used to perform the second and third touch gestures. In an embodiment, the smart watch 200b may perform a selected application or function according to the third touch gesture. In another embodiment, the smart watch 200b may transmit a user input with respect to the third touch gesture to the device 300, and the device 300 may perform the selected application or function.

FIG. 26 is a block diagram illustrating the wearable device 200, according to an exemplary embodiment.

Referring to FIG. 26, the wearable device 200 may include a user input unit 210, a control unit 220, a display unit 230, and a communication unit 240. Although not shown, the wearable device 200 may further include a sensor unit that may include at least one sensor capable of obtaining status information of the wearable device 200.

The user input unit 210 may receive various commands from a user, and include, for example, a key, a touch panel, a pen recognition panel, etc. The user input unit 210 of the present embodiment may receive first through third touch gestures from the user. In this regard, the first through third touch gestures are independent from locations of elements of a GUI on the wearable device 200.

The control unit 220 may control a general operation of the wearable device 200. The control unit 220 of the present embodiment may provide an indication with respect to one of a plurality of applications and functions in a previously established order in response to first through third touch gestures through the user input unit 210, and, an application or function corresponding to the indication is selected, perform the selected application or function.

The display unit 230 may display the status information of the wearable device 200, an application execution screen, the indication with respect to one of the plurality of applications and functions, etc. The display unit 230 may include, for example, a liquid crystal display apparatus, an organic light emitting display apparatus, etc. The display unit 230 may be provided in various locations and types according to a shape of the wearable device 200.

The communication unit 240 may communicate with an external device (for example, the device 300 of FIG. 21), and in more detail, communicate data, a control signal, a status signal, etc. with the external device. The communication unit 240 may provide a plurality of communication methods of which types may be changed according to embodiments.

FIG. 27 is a block diagram illustrating the communication unit 240 included in a wearable device, according to an exemplary embodiment.

Referring to FIG. 27, the communication unit 240 according to the present embodiment may include at least one of a Bluetooth module 241, a WiFi module 242, a near field communication (NFC) module 243, and a mobile communication module 244 or a combination of these. The Bluetooth module 241, the WiFi module 242, the NFC module 243, and the mobile communication module 244 may be selectively provided according to embodiments.

The mobile communication module 244 may transmit and receive a call and a text message and perform data communication over a mobile communication network. The mobile communication network may include a communication network using at least one of, for example, 2-generation (2G) mobile communication such as code division multiple access (CDMA), global system for mobile communication (GSM), personal digital cellular (PCD), etc., 3G mobile communication such as international mobile telecommunication (IMT) 2000, wideband code division multiple access (W-CDMA), code division multiple access (CDMA) 2000, etc. and 4G mobile communication such as long term evolution (LTE), long term evolution advanced (LTE-A), etc.

FIG. 28 is a block diagram illustrating a device 1000, according to an exemplary embodiment.

Referring to FIG. 28, a configuration of the device 1000 according to the present embodiment may apply to the device 100 of FIG. 1 and the wearable device 200 and the device 300 of FIG. 21. The configuration of the device 1000 may apply to various types of devices such as, a smart phone, a tablet PC, a PDA, an MP3 player, a kiosk, an electronic frame, a navigation device, a digital TV, a wrist watch, or a wearable device such as a head-mounted display (HMD).

The device 1000 may include at least one of a display device 110, a control unit 170, a memory 120, a GPS chip 125, a communication unit 130, a video processor 135, an audio processor 140, a user input unit 145, a microphone unit 150, a photographing unit 155, a speaker unit 160, and a motion detection unit 165.

The display unit 110 may include a display panel 111 and a controller (not shown) controlling the display panel 111. The display panel 111 may be implemented as various types of displays such as a liquid crystal display (LCD), an organic light emitting diode (OLED) display, an active matrix organic light emitting diode (AMOLED), a plasma display panel (PDP), etc. The display panel 111 may be implemented in a flexible, transparent, or wearable way. The display unit 110 may be provided as a touch screen (not shown) after being coupled to a touch panel 147 of the user input unit 145. For example, the touch screen (not shown) may include an integral module in which the display panel 11 and the touch panel 147 are coupled to each other in a stack structure.

The memory 120 may include at least one of an internal memory (not shown) and an external memory (not shown).

The internal memory may include at least one of, for example, a volatile memory (for example, a dynamic RAM (DRAM), a static RAM (SRAM), a synchronous dynamic RAM (SDRAM), etc,), a non-volatile memory (for example, a one-time programmable ROM (OTPROM), a programmable ROM (PROM), an erasable and programmable ROM (EPROM), an electrically erasable and programmable ROM (EEPROM), a mask ROM, a flash ROM, etc.), a hard disk drive (HDD), a solid stated drive (SSD), etc. According to an embodiment, the control unit 170 may load and process a command or data received from at least one of the non-volatile memory or another element in the volatile memory. The control unit 170 may preserve data received from or generated by another element in the non-volatile memory.

The external memory may include at least one of, for example, a compact flash (CF), a secure digital (SD), a micro secure digital (MSD), a mini SD, an extreme digital (xD), and a memory stick.

The memory 120 may store various types of programs and data used to operate the device 1000. For example, the memory 120 may temporarily or semi-permanently store at least a part of key generation program and encryption program for content encryption, and a key reconstruction program and decryption program for content decryption. For another example, the memory 120 may temporarily or semi-permanently store at least a part of encrypted and decrypted content.

In the present embodiment, when an event occurs, the control unit 170 may determine a volume control operation of an audio signal output from an electronic device based on use particular information of the device 1000. In another embodiment, when the event occurs, the control unit 170 may determine a volume control operation of an audio signal output from an electronic device based on at least one piece of the use particular information and setting information of the device 1000.

In more detail, the control unit 170 may control the display unit 110 to display a part of the content stored in the memory 120. In other words, the control unit 170 may display a part of the content stored in the memory 120 on the display unit 110. Alternatively, if a user gesture is performed on a region of the display unit 110, the control unit 170 may perform a control operation corresponding to the user gesture.

The control unit 170 may include at least one of a RAM 171, a ROM 172, a CPU 173, a graphic processing unit (GPU) 174, and a bus 175. The RAM 171, the ROM 172, the CPU 173, and the GPU 174 may be connected through the bus 175.

The CPU 173 may access the memory 120 and perform booting by using an operating system (OS) stored in the memory 120. The CPU 173 may perform various operations by using various types of programs, contents, data, etc. stored in the memory 120.

The ROM 172 stores a set of commands for booting the OS. For example, if a turn-on command is input and power is supplied to a cellular terminal 100B, the CPU 173 may boot the OS by copying the OS stored in the memory 120 to the RAM 171 according to the command stored in the ROM 172 and executing the OS. If booting is complete, the CPU 173 performs various types of operations by copying various types of programs stored in the memory 120 to the RAM 171 and executing programs copied in the RAM 171. If booting of the device 10000 is complete, the GPU 174 displays a UI screen on a region of the display unit 110. In more detail, the GPU 174 may generate a screen displaying an electronic document including various objects such as content, an icon, a menu, etc. The GPU 174 computes an attribute value such as a coordinate value, a shape, a size, a color, etc. displaying each object according to a layout of the screen. The GPU 174 may generate various layouts of screens including the objects based on the computed attribute value. The screens generated by the GPU 174 may be provided to the display unit 110 and displayed on regions of the display unit 110.

The GPS chip 125 may receive a GPS signal from a GPS satellite and compute a current location of the device 1000. When a navigation program is used or a current location of a user is necessary, the control unit 170 may compute a user location by using the GP chip 125.

The communication unit 130 may communicate with various types of external devices according to various types of communications. In the present embodiment, the communication unit 130 may transmit information regarding the volume control operation and event occurrence information determined by the control unit 170 to at least one electronic device. The communication unit 130 may further transmit at least one piece of identification information, use particular information, and the event occurrence information. In more detail, the communication unit 130 may include at least one of a WiFi chip 131, a Bluetooth chip 132, a wireless communication chip 133, and an NFC chip 134. The control unit 170 may communicate with various types of external devices by using the communication unit 130.

The WiFi chip 131 and the Bluetooth chip 132 may respectively perform communication by using a WiFi method and a Bluetooth method. When the WiFi chip 131 or the Bluetooth chip 132 is used, various types of information may be transmitted and received by firstly transmitting and receiving various types of connection information such as an SSID and a session key and connecting communication by using the various types of connection information. The wireless communication chip 133 is a chip performing communication according to various communication standards such as IEEE, Zigbee, 3G, a 3rd generation partnership project (3GPP), LTE, etc. The NFC chip 134 is a chip operating by using an NFC method that uses a band of 13.56 MHz among various RF-ID frequency bands such as 135 kHz, 13.56 MHz, 433 MHz, 860~960 MHz, 2.45 GHz, etc.

The video processor 135 may process video data included in the contents received through the communication unit 130 or stored in the memory 120. The video processor 135 may perform various image processing on the video data such as decoding, scaling, noise filtering, frame rate conversion, resolution conversion, etc.

The audio processor 140 may process audio data included in the contents received through the communication unit 130 or stored in the memory 120. The audio processor 140 may perform various processing on the audio data such as decoding, amplification, noise filtering, etc.

If a reproduction program on multimedia content is executed, the control unit 170 may drive the video processor 135 and the audio processor 140 to reproduce the corresponding content. The speaker unit 160 may output the audio data generated by the audio processor 140.

The user input unit 145 may receive various commands from the user. In the present embodiment, the user input unit 145 may receive the setting information regarding a volume control of the audio signal. In more detail, the user input unit 145 may include at least one of a key 146, a touch panel 147, and a pen recognition panel 148.

The key 146 may include various types of keys a mechanical button, a wheel, etc. formed in various regions such as a front portion, a side portion, or a back portion of an appearance of a main body.

The touch panel 147 may detect a touch input of the user and output a touch event value corresponding to the detected touch input. When the touch panel 147 is coupled to the display panel 111 to form the touch screen (not shown), the touch screen may be implemented as various types of touch sensors such as a capacitive, decompressive, or piezoelectric touch sensor. A capacitive method detects small electricity caused by a body of the user and computes a touch coordinate when a part of the body of the user touches a touch screen surface by using a dielectric material coated on the touch screen surface. A decompressive method detects a flow of current when two electrode plates included in the touch screen touches a point of the screen touched by the user and computes a touch coordinate. The touch event occurring on the touch screen may be generated by a finger of the user mainly or a substance formed of a conductive material that may change a capacitance.

The pen recognition panel 148 may detect a proximity input or a touch input according to an operation of a touch pen (for example, a stylus pen, a digitizer pen, etc.) of the user and output a detected pen proximity event or pen touch event. The pen recognition panel 148 may be implemented, for example, in an EMR manner, and detect a touch or proximity input according to an intensity change of an electromagnetic field by a pen proximity or touch. In more detail, the pen recognition panel 148 may be configured to include an electronic induction coil sensor (not shown) having a grid structure and an electronic signal processing unit (not shown) sequentially providing an alternating current signal having a predetermined frequency to loop coils of the electronic induction coil sensor. If a pen including a resonance circuit is present near a loop coil of the pen recognition panel 148, a magnetic field transmitted from the corresponding loop coil generates current based on a reciprocal electronic induction to the resonance circuit of the pen. An induction magnetic field may be generated from the coli included in the resonance circuit of the pen based on the current. The pen recognition panel 148 may detect the induction magnetic field from the loop coil in a signal receiving status to detect a proximity location of the pen or touch location. The pen recognition panel 148 may have a predetermined area of a lower portion of the display panel 111, for example, an area that may cover a display region of the display panel 111.

The microphone unit 150 may receive and convert a user voice or other sound into audio data. The control unit 170 may use the user voice input through the microphone unit 150 during a call operation or convert the user voice into the audio data and store the audio data in the memory 120.

The photographing unit 155 may photograph a still image or a moving image according to the control of the user. A plurality of photographing units 155 may be implemented like a front camera, a rear camera, etc.

When the photographing unit 155 and the microphone unit 150 are provided, the control unit 170 may perform a control operation according to the user voice input through the microphone unit 150 or a user motion recognized by the photographing unit 155. For example, the device 1000 may operate in a motion control mode or a sound control mode. When the device 1000 operates in the motion control mode, the control unit 170 may activate the photographing unit 155 to photograph the user, track a motion change of the user, and perform the control operation corresponding to the motion change. When the device 1000 operates in the sound control mode, the control unit 170 may analyze the user voice input through the microphone unit 1500 and operate in the sound recognition mode in which the control operation is performed according to the analyzed user voice.

The motion detection unit 165 may detect a motion of the main body of the device 1000. The device 1000 may rotate or may be inclined in various directions. In this regard, the motion detection unit 165 may detect a motion characteristic such as a rotation direction and angle, an inclination, etc. by using at least one of various sensors such as a terrestrial magnetic sensor, a Gyro sensor, an acceleration sensor, etc.

In addition, although not shown in FIG. 28, in the present embodiment, the device 1000 may further include various external input ports for connecting various external terminals such as a USB port to which a USB connector may be connected, a headset, a mouse, a LAN, etc., a digital multimedia broadcasting (DMB) chip receiving and processing a DMB signal, various sensors, etc.

Titles of elements of the device 1000 described above may be changed. The device 1000 of the present embodiment may include at least one of the elements, may omit some of the elements, or may include additional elements.

FIG. 29 is a block diagram illustrating software of the device 1000, according to an exemplary embodiment.

Referring to FIG. 29, the memory 120 of FIG. 28 may store an OS controlling resources of the device 1000 and an application program for operating an application. The OS may include a kernel 121, middleware 122, an API 123, etc. The OS may include, for example, Android, iOS, Windows, Symbian, Tizen, or Bada, etc.

The kernel 121 may include at least one of a device driver 121-1 or a system resource manager 121-2 capable of managing resources. The device driver 121-1 may access and control hardware components of the device 1000 in a software way to control the hardware. To this end, the device driver 121-1 may be identified as an interface and an individual driver module providing each hardware provider. The device driver 121-1 may include at least one of, for example, a display driver, a camera driver, a WiFi driver, an audio driver, and an inter-process communication (IPC) driver. The system resource manager 121-2 may include at least one of a process managing unit, a memory managing unit, and a file system managing unit. The system resource manager 121-2 may perform functions of controlling, allocating, or recovering system resources.

The middleware 122 may include a plurality of previously implemented modules for providing a commonly required function in various applications. The middleware 122 may provide a function through the API 123 to allow applications 124 to efficiently use resources included in the device 1000. The middleware 122 may include at least one of a plurality of modules, for example, an application manager 122-1, a window manager 122-2, a multimedia manager 122-3, a resource manger 122-4, a power manager 122-5, a database manager 122-6, a package manager 122-7, a connection manager 122-8, a notification manager 122-9, a location manager 122-10, a graphics manager 122-11, and a security manager 122-12.

The application manager 122-1 may manage a life cycle of at least one of the applications 124. The window manager 122-2 may manage a GUI resource used on a screen. The multimedia manager 122-3 may determine a format to reproduce various media files and perform encoding or decoding on media files by using a codec in accordance with the corresponding format. The resource manger 122-4 may manage resources such as a source code, a memory, a storage space, etc. of at least one of the applications 124. The power manager 122-5 may operate with bios BIOS to mange a battery or power and provide power information regarding an operation. The database manager 122-6 may generate, search, or change a database that is to be used in at least one of the applications 124. The package manager 122-7 may install or update an application distributed in a package file. The connection manager 122-8 may manage a wireless connection, for example, WiFi or Bluetooth. The notification manager 122-9 may display or notify an event such as a receipt message, a promise, a proximity alarm, etc. in a way that a user is not interfered. The location manager 122-10 may mange location information of the device 1000. The graphics manager 122-11 may manage a graphics effect that is to be provided to the user and a user interface related to the graphics effect. The security manager 122-12 may provide a general security function required for a system security or a user authentication. When the device 1000 includes a call function, the middleware 122 may further include a call manager (not shown) for managing a user voice call function or a conference call function.

The middleware 122 may further include a runtime library 122-13 or other library modules (not shown). The runtime library 122-13 is a library module used by a compiler so as to track a new function through a programming language during an execution of an application. For example, the runtime library 122-13 may perform a function regarding input/output, a memory function, or an arithmetic function, etc. The middleware 122 may generate and use a new middleware module through various function combinations of element modules described above. The middleware 122 may provide a specialized module for each type of an OS to provide a distinguished function. The middleware 122 may dynamically delete a part of given elements or add new elements. The elements described in the present embodiment may be partially omitted, may further include another element, or may be replaced with elements having other titles and performing similar functions.

The API 123 is a set of API programming functions and may be provided as another element according to an OS. In Android or iOS, for example, one API set may be provided according to platforms. In Tizen, for example, two or more API sets may be provided.

The applications 124 may include a preload application installed as default or a third party application that the user may install and use during a use process. The applications 124 may include at least one of, for example, a home application 124-1 for returning to a home screen, a dialer application 124-2 for a phone call with a correspondent, a text message application 124-3 for receiving a message from the correspondent identified by a phone number, an instant message (IM) application 124-4, a browser application 124-5, a camera application 124-6, an alarm application 124-7, a phone book application 124-8 managing a phone number of the correspondent or an address, a call log application 124-9 managing a call log of the user, a sending/receiving log of a text message, or a an unanswered call log, etc., an email application 124-10 receiving a message from the correspondent identified by an email, a calendar application 124-11, a media player application 124-12, an album application 124-13, and a watch application 124-14. Titles of elements of the software of the present embodiment described above may be changed according to a type of an OS. The software of the present embodiment may include at least one of the elements, may omit some of the elements, or may include additional elements.

FIG. 30 is a block diagram illustrating a device 2000, according to another exemplary embodiment.

Referring to FIG. 30, a configuration of the device 2000 according to the present embodiment may apply to the device 100 of FIG. 1 and the wearable device 200 and the device 300 of FIG. 21. The device 2000 may include a communication unit 2100, a user input unit 2200, a control unit 2300, an audio output unit 2400, and a display unit 2500.

The communication unit 2100 may communicate with an external device, and in more detail, communicate data, a control signal, a status signal, etc. with the external device. The communication unit 2100 may provide a plurality of communication methods of which types may be changed according to embodiments.

The user input unit 2200 may receive independent touch gestures with respect to locations of elements of a GUI on the device 2000. In more detail, the user input unit 2200 may receive a first touch gesture as a touch on at least a point of a touch region of the device 2000 for a threshold period of time. The user input unit 2000 may receive a second touch gesture moving from a first point to a second point on the touch region of the device 2000. In this regard, the user input unit 2200 may continuously receive the first touch gesture while the second touch gesture is being received. The user input unit 2000 may receive a third touch gesture as a touch on at least a point on the touch region of the device 2000 more than at least one time. In this regard, the user input unit 2200 may continuously receive the first touch gesture while the third touch gesture is being received.

The control unit 2300 may provide an indication with respect to one of a plurality of applications and functions in a previously established order in response to an input touch gesture and, if an application or function corresponding to the indication is selected, execute the selected application or function.

In more detail, the control unit 2300 may control to provide an indication with respect to an operating mode according to the first touch gesture in response to the first touch gesture. The control unit 2300 may determine a plurality of applications and functions that are to provide indications in response to the second touch gesture according to the first touch gesture. Thereafter, the control unit 2300 may control to provide an indication with respect to one of the plurality of applications and functions in the previously established order in response to the second touch gesture. Thereafter, the control unit 2300 may control to execute the selected application or function in response to the third touch gesture.

The audio output unit 2400 may output the indication as sound. In more detail, the audio output unit 2400 may output a title of the operating mode according to the first touch gesture as sound. The audio output unit 2400 may output a title of one of a plurality of applications and functions according to the second touch gesture as sound. The audio output unit 2400 may output a title or an execution result of the selected application or function according to the third touch gesture. Therefore, even when the user is unable to see the device 2000, an information exchange between the user and the device 2000 may be smooth.

The display unit 2500 may display the indication as graphics. In more detail, the display unit 2500 may display an icon indicating the operating mode according to the first touch gesture. The display unit 2500 may display a highlight with respect to an icon corresponding to one of a plurality of applications and functions according to the second touch gesture. The display unit 2500 may display a shortcut key corresponding to one of the plurality of applications and functions according to the second touch gesture. The display unit 2500 may display an icon indicating a home functionality according to the second touch gesture. The display unit 2500 may display a screen with respect to the selected application or function according to the third touch gesture.

The external device control method according to embodiments of the present invention may also be embodied as computer readable codes on a computer readable recording medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium may be distributed among computer systems that are interconnected through a network, and the present invention may be stored and implemented as computer readable code in a distributed manner.

While the present invention has been particularly shown and described with reference to exemplary embodiments thereof, it will be understood by those of ordinary skill in the art that various changes in form and details may be made herein without departing from the spirit and scope of the present invention as defined by the following claims.

The invention claimed is:

1. A method of controlling a device, the method comprising:
   receiving one or more first touch inputs independent of locations of a plurality of elements of a graphical user interface (GUI) on a display of the device, each of the plurality of elements belonging to one of a plurality of groups of applications and functions;
   determining a number of separate first touch point or first touch points in the one or more first touch inputs;
   determining a first group, among the plurality of groups, based on the number of the separate first touch point or first touch points;
   providing a first indication with respect to the first group;
   receiving one or more second touch inputs independent of the locations of the plurality of elements of the GUI after the first indication is provided;
   providing a second indication with respect to a first application or a first function, among a plurality of applications and functions in the first group in a previously established order based on the number of the separate first touch point or first touch points;
   receiving a third touch input independent of the locations of the plurality of elements of the GUI after the second indication is provided; and
   executing the first application or the first function from the first group based on the received third touch input,
   wherein each of the plurality of groups of applications and functions is uniquely associated with a different number of the first touch points in the one or more first touch inputs.

2. The method of claim 1, wherein the one or more second touch inputs moves from a first point to a second point on the device.

3. The method of claim 2, further comprising:
   receiving the one or more second touch inputs before the third touch input;
   providing a changed indication with respect to a second application or a second function among the plurality of applications and functions in the first group;
   receiving the third touch input after the changed indication is provided; and
   executing the second application or the second function from the first group based on the received third touch input.

4. The method of claim 2, further comprising: when the one or more second touch inputs moves from the first point to the second point on the device, determining a moving direction of the one or more second touch inputs as a forward direction and determining a direction opposite to the forward direction as a reverse direction.

5. The method of claim 1, wherein the providing of the second indication comprises:
   providing the second indication based on a direction of the one or more second touch inputs irrespective of an orientation of the device.

6. The method of claim 1, wherein the one or more first touch inputs is a touch on at least a point on the device for more than a threshold period of time.

7. The method of claim 1, wherein the receiving of the one or more first touch inputs comprises: continuously receiving the one or more first touch inputs while the one or more second touch inputs is received.

8. The method of claim 1, wherein the receiving of the one or more first touch inputs and the receiving of the one or more second touch inputs comprise:
   receiving the one or more first touch inputs and the one or more second touch inputs by respectively using both hands of a user; or receiving the one or more first touch inputs and the one or more second touch inputs s by respectively using different fingers of one hand of a user.

9. The method of claim 1, wherein the one or more first touch inputs is received as a touch at the separate first touch point or first touch points on the device for more than a threshold period of time,
   wherein the first group that corresponds to the separate first touch point or first touch points is determined for the first indication, and wherein the plurality of applications and functions corresponding to the first group are toggled based on the one or more second touch inputs.

10. The method of claim 1, wherein the one or more first touch inputs is received as a touch on two points on the device for more than a threshold period of time,
    wherein a second group, among the plurality of groups, corresponding to the two points is determined for the first indication, wherein a plurality of applications and functions corresponding to the second group are toggled based on the one or more second touch inputs, and wherein the second group comprises one or more short key applications and functions.

11. The method of claim 1, wherein the one or more first touch inputs is received as a touch on three points on the device for more than a threshold period of time, wherein a third group, among the plurality of groups, corresponding to the three points is determined for indication, wherein a plurality of applications and functions corresponding to the third group are toggled based on the one or more second touch inputs, and wherein the third group comprises one or more home functionality applications and functions.

12. The method of claim 1, wherein the receiving of the one or more first touch inputs comprises:

simultaneously receiving the one or more first touch inputs by using at least two fingers.

13. The method of claim 1, wherein the device is a wearable device, and wherein the plurality of groups of applications and functions are stored in the wearable device or synchronized with the wearable device.

14. A device comprising:

a touch panel configured to receive one or more first touch inputs, one or more second touch inputs, and a third touch input, the one or more first touch inputs, the one or more second touch inputs and the third touch input are independent of locations of a plurality of elements of a graphical user interface (GUI) on the device, each of the plurality of elements belonging to one of a plurality of groups of applications and functions; and a controller configured to:

determine a number of separate first touch point or first touch points in the one or more first touch inputs;

determine a first group, among the plurality of groups, based on the number of the separate first touch point or first touch points;

provide a first indication with respect to the first group;

receive the one or more second touch inputs after the first indication is provided;

provide a second indication with respect to one of a plurality of applications and functions in the first group in a previously established order based on the number of the separate first touch point or first touch points;

receive the third touch input after the second indication is provided;

execute an application or a function from the first group based on the received third touch input, wherein each of the plurality of groups of applications and functions is uniquely associated with a different number of the first touch points in the one or more first touch inputs.

15. The device of claim 14, wherein the one or more second touch inputs moves from a first point to a second point on the device.

16. The device of claim 15, wherein the touch panel is further configured to receive the one or more second touch inputs before the third touch input, and wherein the controller is further configured to:

provide a changed indication with respect to a second application or a second function among the plurality of applications and functions in the first group;

receive the third touch input through the touch panel after the changed indication is provided; and execute the second application or the second function from the first group based on the received third touch input.

17. The device of claim 15, wherein when the one or more second touch inputs moves from the first point to the second point on the device, the controller is further configured to determine a moving direction of the one or more second touch inputs as a forward direction and determine a direction opposite to the forward direction as a reverse direction.

18. The device of claim 14, wherein the one or more first touch inputs is continuously received while the one or more second touch inputs is received.

19. The device of claim 14, wherein the one or more first touch inputs and the one or more second touch inputs is received by respectively using both hands of a user or by respectively using different fingers of one hand of a user.

20. The device of claim 14, wherein the device is a wearable device, and wherein the plurality of groups of applications and functions are stored in the wearable device or synchronized with the wearable device.

* * * * *